US011564484B2

(12) United States Patent
Kottman et al.

(10) Patent No.: US 11,564,484 B2
(45) Date of Patent: *Jan. 31, 2023

(54) HEIGHT ADJUSTABLE PLATFORMS AND ASSOCIATED MECHANISMS

(71) Applicant: Ergotron, Inc., St. Paul, MN (US)

(72) Inventors: Mark Alan Kottman, Minneapolis, MN (US); Michael Anthony Apolloni, Edina, MN (US); John Kenneth Blomstrom, Minneapolis, MN (US)

(73) Assignee: Ergotron, Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/305,546

(22) Filed: Jul. 9, 2021

(65) Prior Publication Data

US 2022/0000257 A1  Jan. 6, 2022

Related U.S. Application Data

(63) Continuation of application No. 16/855,784, filed on Apr. 22, 2020, now Pat. No. 11,076,689, which is a (Continued)

(51) Int. Cl.
*A47B 21/02* (2006.01)
*A47B 9/02* (2006.01)
(Continued)

(52) U.S. Cl.
CPC ............... *A47B 21/02* (2013.01); *A47B 3/00* (2013.01); *A47B 9/02* (2013.01); *A47B 21/04* (2013.01)

(58) Field of Classification Search
CPC ........... A47B 21/02; A47B 21/04; A47B 3/00; A47B 9/02; A47B 21/56; A47B 96/027
(Continued)

(56) References Cited

U.S. PATENT DOCUMENTS 741,382 A    10/1903  Seifried
874,014 A    12/1907  Kurtzon
(Continued)

FOREIGN PATENT DOCUMENTS

AU    2015224380 A1    9/2015
AU    2015224380 B2    9/2015
(Continued)

OTHER PUBLICATIONS

"U.S. Appl. No. 16/290,766, Corrected Notice of Allowability dated Jun. 1, 2021", 2 pgs.
(Continued)

*Primary Examiner* — Jose V Chen
(74) *Attorney, Agent, or Firm* — Schwegman Lundberg & Woessner, P.A.

(57) ABSTRACT

A mobile workstation can include a head unit assembly. A worksurface can be coupled to the head unit assembly and configured to translate with respect to the head unit assembly between an open configuration and a closed configuration. A glide can be rotatably coupled to the head unit assembly and engaged with the worksurface. The glide can include a latch configured to translate with respect to a glide body of the glide. The mobile workstation can include a worksurface opening mechanism having a locking configuration and an unlocking configuration. The worksurface opening mechanism can include a latch release handle moveably coupled to the head unit assembly. Movement of the latch release handle can transition the worksurface opening mechanism between the locked configuration and the unlocked configuration. A release assembly can selectively engage with the first latch. A lift system can bias the worksurface away from the head unit assembly.

17 Claims, 47 Drawing Sheets

Related U.S. Application Data continuation of application No. 16/290,840, filed on Mar. 1, 2019, now Pat. No. 10,646,033.

(60) Provisional application No. 62/721,351, filed on Aug. 22, 2018, provisional application No. 62/637,562, filed on Mar. 2, 2018.

(51) Int. Cl.
  *A47B 21/04* (2006.01)
  *A47B 3/00* (2006.01)

(58) Field of Classification Search
  USPC .................................................. 108/147, 108
  See application file for complete search history.

(56) References Cited

U.S. PATENT DOCUMENTS

| | | |
|---|---|---|
| 1,034,365 A | 7/1912 | Hauser |
| 1,958,980 A | 5/1934 | Vaughan |
| 3,845,728 A | 11/1974 | Piretti |
| 4,353,263 A | 10/1982 | Ciciora |
| 4,457,406 A | 7/1984 | Porter |
| 4,969,403 A | 11/1990 | Schwartz et al. |
| 5,219,045 A | 6/1993 | Porter et al. |
| 5,441,129 A | 8/1995 | Porter et al. |
| 5,454,638 A | 10/1995 | Bird et al. |
| 5,472,103 A | 12/1995 | Meri |
| 5,538,213 A | 7/1996 | Brown |
| 5,568,843 A | 10/1996 | Porter et al. |
| 5,673,633 A | 10/1997 | Pfister |
| 5,706,739 A | 1/1998 | Shaheen et al. |
| 5,794,470 A | 8/1998 | Stringer |
| 5,927,214 A | 7/1999 | Schwartz et al. |
| 6,164,419 A | 12/2000 | Tribett |
| 6,276,660 B1 | 8/2001 | Wittkopp |
| 6,286,441 B1 | 9/2001 | Burdi |
| 6,315,361 B1 | 11/2001 | Stone et al. |
| 6,336,618 B1 | 1/2002 | Barber |
| 6,460,816 B1 | 10/2002 | Barber |
| 6,575,531 B1 | 6/2003 | Tseng |
| 6,584,917 B2 | 7/2003 | Long |
| 6,598,844 B2 | 7/2003 | Barber |
| 6,726,168 B2 | 4/2004 | Barber |
| 6,832,560 B2 | 12/2004 | Seiler et al. |
| 6,851,226 B2 | 2/2005 | MacGregor et al. |
| 6,905,101 B1 | 6/2005 | Dittmer |
| 7,395,996 B2 | 7/2008 | Dittmer |
| 7,398,950 B2 | 7/2008 | Hung et al. |
| 7,487,943 B1 | 2/2009 | Gillespie |
| 7,571,883 B2 | 8/2009 | Van Groesen et al. |
| 7,677,518 B2 | 3/2010 | Chouinard et al. |
| 7,766,311 B2 | 8/2010 | Kossett |
| 7,793,903 B2 | 9/2010 | Dittmer et al. |
| 7,828,253 B2 | 11/2010 | Meyer |
| 7,836,833 B2 | 11/2010 | Kumazawa |
| 7,878,470 B2 | 2/2011 | Oh et al. |
| 7,954,780 B2 | 6/2011 | Dittmer |
| 8,072,739 B2 | 12/2011 | Dittmer |
| 8,113,076 B2 | 2/2012 | Daul |
| 8,245,990 B2 | 8/2012 | Huang |
| 8,286,977 B2 | 10/2012 | Butler et al. |
| 8,408,365 B2 | 4/2013 | Biasiotto et al. |
| 8,490,934 B2 | 7/2013 | Dittmer |
| 8,693,172 B2 | 4/2014 | Russell et al. |
| 8,947,215 B2 | 2/2015 | Mandel et al. |
| 9,004,430 B2 | 4/2015 | Conner |
| 9,027,940 B2 | 5/2015 | Ergun et al. |
| 9,039,016 B2 | 5/2015 | Abernethy et al. |
| 9,161,617 B2 | 10/2015 | Fish |
| 9,167,894 B2 | 10/2015 | Desroches et al. |
| 9,232,855 B2 | 1/2016 | Ergun et al. |
| 9,416,911 B2 | 8/2016 | Segar et al. |
| 9,451,931 B2 | 9/2016 | Ninomiya |
| 9,549,609 B2 | 1/2017 | Constantino et al. |
| 9,596,929 B2 | 3/2017 | Koulizakis |
| 9,775,430 B2 | 10/2017 | Abu-Akel et al. |
| 9,855,109 B2 | 1/2018 | Dekel |
| 9,999,971 B2 | 6/2018 | Charlton et al. |
| 10,024,053 B2 | 7/2018 | Diekröger |
| 10,058,173 B2 | 8/2018 | Umstead |
| 10,092,092 B2 | 10/2018 | Koch |
| 10,323,791 B1 | 6/2019 | Liu |
| 10,376,042 B1 | 8/2019 | Johnson et al. |
| 10,376,158 B2 | 8/2019 | Desroches |
| 10,426,261 B2 | 10/2019 | Theis et al. |
| 10,646,033 B2 * | 5/2020 | Lindblad .................. A47B 5/04 |
| 11,071,377 B2 | 7/2021 | Lindblad et al. |
| 11,076,689 B2 * | 8/2021 | Kottman ............ F16M 11/2014 |
| 2003/0178541 A1 | 9/2003 | Barber |
| 2005/0018364 A1 | 1/2005 | Gill |
| 2005/0263465 A1 | 12/2005 | Chung |
| 2005/0288571 A1 | 12/2005 | Perkins et al. |
| 2006/0130713 A1 | 6/2006 | Jones et al. |
| 2006/0185563 A1 | 8/2006 | Sweere et al. |
| 2007/0227409 A1 | 10/2007 | Chu |
| 2007/0228680 A1 | 10/2007 | Reppert et al. |
| 2008/0084147 A1 | 4/2008 | Brown |
| 2008/0250989 A1 | 10/2008 | Kozlowski et al. |
| 2009/0315287 A1 | 12/2009 | Rossini |
| 2010/0172072 A1 | 7/2010 | Monaco |
| 2010/0252521 A1 | 10/2010 | Chen |
| 2011/0146541 A1 | 6/2011 | Griepentrog et al. |
| 2012/0019990 A1 | 1/2012 | Segar |
| 2012/0119040 A1 | 5/2012 | Ergun et al. |
| 2012/0236496 A1 | 9/2012 | Mcrorie |
| 2012/0255925 A1 | 10/2012 | Fernandez |
| 2013/0146728 A1 | 6/2013 | Ergun et al. |
| 2014/0084558 A1 | 3/2014 | Ergun et al. |
| 2014/0104806 A1 | 4/2014 | Segar et al. |
| 2015/0282607 A1 | 10/2015 | Lager |
| 2015/0313378 A1 | 11/2015 | Mason |
| 2016/0015167 A1 | 1/2016 | Abu-Akel et al. |
| 2016/0037907 A1 | 2/2016 | Ergun |
| 2016/0278514 A1 | 9/2016 | Maas |
| 2017/0196352 A1 | 7/2017 | King |
| 2017/0340102 A1 | 11/2017 | Ergun et al. |
| 2019/0269236 A1 | 9/2019 | Lindblad et al. |
| 2019/0269239 A1 | 9/2019 | Lindblad et al. |
| 2020/0352321 A1 | 11/2020 | Kottman et al. |

FOREIGN PATENT DOCUMENTS

| | | |
|---|---|---|
| CN | 102859252 A | 1/2013 |
| CN | 102859252 B | 10/2014 |
| CN | 105849814 A | 8/2016 |
| CN | 106163329 A | 11/2016 |
| CN | 106572746 A | 4/2017 |
| CN | 106714616 A | 5/2017 |
| CN | 111836567 A | 10/2020 |
| CN | 112165886 A | 1/2021 |
| CN | 112165886 B | 8/2022 |
| DE | 102013114289 A1 | 6/2015 |
| DE | 112019001101 T5 | 11/2020 |
| DE | 112019001110 T5 | 11/2020 |
| EP | 0218990 A2 | 4/1987 |
| EP | 2856909 A1 | 8/2015 |
| JP | 1017927 A | 1/1998 |
| JP | H1017927 A | 1/1998 |
| WO | WO-9205332 A1 | 4/1992 |
| WO | WO-0106892 A1 | 5/2001 |
| WO | WO-2010054430 A1 | 5/2010 |
| WO | WO-2016128765 A1 | 9/2019 |
| WO | WO-2019169346 A1 | 9/2019 |
| WO | WO-2019169355 A1 | 9/2019 |

OTHER PUBLICATIONS

"U.S. Appl. No. 16/290,766, Non Final Office Action dated Dec. 4, 2020", 13 pgs.

"U.S. Appl. No. 16/290,766, Notice of Allowance dated Mar. 26, 2021", 8 pgs.

(56) References Cited

OTHER PUBLICATIONS

"U.S. Appl. No. 16/290,766, Notice of Non-Compliant Amendment dated Aug. 10, 2020", 3 pgs.
"U.S. Appl. No. 16/290,766, Response filed Mar. 4, 2021 to Non Final Office Action dated Dec. 4, 2020", 11 pgs.
"U.S. Appl. No. 16/290,766, Response filed May 26, 2020 to Restriction Requirement dated Mar. 23, 2020", 14 pgs.
"U.S. Appl. No. 16/290,766, Response filed Oct. 8, 2020 to Notice of Non-Compliant Amendment dated Aug. 10, 2020", 15 pgs.
"U.S. Appl. No. 16/290,766, Restriction Requirement dated Mar. 23, 2020", 6 pgs.
"U.S. Appl. No. 16/290,840, Non Final Office Action dated Oct. 11, 2019", 7 pgs.
"U.S. Appl. No. 16/290,840, Notice of Allowance dated Feb. 4, 2020", 9 pgs.
"U.S. Appl. No. 16/855,784, Non Final Office Action dated Dec. 17, 2020", 7 pgs.
"U.S. Appl. No. 16/855,784, Notice of Allowance dated Mar. 26, 2021", 5 pgs.
"U.S. Appl. No. 16/855,784, Preliminary Amendment filed Jul. 30, 20", 8 pgs.
"U.S. Appl. No. 16/855,784, Response filed Mar. 16, 2021 to Non Final Office Action dated Dec. 17, 2020", 12 pgs.
"U.S. Appl. No. 16/855,784, Supplemental Notice of Allowability dated Jul. 8, 2021", 2 pgs.
"Chinese Application Serial No. 201980016854.X, Notification to Make Rectification dated Sep. 17, 2020", w/o English Translation, 2 pgs.
"International Application Serial No. PCT/US2019/020424, International Preliminary Report on Patentability dated Sep. 17, 2020", 9 pgs.
"International Application Serial No. PCT/US2019/020424, International Search Report dated Jun. 24, 2019", 4 pgs.
"International Application Serial No. PCT/US2019/020424, Invitation to Pay Additional Fees and Partial Search Report dated Apr. 17, 2019", 2 pgs.
"International Application Serial No. PCT/US2019/020424, Written Opinion dated Jun. 24, 2019", 7 pgs.
"International Application Serial No. PCT/US2019/020435, International Preliminary Report on Patentability dated Sep. 17, 2020", 6 pgs.
"International Application Serial No. PCT/US2019/020435, International Search Report dated May 16, 2019", 2 pgs.
"International Application Serial No. PCT/US2019/020435, Written Opinion dated May 16, 2019", 4 pgs.
"Canadian Application Serial No. 3,092,573, Office Action dated Oct. 28, 2021", 3 pgs.
"Canadian Application Serial No. 3,092,573, Response Filed 2.28.22 to Office Action dated Oct. 28, 2021", 19 pgs.
"Canadian Application Serial No. 3,092,642, Office Action dated Oct. 29, 2021", 4 pgs.
"Chinese Application Serial No. 201980016688.3, Office Action dated Dec. 23, 2021", w/English Translation, 12 pgs.
"Chinese Application Serial No. 201980016688.3, Response Filed Mar. 4, 2022 to Office Action dated Dec. 23, 2021", W/English Claims, 11 pgs.
"Chinese Application Serial No. 201980016854.X, Office Action dated Jan. 26, 2022", w/English Translation, 15 pgs.
"Chinese Application Serial No. 201980016854.X, Response filed May 23, 2022 Office Action dated Jan. 26, 2022", w/ English Claims, 9 pgs.
"Canadian Application Serial No. 3,092,642, Examiner's Rule 86(2) Requisition dated Jun. 28, 2022", 3 pgs.
"Canadian Application Serial No. 3,092,642, Response filed Aug. 30, 22 to Examiner's Rule 86(2) Requisition dated Jun. 28, 2022", 16 pgs.

\* cited by examiner

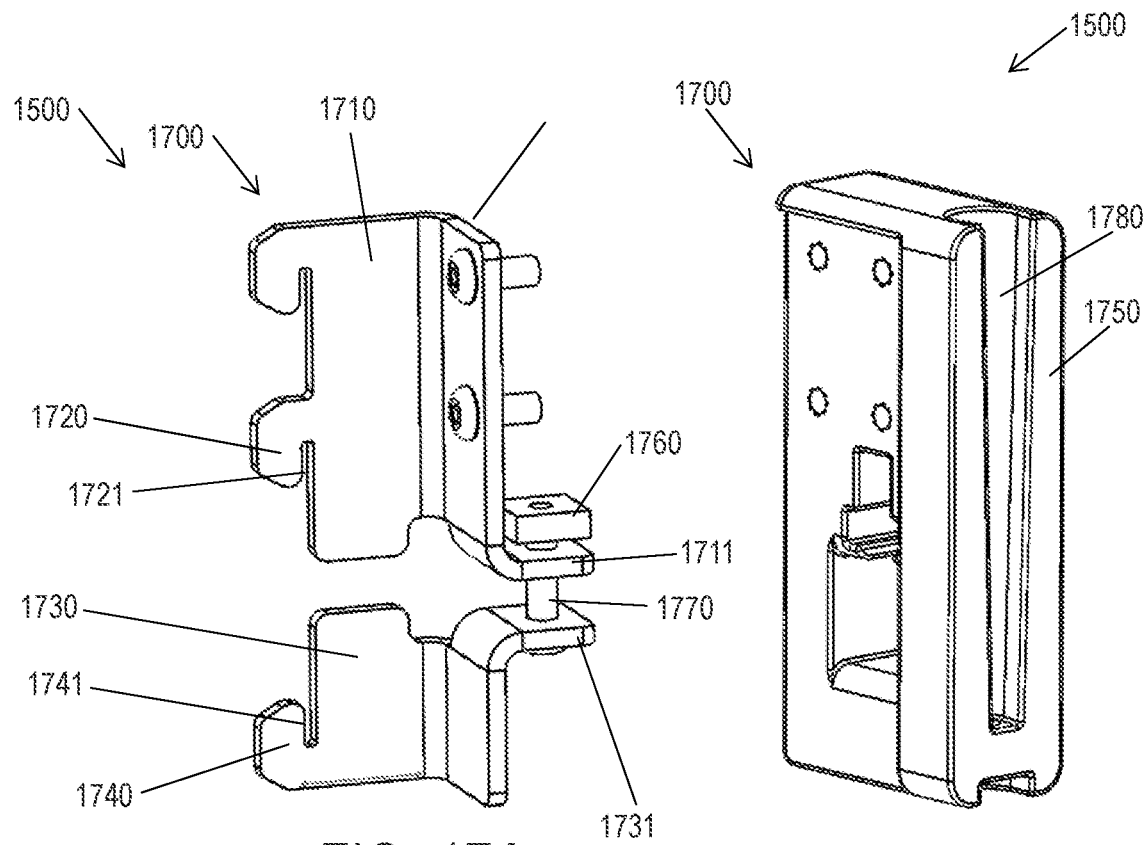
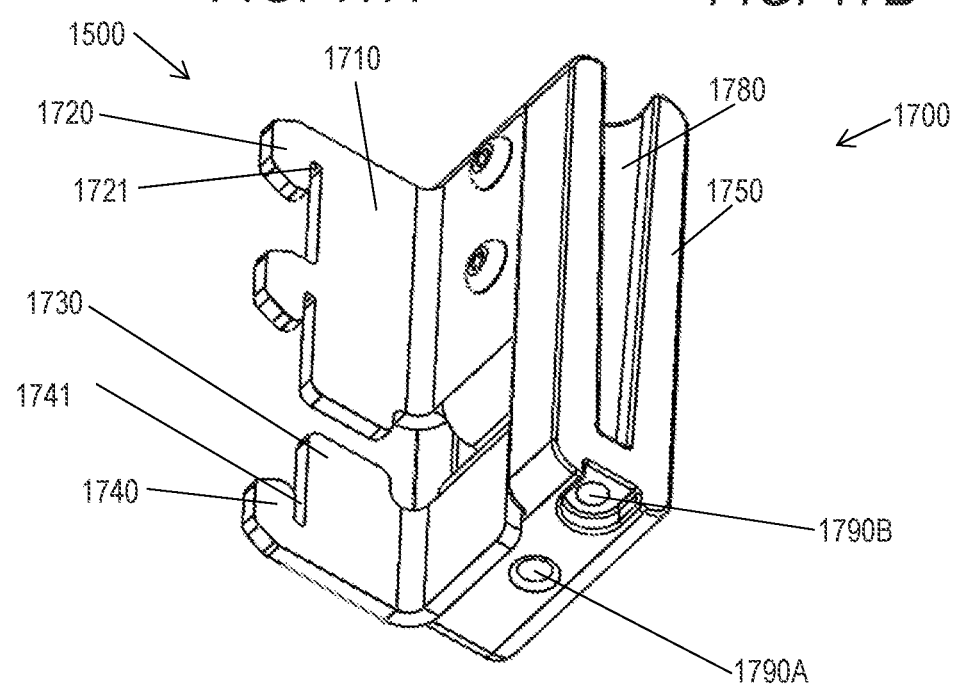

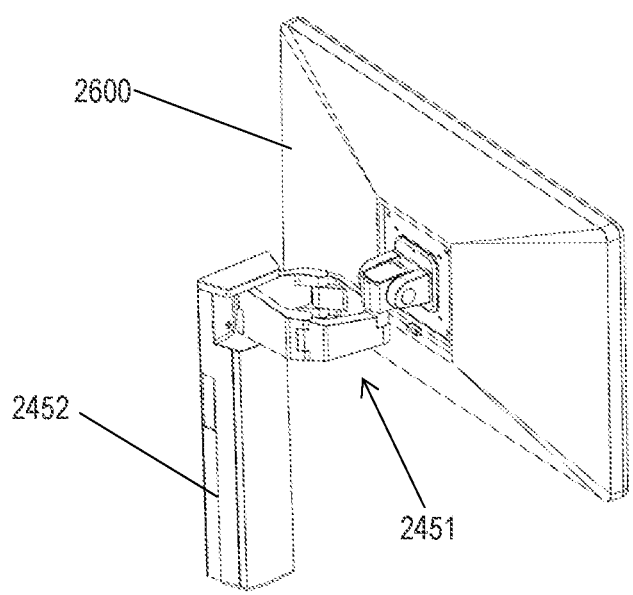
FIG. 29A
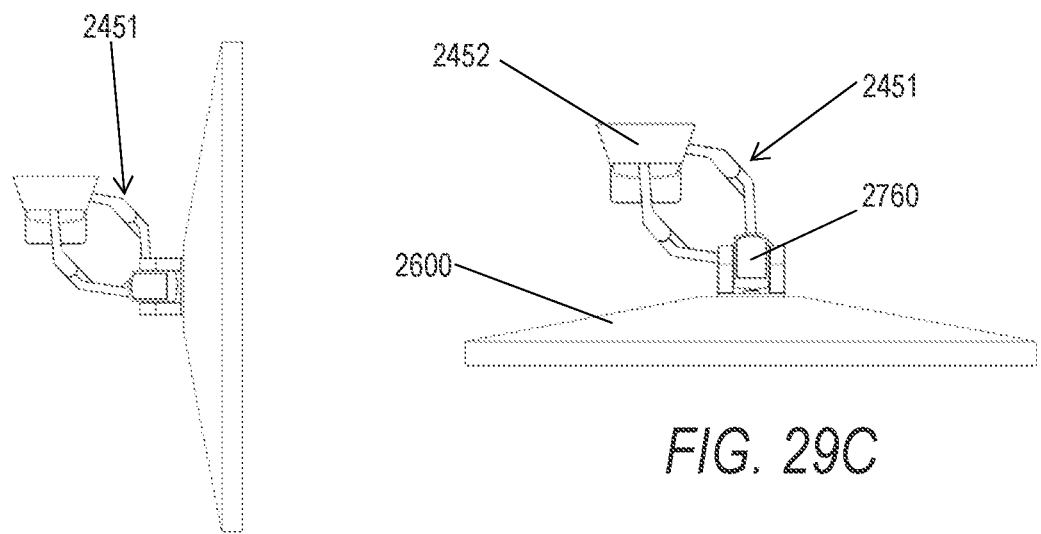
FIG. 29B
FIG. 29C

HEIGHT ADJUSTABLE PLATFORMS AND ASSOCIATED MECHANISMS

CLAIM OF PRIORITY

This patent application is a continuation of Kottman, et al. U.S. patent application Ser. No. 16/855,784, entitled "HEIGHT ADJUSTABLE PLATFORMS AND ASSOCIATED MECHANISMS," filed on Apr. 22, 2020, which is a continuation of Lindblad, et al. U.S. patent application Ser. No. 16/290,840, entitled "HEIGHT ADJUSTABLE PLATFORMS AND ASSOCIATED MECHANISMS," filed on Mar. 1, 2019, which claims the benefit of priority of Lindblad, et al. U.S. Provisional Patent Application Ser. No. 62/637,562, entitled "HEIGHT ADJUSTABLE PLATFORMS AND ASSOCIATED MECHANISMS," filed on Mar. 2, 2018, which is hereby incorporated by reference herein in its entirety. Additionally, this patent application claims the benefit of priority of Runger, et al. U.S. Provisional Patent Application Ser. No. 62/721,351, entitled "WORKSURFACE OPENING MECHANISM," filed on Aug. 22, 2018, which are hereby incorporated by reference herein in their entireties.

TECHNICAL FIELD

This document pertains generally, but not by way of limitation, to workstations.

BACKGROUND

Workstations can be freestanding (e.g., supported by a floor), coupled to a structure (e.g., a wall), or mobile (e.g., attached to a wheeled base). The workstation can include a worksurface, and the worksurface can allow a user to accomplish one or more tasks (e.g., writing, typing, manufacturing operations, or the like).

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 17A-17C show perspective views of an attachment mechanism.

FIGS. 29A-29C show perspective and top views the display arm assembly in an offset configuration.

DETAILED DESCRIPTION

Figure 1:
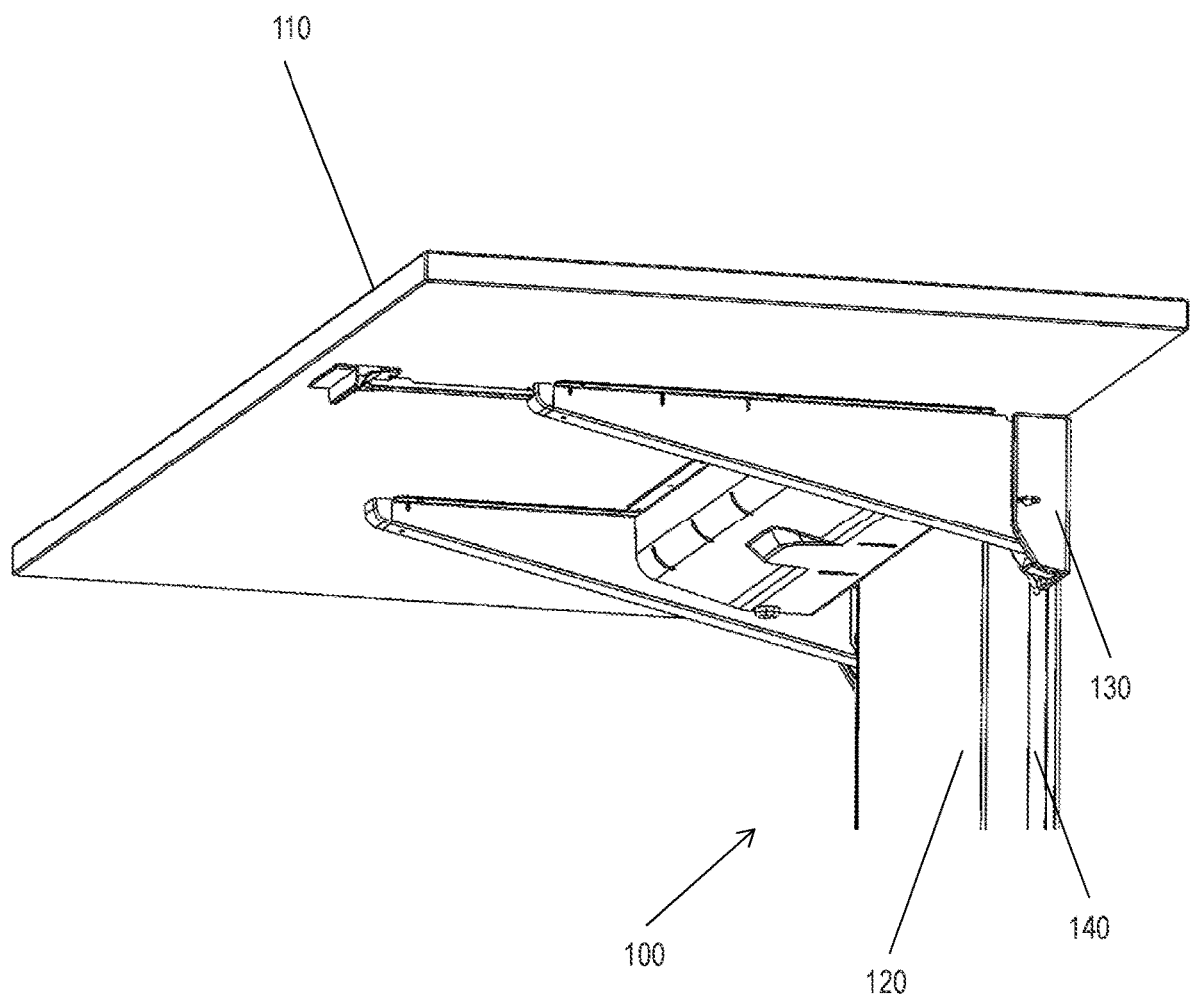
FIG. 1 shows an example of a height adjustable wall mount assembly.

FIG. 1 shows an example of a height adjustable wall mount assembly 100. In some examples, a worksurface 110 can be included in the wall mount assembly 100. The height adjustable wall mount assembly 100 can include a fixed riser 120, and a sliding bracket 130. The fixed riser 120 can be fixedly attached to a structure, such as a wall. The fixed riser 120 can have a width, a height extending in vertical direction, and a depth. The sliding bracket 130 can be slidingly engaged with the fixed riser 120. The sliding bracket 130 can translate with respect to a portion of the fixed riser 120, for instance a frame 140 of the fixed riser 120.

Figure 2:
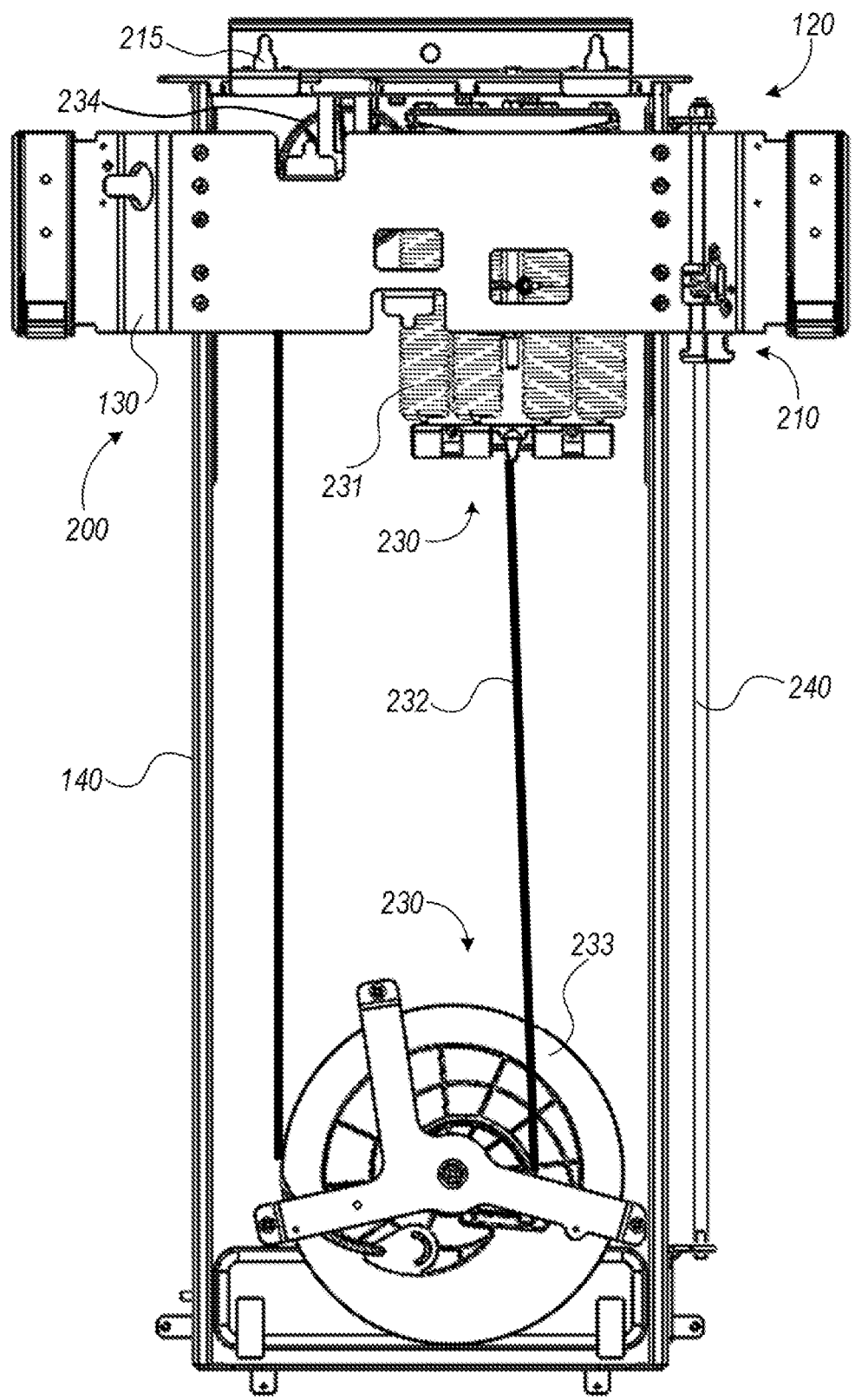
FIG. 2 shows a front view of a riser.

FIG. 2 shows a front view of the riser 120. A height adjustment mechanism 200 can be connected between the fixed riser 120 and the sliding bracket 130 to provide height adjustment for the workstation 100. The height adjustment mechanism 200 can further include a lock assembly 210. The lock mechanism can maintain the worksurface 110 at a desired height by immobilizing the height adjustment mechanism 200.

The frame 140 can define one or more mounting features, such as a mounting hole 220. The mounting features can be adapted to help couple (e.g., affix, attach, or the like) the riser 120 with a support structure (e.g., a wall, a cubicle wall, a free-standing frame, or the like). The frame 140 can be adapted to house, and otherwise support, components of the wall mount assembly 100.

The sliding bracket 130 can be adapted to couple with, and thereby support, components of the wall mount assembly 100, for instance the work surface 110. The sliding bracket 130 can be moveably coupled with the frame 140 such that the sliding bracket 130 is adapted to translate with respect to the frame 140. A portion of the sliding bracket 130 can engage with a portion of the frame 140, and thereby moveably couple the sliding bracket 130 with the frame 140. In an example, the frame 140 defines a keyway and the sliding bracket 130 includes a key. The keyway can be sized and shaped to receive the key. The key can be sized and shaped to engage with the keyway. The engagement of the key with the keyway can help moveably couple the sliding bracket 130 with the frame 140.

As described in this disclosure, the sliding bracket 130 can translate with respect to the frame 140, e.g., linear translation, which can change the height of the sliding bracket 130 (and components attached to the sliding bracket 130, such as the worksurface 110).

The riser 120 can include a counterbalance mechanism 230, and the counterbalance mechanism 230 can be included in the height adjustment mechanism 200. The counterbalance mechanism 230 can include one or more springs 231. The counterbalance mechanism 230 can include a wheel cable 232 (e.g., a tensile member). One end of the wheel cable 232 can be coupled to the sliding bracket 130, and the other end of the wheel cable 232 can be coupled to the one or more springs 231. The counterbalance mechanism 230 can include a wheel/cam assembly 233. The wheel cable 232 can engage with a portion of the wheel/cam assembly 233. Additionally, the wheel cable 232 can engage with a pulley 234.

In another example, the counterbalance mechanism 230 can include a plurality of wheel cables 232. For instance, one end of a first wheel cable 232 can be coupled to the sliding bracket 130, and the other end of the first wheel cable 232 can be coupled to the wheel/cam assembly 233. A second wheel cable 232 can be coupled between the wheel/cam assembly 233 and the one or more springs 231.

Referring again to FIG. 2, the springs 231, the wheel cable 232, and the wheel/cam assembly 233 can cooperate to help counterbalance a force applied to the sliding bracket 130. Counterbalancing the force applied to the sliding bracket 130 can help maintain the amount of force required to translate the sliding bracket 130 with respect to the frame 140. Stated another way, the counterbalance mechanism 230 can be adapted to support the sliding bracket 130 such that the amount of force necessary to translate the sliding bracket 130 with respect to the frame 140 remains substantially constant, despite increasing force created by the springs 231 during translation. Additionally, the counterbalance mechanism 230 can help maintain a position of the sliding bracket 130 with respect to the frame 140, such as by providing a lift force equivalent to the combined weight of the sliding bracket 130 and all the components connected to it, including (but not limited to) the worksurface 110 (shown in FIG. 1).

In an example, the sliding bracket 130 is coupled to the counterbalance mechanism 230 and the work surface 110 (shown in FIG. 1). For example, a user can place a fifteen-pound object on the work surface 110, and the counterbalance mechanism 230 can help maintain the position (e.g., height) of the sliding bracket 130 (and thereby the work surface 110) with respect to the user. Moreover, if the user desires to change the position of (e.g., raise or lower) the work surface 110, the counterbalance mechanism 230 helps maintain the amount of force necessary to change the position of the sliding bracket 130 (and thereby the work surface 110) such that the amount of force necessary to change the position of the sliding bracket 130 with respect to the frame 140 is substantially the same whether or not the fifteen-pound load is applied to the work surface 110.

Referring again to FIG. 2, the wall mount assembly 100 can include a lock rod 240. The lock rod 240 can be coupled to the frame 140. Although the lock rod 240 can be positioned internally within, or externally of, the frame 140, the specific configuration depicted in FIG. 2 depicts the lock rod 240 positioned on an external side of the frame 140. The lock rod 240 can be spaced from the frame 140 at a first distance (e.g., a gap can exist between the lock rod 240 and the frame 140). The lock rod 240 can have a circular, square, rectangular, other geometric shape, or irregular cross-section (e.g., the lock rod 240 can define a keyway).

As described in this disclosure, the wall mount assembly 100 can include the lock assembly 210. The lock assembly 210 can be sized and shaped to receive the lock rod 240. The lock assembly 210 can be adapted to selectively translate with respect to (e.g., along) the lock rod 240. The lock assembly 210 can be coupled to, or included in, the sliding bracket 130. The lock assembly 210 can help maintain the position of the sliding bracket 130 with respect to the frame 140. The lock assembly 210 can be coupled to the worksurface 110 (shown in FIG. 1). The lock assembly 210 can be adapted to couple with the worksurface 110, such as indirectly with the sliding bracket 130 or directly to the worksurface 110. The lock assembly 210 can help maintain the position of the worksurface 110 with respect to the riser 120 (or the frame 140). In an example, the lock assembly 210 can translate in a first direction (e.g., vertically) with respect to the lock rod 240. The translation of the lock assembly 210 in the first direction can correspondingly cause the worksurface 110 to translate in the first direction.

Figure 3:
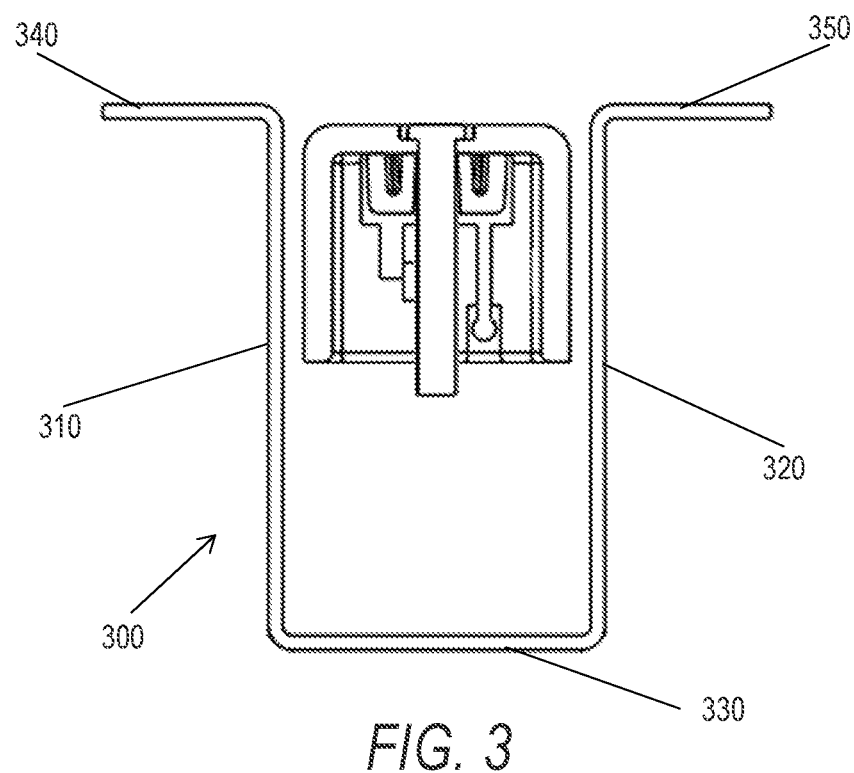
FIG. 3 shows a cross-sectional of one example of a support bracket.

FIG. 3 shows a front view of one example of a support bracket 300. Portions of the support bracket 300 can be removed for clarity. One or more of the support bracket 300 can be included in the wall mount assembly 100 (shown in FIG. 1). For instance, the support bracket 300 can be coupled to the sliding bracket 130 (shown in FIG. 1). In some examples, the support bracket 300 includes a U-shaped cross-section. The support bracket 300 can include a first side 310, a second side 320 opposite the first side 310, and a third side 330 connecting a lower end of the first 310 and second sides 310, 320. The height of the first side 310 and the second side 320 can increase as the cross section approaches a rear end of the support bracket 300 where the support bracket 300 can be coupled to the sliding bracket 130 to provide additional structural support for the worksurface 110. A first flange 340 and a second flange 350 can be formed at upper ends of the first side 310 and the second side 320, respectively. A worksurface 110 can be attached to the support bracket 300 through one or more apertures located on the first and second flanges 340, 350 (e.g., one or more fasteners can extend through the apertures to couple the worksurface 110 and the support bracket 300).

Figure 4:
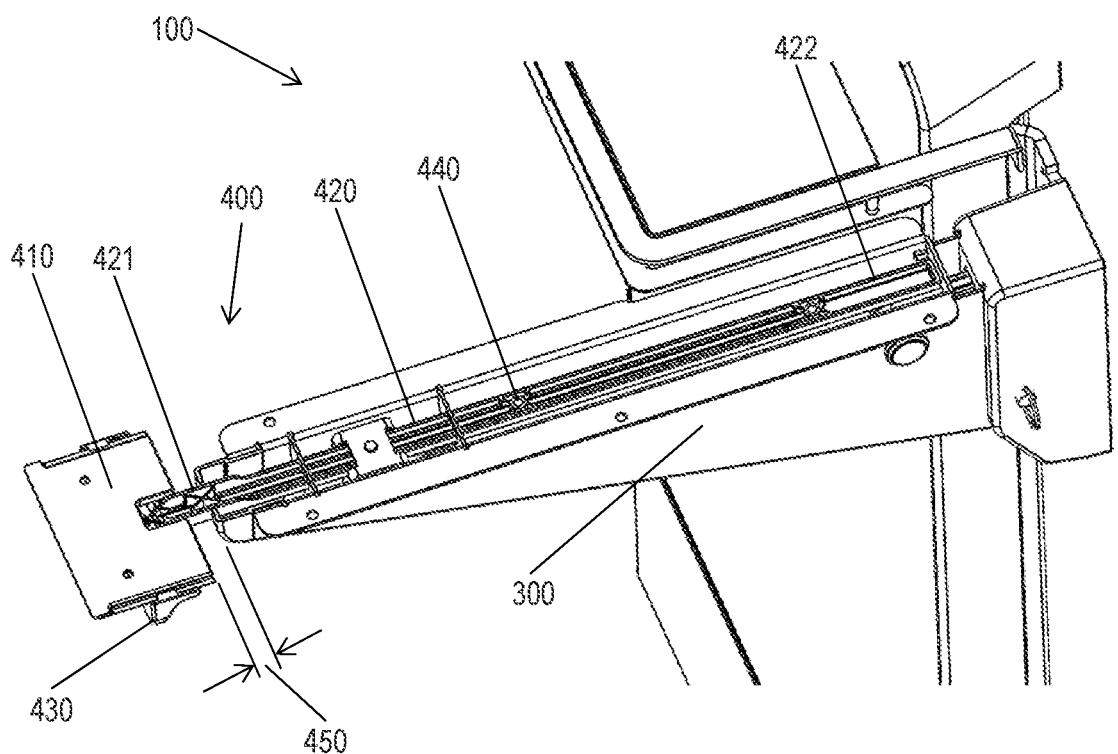
FIG. 4 shows a perspective view of the wall mount assembly of FIG. 1, including the support bracket of FIG. 3.

FIG. 4 shows a perspective view of the wall mount assembly 100 of FIG. 1, including the support bracket 300 of FIG. 3. A lock release assembly 400 can be operationally connected to the worksurface 110 (shown in FIG. 1). The lock release assembly 400 can be used to selectively release the lock mechanism 210 to adjust the height of the worksurface 110. The lock release assembly 400 can be partially located inside the support bracket 300, for instance as illustrated in FIG. 4. The lock release assembly 400 can include a fixed handle bracket 410, and an elongated member 420. In some examples, the fixed handle bracket 410 can be attached to the underside of the worksurface 110 (shown in FIG. 1). A handle 430 can be connected to a first end 421 of the elongated member 420. In some examples, the handle 430 can be slidingly engaged with the fixed handle bracket 410. The handle 430 can be located at a first distance 450 from the support bracket 300.

Additionally, a second end 422 of the elongated member 420 can extend into the support bracket 300. As described in greater detail herein, the elongated member 420 can include one or more connection holes 440 along a length of the elongated member 420. The one or more connection holes 440 can facilitate repositioning the handle 430 with respect to the support bracket 300. For instance, the connection holes 440 can facilitate repositioning the handle 430 at a second distance from the support bracket 300 (e.g., the second distance 700 shown in FIG. 7).

Figure 5:
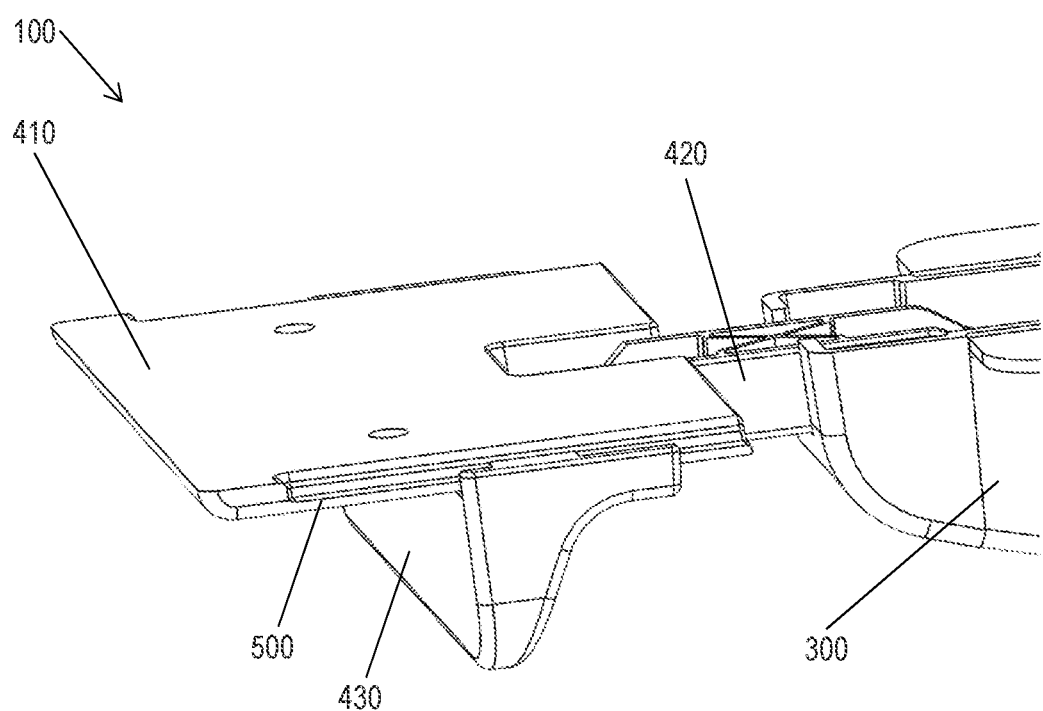
FIG. 5 shows a detailed perspective view of the wall mount assembly.

FIG. 5 shows a detailed perspective view of the wall mount assembly 100. As described in this document, the handle 430 can be slidingly engaged with the fixed handle bracket 410. In an example, the fixed handle bracket 410 can include a groove 500, and the handle 430 can be sized and shaped to receive the groove 500 (e.g., the sliding handle 430 can define a channel that can be sized and shaped to receive the groove 500).

Figure 6:
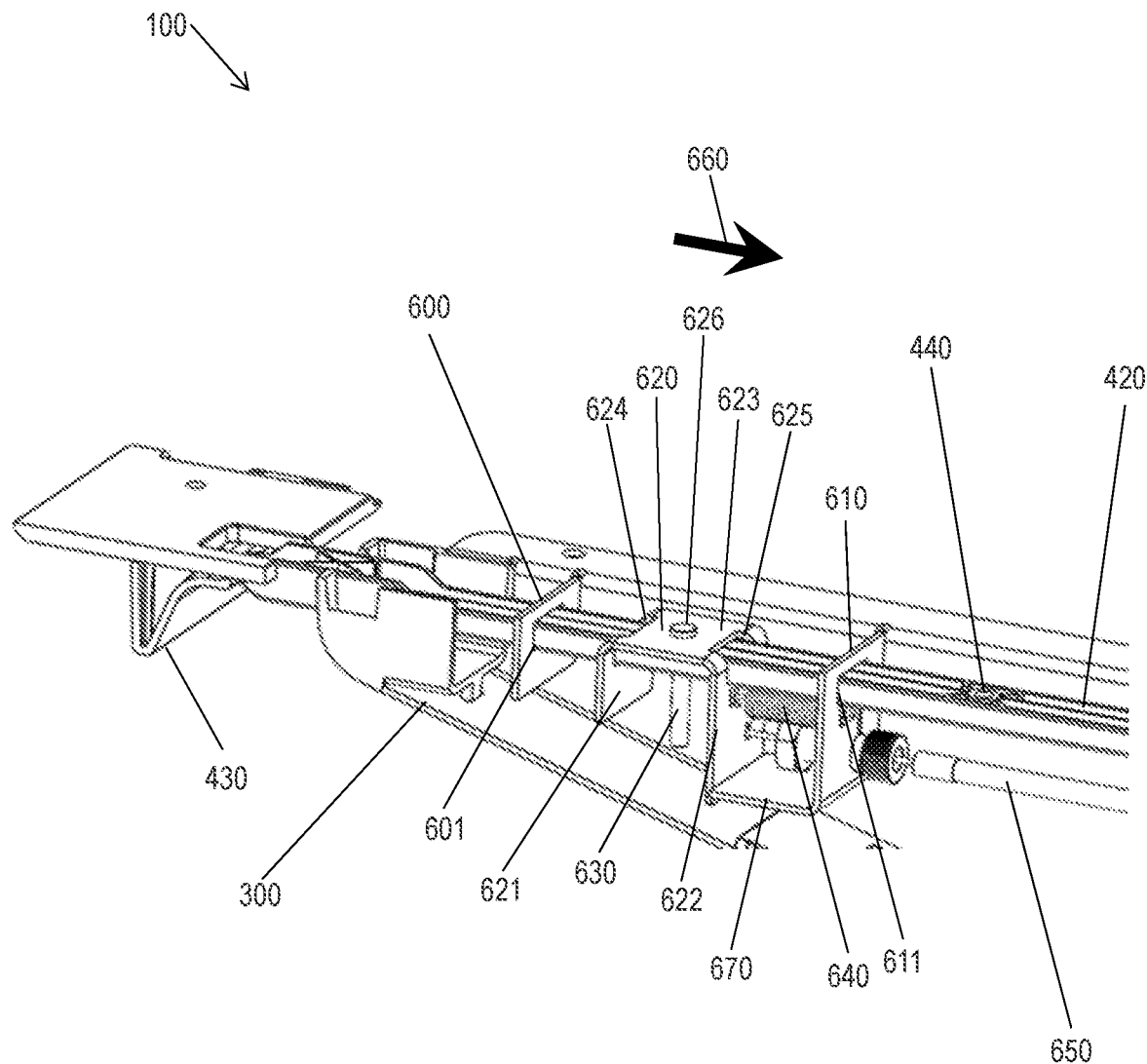
FIG. 6 shows another perspective view of the support bracket.

FIG. 6 shows another perspective view of the support bracket 300. A portion of the support bracket 300 is hidden to show internal components of the support bracket 300. A first guide bracket 600 and a second guide bracket 610 can be coupled with the support bracket 300, and the first guide bracket 600 can be spaced apart from the second guide bracket 610. The first guide bracket 600 and the second guide bracket 610 can define a first aperture 601 and a second aperture 611, respectively. The elongated member 420 can pass through the first aperture 601 and the second aperture 611. For instance, the elongated member 420 can be slidably engaged with the first aperture 601 and the second aperture 611. The first aperture 601 and the second aperture 611 can provide guidance for the elongated member 420 during translation of the elongated member 420 with respect to the support bracket 300.

A connecting bracket 620 can be fixedly attached to the elongated member 420. The connecting bracket 620 can include a first face 621, a second face 622, and a third face 623. The first face 621 can be parallel with the second face 622, and the third face 623 can connect the first face 621 and the second face 622. The first face 621 can define a third aperture 624, and the second face 622 can define a fourth aperture 625. The elongated member 420 can pass through the third aperture 624 and the fourth aperture 625. The third face 623 of the connecting member 630 can define a hole 626. A fastener 630 can be inserted through the hole 626, and the fastener 630 can be engaged with the elongated member 420. For instance, the fastener 630 (e.g., a screw, pin, or the like) can be engaged with the one or more connection holes 440 to couple the connecting member 620 with the elongated member 420. In some examples, the connecting member 620 can be located between the first guide bracket 600 and the second guide bracket 610.

The lock release assembly 400 can further include a biasing member 640 (e.g., a spring). The biasing member 640 can be located between the second guide bracket 610 and the second face 622 of the connecting bracket 620. The biasing member 640 can be coupled to the guide bracket 610 and the connecting bracket 620, and the biasing member 640 can bias the connecting bracket 620 in first direction (e.g., as denoted by the arrow 660 shown in FIG. 6). The connecting bracket 620 can engage with a stop 670, and the stop 670 can inhibit the movement of the connecting bracket 620 relative to the support bracket 300. In an example, the stop 670 can be included in the second guide bracket 610. In another example, stop 670 can be coupled with a portion of the support bracket 300. A user can operate (e.g., pull, twist, push, or the like) the handle 430, and operation of the handle 430 can displace the connecting bracket 620 in a second direction opposite to the first direction (e.g., along a length axis of the elongated member 420). Displacement of the connecting bracket 620 can displace the biasing member 640, and when the handle 430 is released, the biasing member 640 can bias the connecting bracket 620 in the first direction to engage with the stop 670.

Referring again to FIG. 6, the lock release assembly 400 can include a lock release cable 650. The lock release cable 650 can be coupled with the connecting bracket 620 (e.g., the second face 622) and with the lock mechanism 210 (shown in FIG. 2). As described herein, a user can operate the handle 430, and displace the connecting member 620, for instance in the second direction. The connecting bracket 620 can correspondingly displace the lock release cable 650, and displacement of the lock release cable 650 can operate the lock mechanism 210, and facilitate height adjustment of the worksurface 110.

As described in this document, the handle 430 can be repositioned with respect to the support bracket 300. In an example, the wall mount assembly 100 can accommodate work surfaces 110 of varying dimensions (e.g., varying depths). Repositioning the handle 420 with respect to the support bracket 300 can allow the handle 430 to be mounted proximate to the front edge of the worksurface 110, for instance to ease accessibility to the handle 430 by the user.

Figure 7:
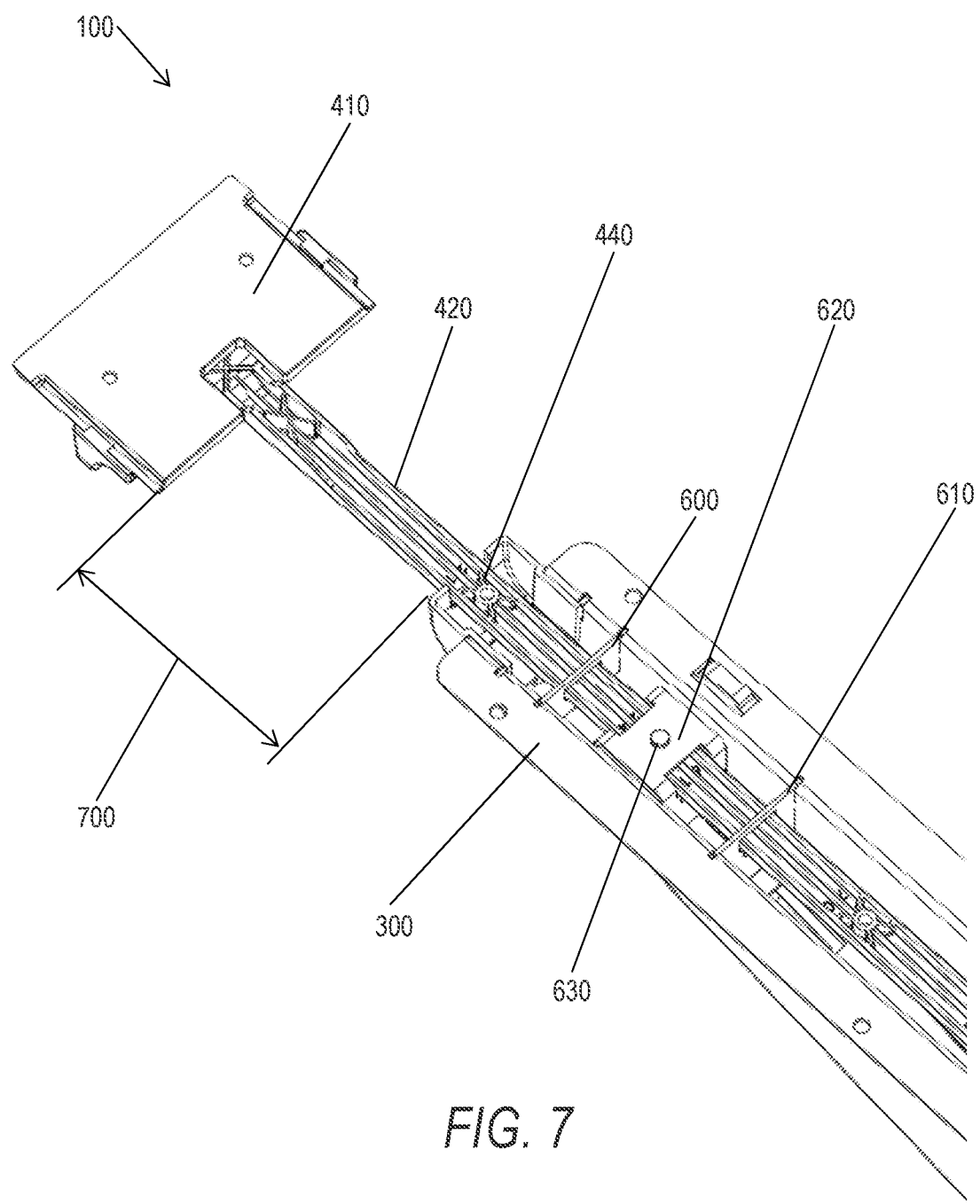
FIG. 7 shows a perspective view of a lock release assembly and the support bracket of FIG. 3.

FIG. 7 shows a perspective view of the lock release assembly 400 and the support bracket 300 of FIG. 3. As described in this document, the handle 430 (and the fixed handle bracket 410) can be located at a first distance 450 (shown in FIG. 4) from the support bracket 300. In another example the handle 430 can be located at a second distance 700 from the support bracket 300. Repositioning the handle 430 can facilitate locating the handle 430 proximate to a front edge of the work surface 110. The second distance 700 can be larger than the first distance 450 (shown in FIG. 4).

Repositioning the handle 430 can be achieved while keeping the first guide bracket 600, second guide bracket 610, and connecting bracket 620 at the same position relative to the support bracket 300. In an example, the handle 460 can be repositioned by disengaging the fastener 630 from the one or more connecting holes 440. Disengaging the fastener 630 from the connecting holes 440 can allow the elongated member 420 to translate relative to the connecting bracket 630. Translating the elongated member 420 relative to the connecting bracket 630 can vary the distance between the handle 430 and the support bracket 300 (e.g., between the first distance 450 and the second distance 700). The fastener 630 can be inserted through the connecting bracket 620, and engaged with the connecting holes 440. The engagement of the fastener 630 with the connecting holes 440 can inhibit the translation of the elongated member 420 with respect to the connecting bracket 620. Accordingly, when the fastener 430 is engaged with the connecting bracket 430 and the connecting holes 440, the handle 430 can be operated to displace the lock release cable (shown in FIG. 6) and operate the lock assembly 210 (shown in FIG. 2.

Figure 8:
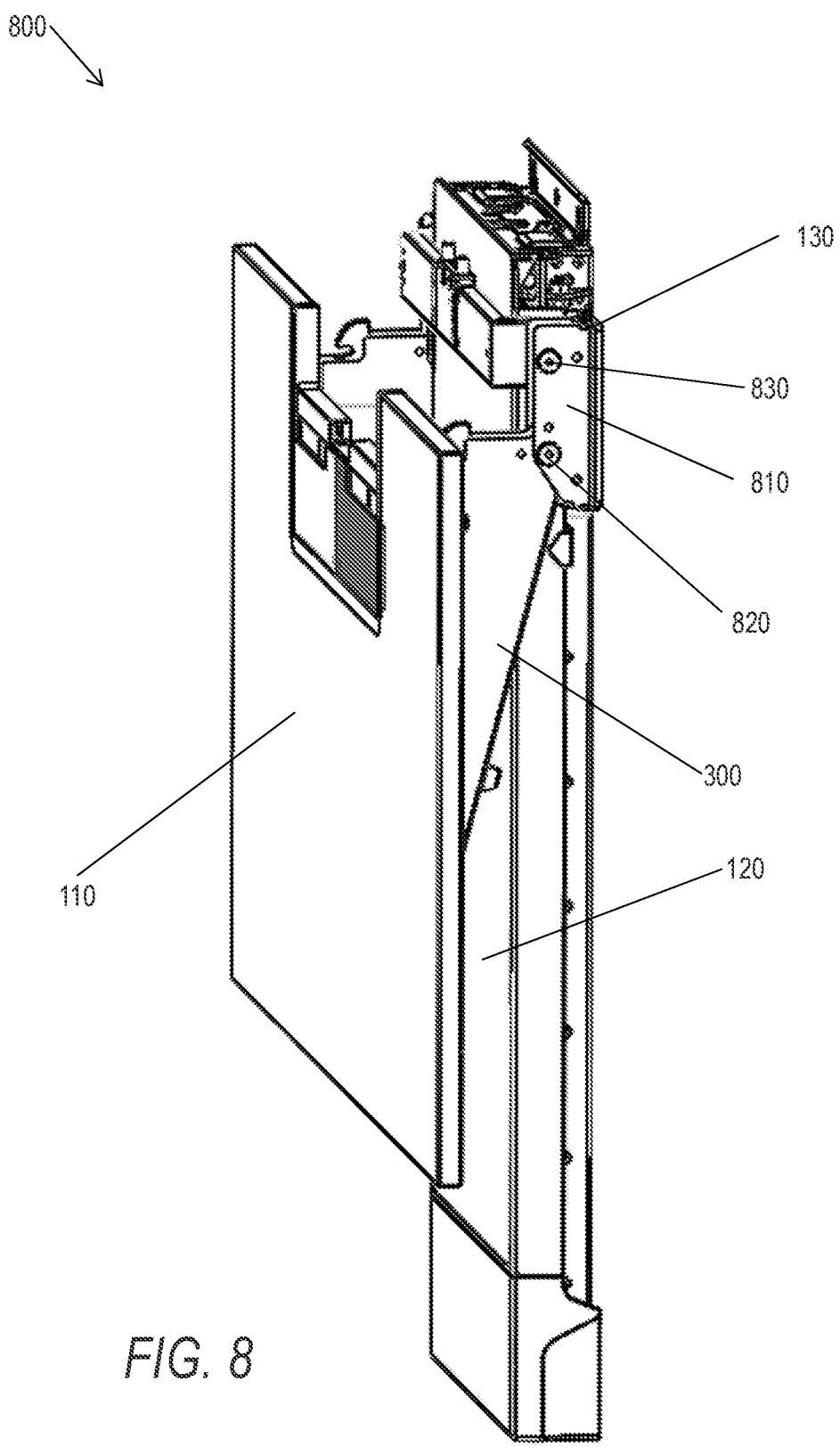
FIG. 8 shows a perspective view of a tilting work station.

FIG. 8 shows a perspective view of a tilting work station 800. The tilting work station 800 can include the height adjustable wall mount assembly 100. An attachment bracket 810 can be coupled to the sliding bracket 130. The attachment bracket 810 can include a hinge 820, and the support bracket 300 can be coupled to the attachment bracket 810. In an example, the support bracket 300 can rotate about the hinge 820, and the rotation of the support bracket 300 can allow the worksurface 110 to transition between a horizontal position and a vertical position. A hook pin 830 can be coupled with the attachment bracket 810.

Figure 9:
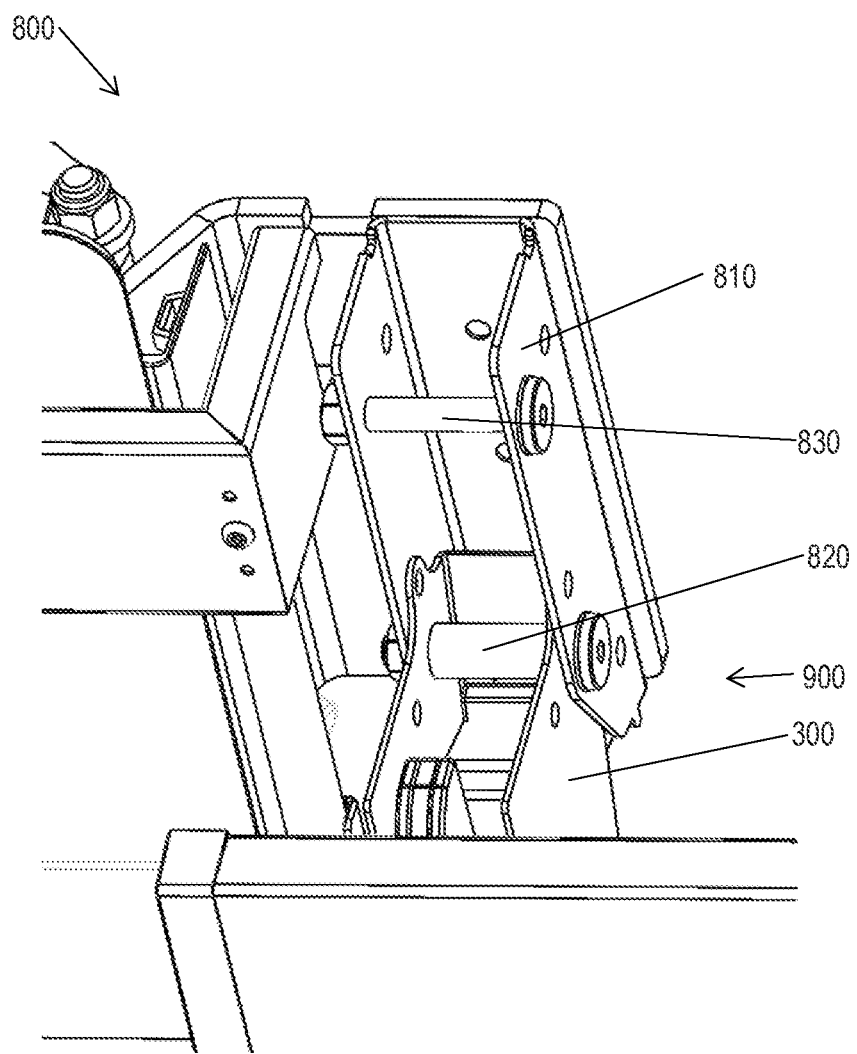
FIG. 9 shows a detailed perspective view of the tilting work station of FIG. 8.

FIG. 9 shows a detailed perspective view of the tilting work station 800 of FIG. 8. The work station 800 can include a lock assembly 900, and the lock assembly 900 can include the hook pin 830. The hook pin 830 can extend between sides of the attachment bracket 810. In some examples, the hook pin 830 can be can be located proximate to an upper end of the attachment bracket 810. Additionally, the hinge 820 can extend between the sides of the attachment bracket 810, and the hinge 820 can be located proximate a lower end of the attachment bracket 810. Further, the hinge 820 can be spaced apart from the hook pin 830.

Figure 10:
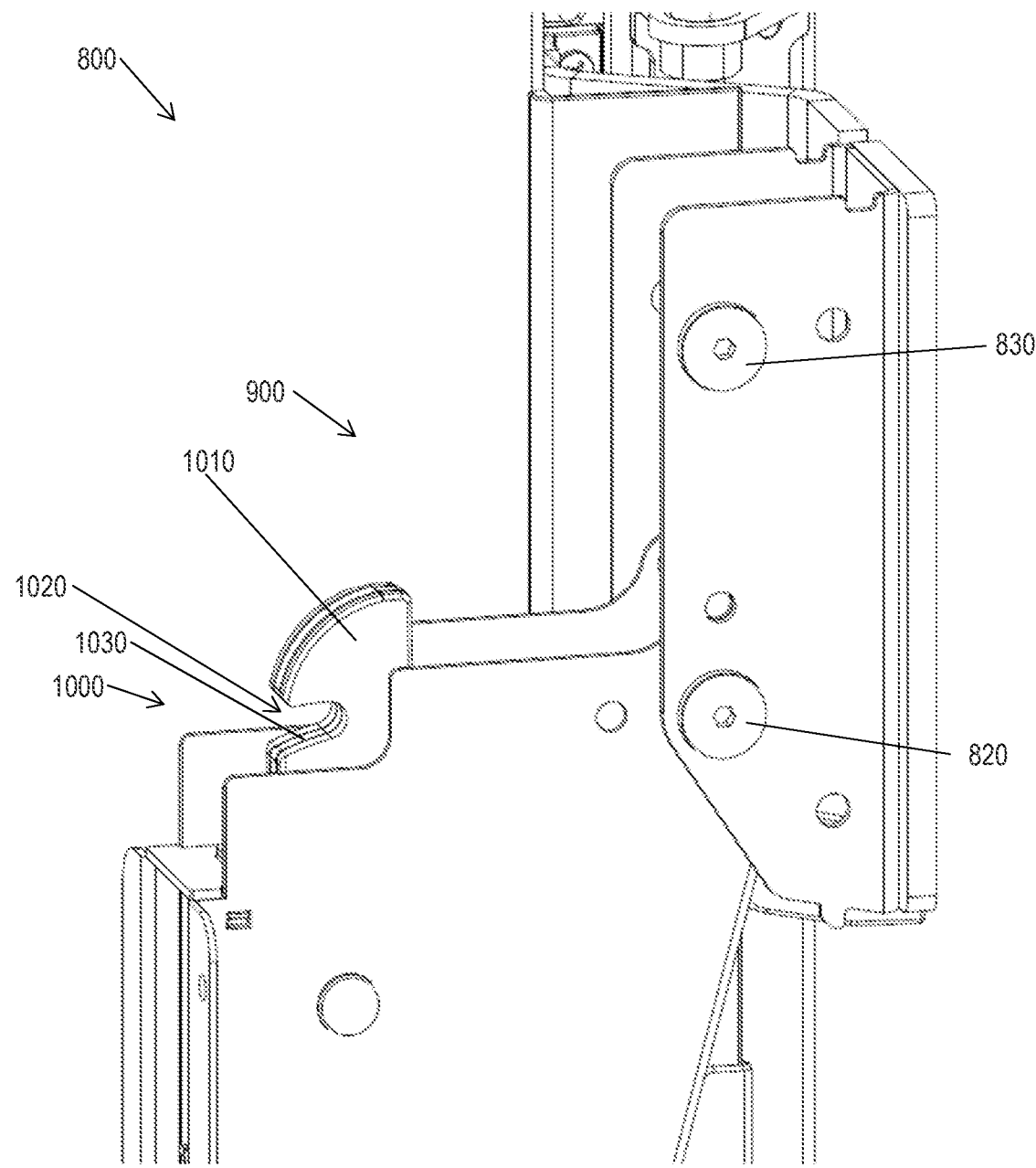
FIG. 10 shows a detailed perspective view of the tilting work station of FIG. 8 with a lock assembly in an unlocked configuration.

FIG. 10 shows a detailed perspective view of the tilting work station 800 of FIG. 8 with the lock assembly 900 in an unlocked configuration. The lock assembly 900 can include a latch assembly 1000, and the latch assembly 1000 can include a first arm 1010. The first arm 1010 can define a pin channel 1020, and the pin channel 1020 can be sized and shaped to receive the hook pin 830. The locking assembly 900 can be in the unlocked configuration when the hook pin 830 is not received within the pin channel 1020. Additionally, the lock assembly 900 can include a locked configuration, and the lock assembly 900 can be in the locked configuration when the hook pin 830 is received within the pin channel 1020. The reception of the hook pin 830 within the pin channel 1020 can prevent the support bracket 300 from rotating about the hinge 820. For instance, the hook pin 830 can engage with a channel wall 1030 of the pin channel 1020, and the engagement can maintain the worksurface 110 (shown in FIG. 8) in a horizontal position.

Figure 11:
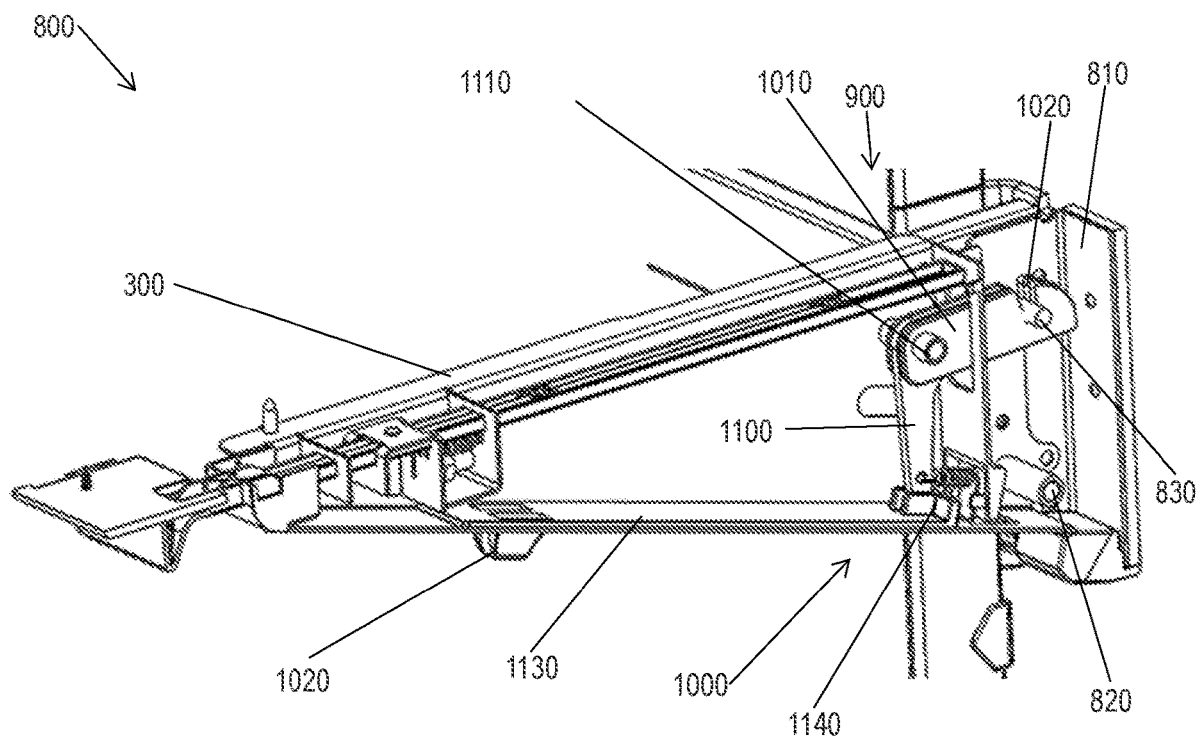
FIG. 11 shows a perspective view of the tilting work station of FIG. 8 with the lock assembly in the locked configuration.

FIG. 11 shows a perspective view of the tilting work station 800 of FIG. 8 with the lock assembly 900 in the locked configuration. Portions of the tilting work station 800 have been removed from FIG. 11 for clarity. For instance, the worksurface 110 shown in FIG. 9, and sides of the support bracket 300 have been removed from FIG. 11 for clarity. As shown in FIG. 11, the hook pin 830 is received within the pin channel 1020. Accordingly, the support arm 300 is located in a horizontal position.

As described in this document, the latch assembly 1000 can include the first arm 1010. Additionally, the latch assembly 1000 can include a second arm 1100 coupled with the first arm 1010. For instance, the first arm 1010 can be rotatingly coupled with the second arm 1100 with an arm hinge 1110. The arm hinge 1110 can be coupled with the support bracket 300, and the arms 1010, 1100 can rotate with respect to the support bracket 300. In another example, the first arm 1010 and the second arm 1100 can be formed as integral parts of a single component, and the arms 1010, 1100 can rotate about the arm hinge 1110.

The latch assembly 1000 can include a latch operator 1120, and manipulation of the latch operator 1120 can displace the arms 1010, 1100 relative the support bracket 300. For instance, the operator 1120 can be coupled with a latch bar 1130, and the latch bar 1130 can translate with respect to the support bracket 300 (e.g., the latch bar 1130 can slide within the support 300 when the latch operator 1120 is manipulated by a user). The latch bar 1130 can include a catch 1140, and the catch 1140 can engage with the arm 1110 to displace the arm 1010. In this example, because the arms 1010, 1100 are coupled together, displacement of the arm 1100 correspondingly displaces the arm 1010 (e.g., the arms 1010, 1100 rotate about the arm hinge 1110 when the arm 1100 is displaced). As described in greater detail in this document, displacement of the arms 1010, 1100 can disengage the hook pin 830 from the pin channel 1030, and allow the lock assembly 900 to transition from the locked configuration to the unlocked configuration.

Figure 12:
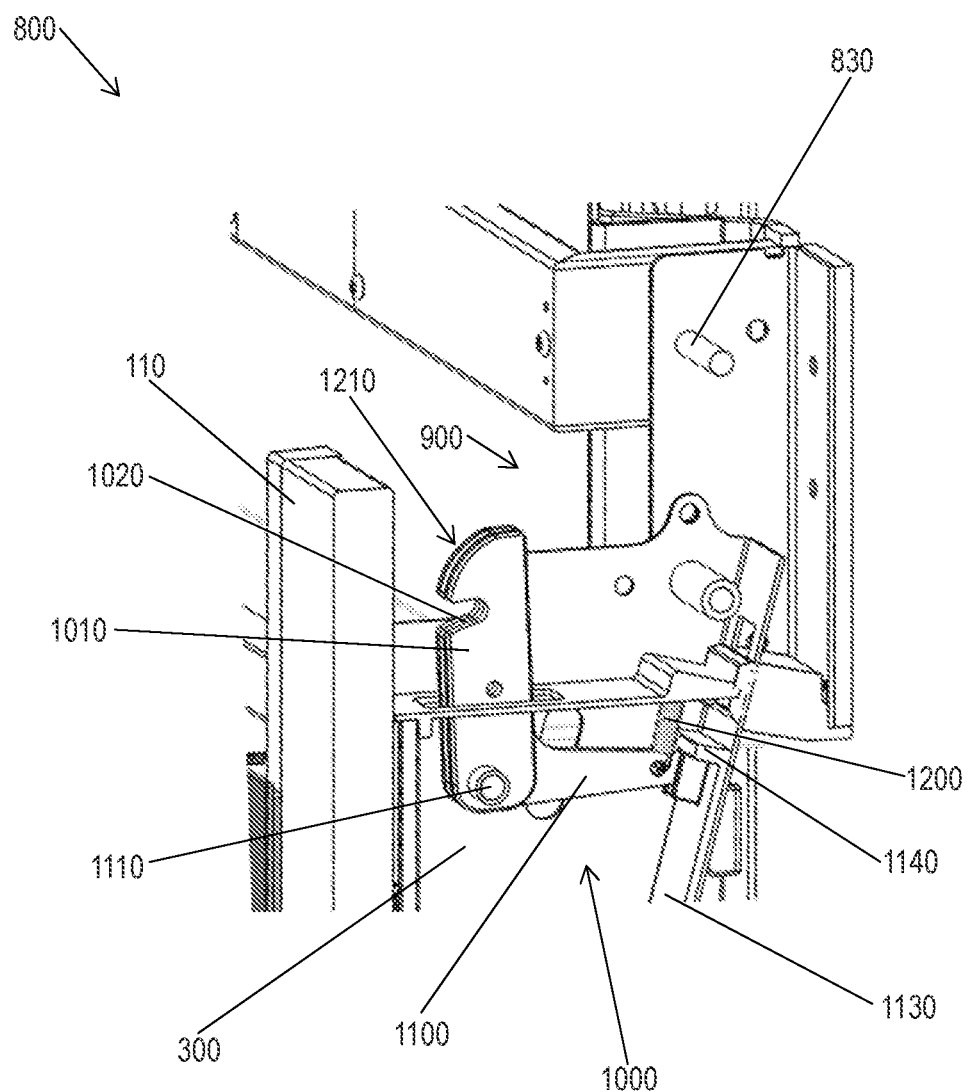
FIG. 12 shows a detailed perspective view of the tilting work station of FIG. 8 with the lock assembly in an unlocked configuration.

FIG. 12 shows a detailed perspective view of the tilting work station 800 of FIG. 8 with the lock assembly 900 in an unlocked configuration. The latch assembly 1000 can include a biasing member 1200, and the biasing member 1200 can bias the first arm 1010 toward engagement with the lock pin 830. As described herein, the pin channel 1020 can receive the hook pin 830. In an example, the biasing member 1200 can bias the arm 1010 to maintain the hook pin 830 within the pin channel 1020. Manipulation of the latch operator 1120 can overcome the bias of the biasing member 1200, and allow for the hook pin 830 to disengage from the pin channel 1030.

Additionally, the arm 1010 can include a cam surface 1210, and the cam surface 1210 can be configured to engage with the hook pin 830. The engagement of the cam surface 1210 with the hook pin 830 can displace the arm 1010, and allow for reception of the hook pin 830 in the pin channel 1020. In an example, the work surface 110 can be transitioned from a vertical (e.g., storage) position to a horizontal (e.g., working) position. The cam surface 1210 can allow for the locking assembly 900 to transition to the locking configuration when the work surface 110 (shown in FIG. 1) is raised to the horizontal position. The hook pin 830 can engage with the cam surface 1210 when the work surface is raised, and align with the pin channel 1020. The biasing member 1020 can bias the arm 1010 toward engagement with the hook pin 830, and the hook pin 830 can be received in the pin channel 1020. Accordingly, the cam surface 1210 can allow the locking assembly 800 to transition into the locked configuration when the work surface 110 is raised.

Figure 13:
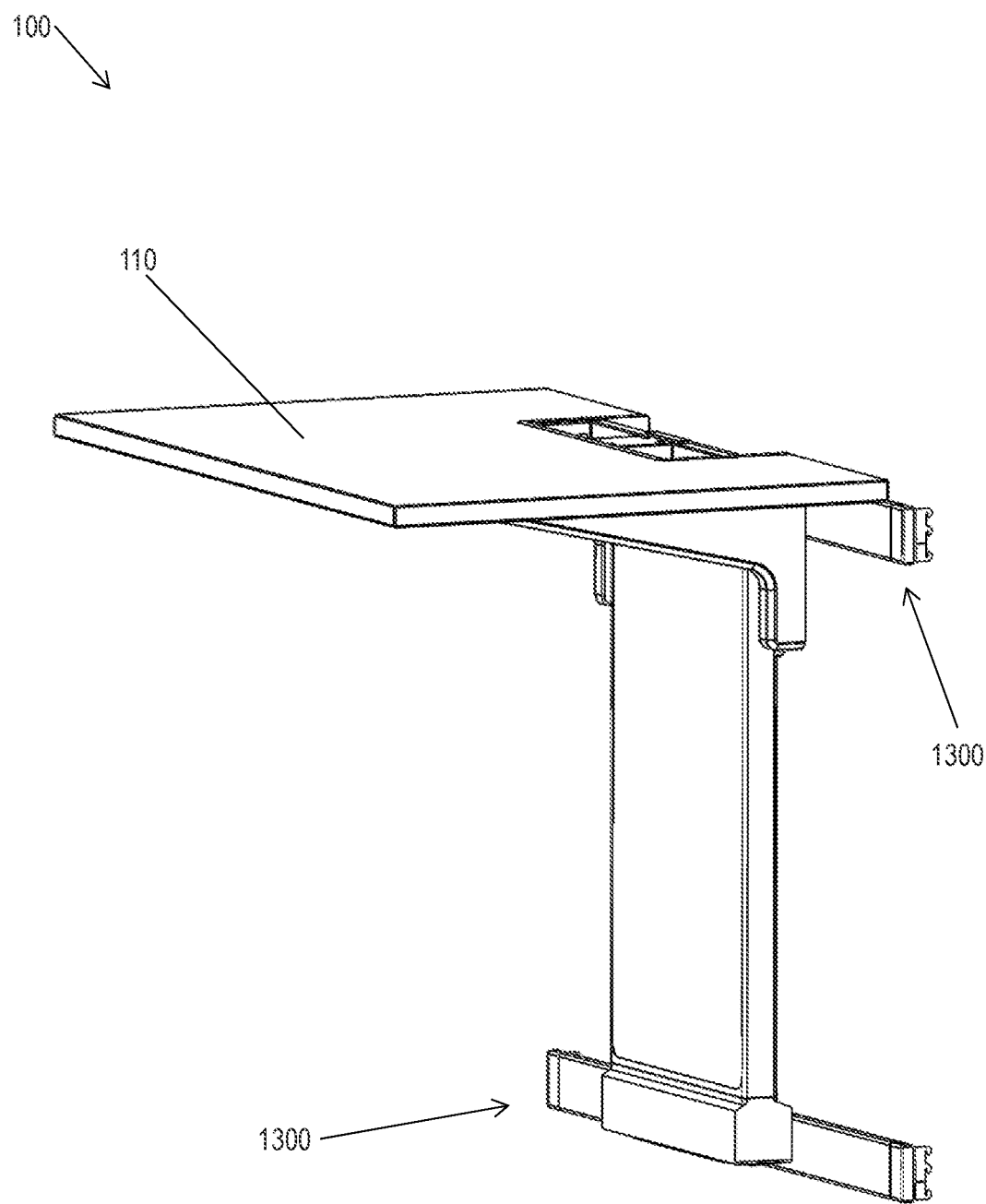
FIG. 13 shows a perspective view of the height adjustable wall mount assembly of FIG. 1 including an attachment system.

FIG. 13 shows a perspective view of the height adjustable wall mount assembly 100 of FIG. 1 including an attachment system 1300. As described in this document, the height adjustable wall mount assembly 100 can be directly attached to a structure (e.g., a wall). In another example, the wall mount assembly 100 can be attached to a structure (e.g., a wall, a wall panel, a cubicle wall, or the like) with the attachment system 1300. As discussed in greater detail in this document, the attachment system 1300 can allow the wall mount assembly 100 to couple with a structure having varying dimensions or characteristics.

Figure 14:
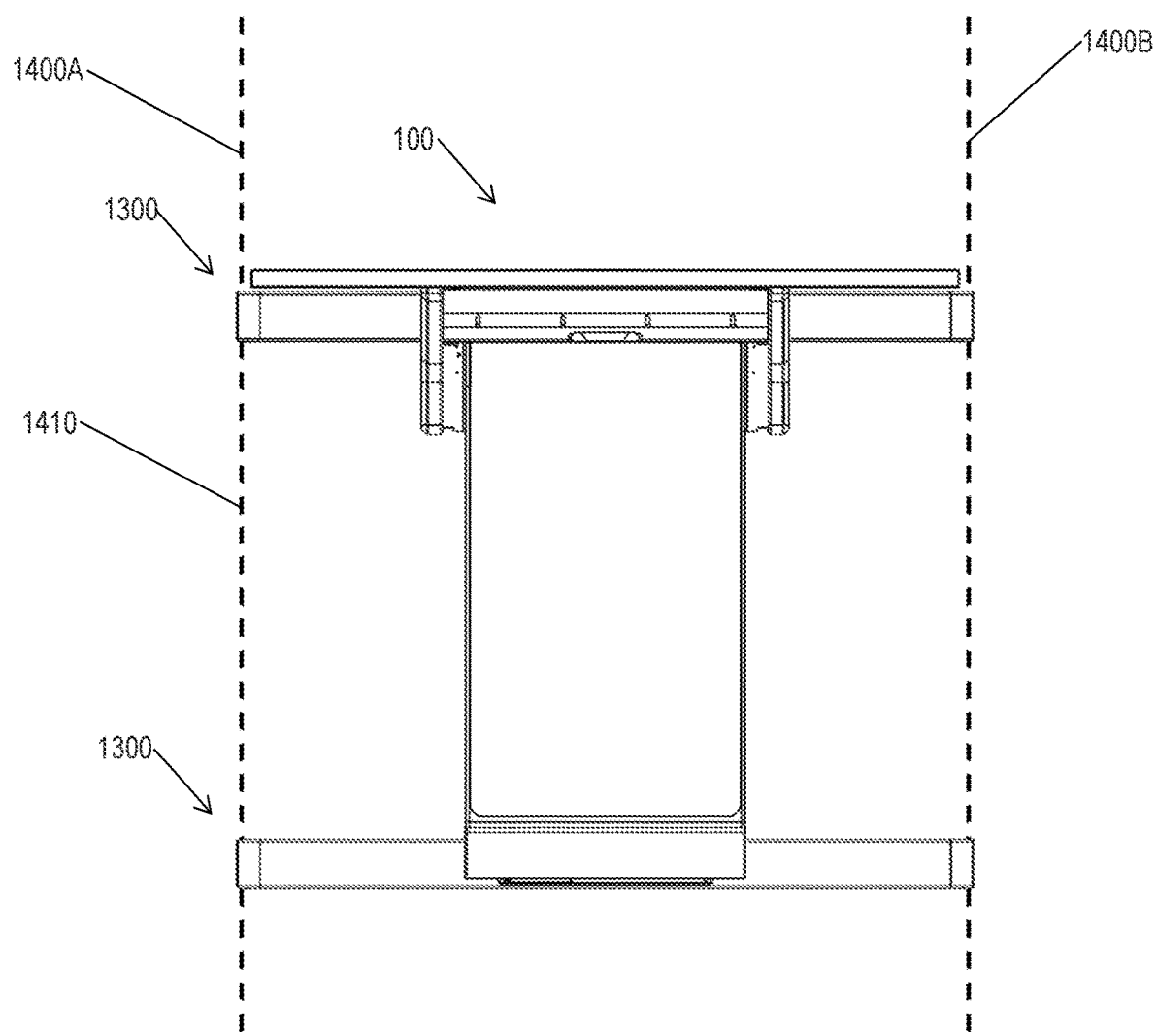
FIG. 14 shows a front view of the wall mount assembly including the attachment system of FIG. 13.

FIG. 14 shows a front view of the wall mount assembly 100 including the attachment system 1300 of FIG. 13. As described in this document, the attachment system 1300 can allow the wall mount assembly 100 to couple with a structure having varying dimensions or characteristics. In an example, the structure can include slotted brackets 1400A, 1400B that include a plurality of slots 1410, and the plurality of slots 1410 can be arranged in series (e.g., spaced apart and arranged in a column). The attachment system 1300 can engage with the slots 1410 and allow the mount assembly 100 to couple with the structure.

Figure 15:
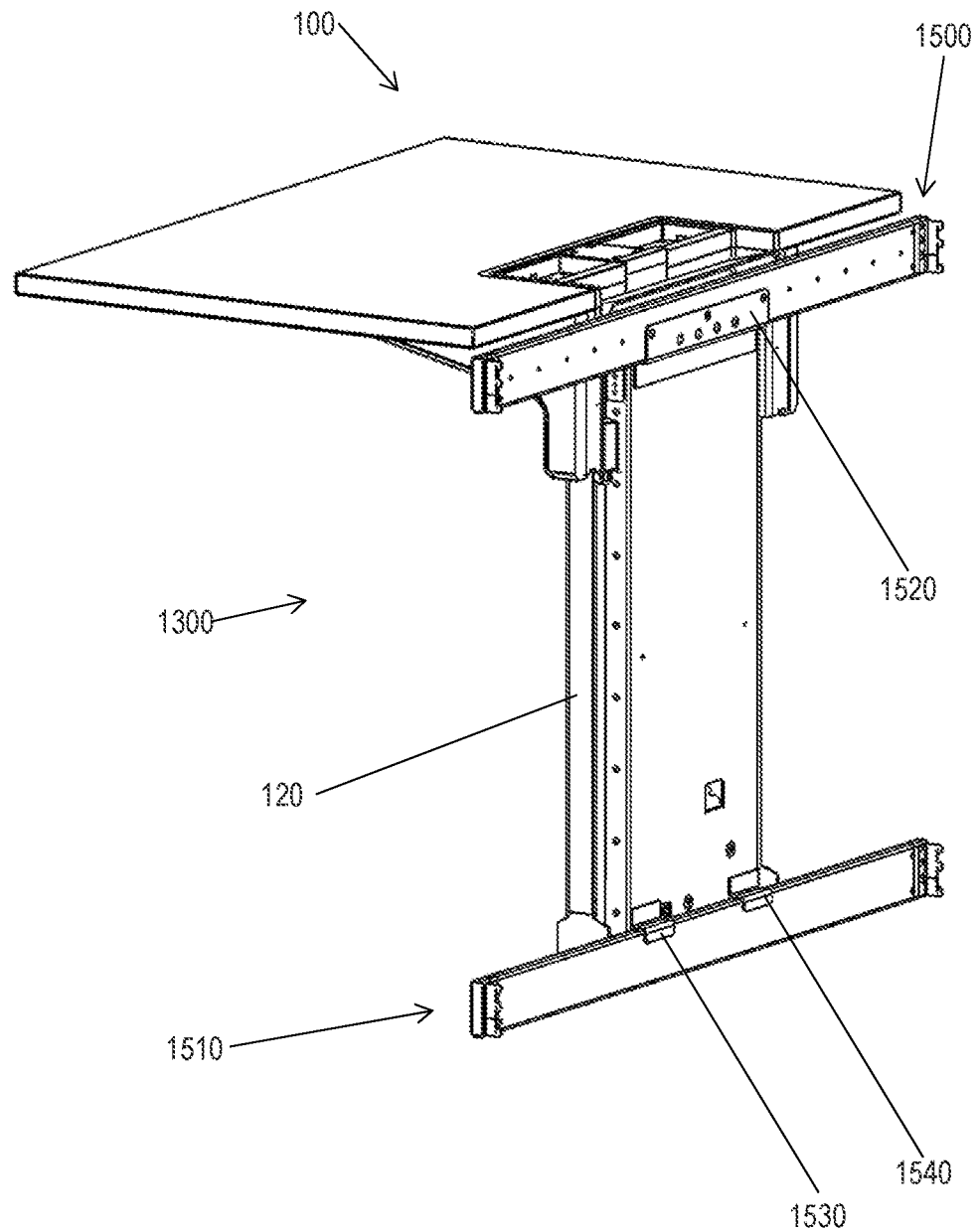
FIG. 15 shows another perspective view of the height adjustable wall mount assembly of FIG. 1 including an attachment system of FIG. 13.

FIG. 15 shows another perspective view of the height adjustable wall mount assembly 100 of FIG. 1 including an attachment system 1300. In an example, the attachment system 1300 can include a first interface assembly 1500 and a second interface assembly 1510. The interface assemblies 1500, 1510 can be coupled to the structure on a first side. Additionally, the interface assemblies 1500, 1510 can be coupled to the riser 120 on a second side to couple the mount assembly 100 to the structure. In an example, the riser 120 can include a first engaging bracket 1520, a second engaging bracket 1530, and a third engaging bracket 1540. The engaging brackets 1520, 1530, 1540 can be sized and shaped to receive the interface assemblies 1500, 1510, and the reception of the interface assemblies 1500, 1510 by the engaging brackets 1520, 1530, 1540 can couple the riser 120 with the interface assemblies 1500, 1510.

Figure 16A:
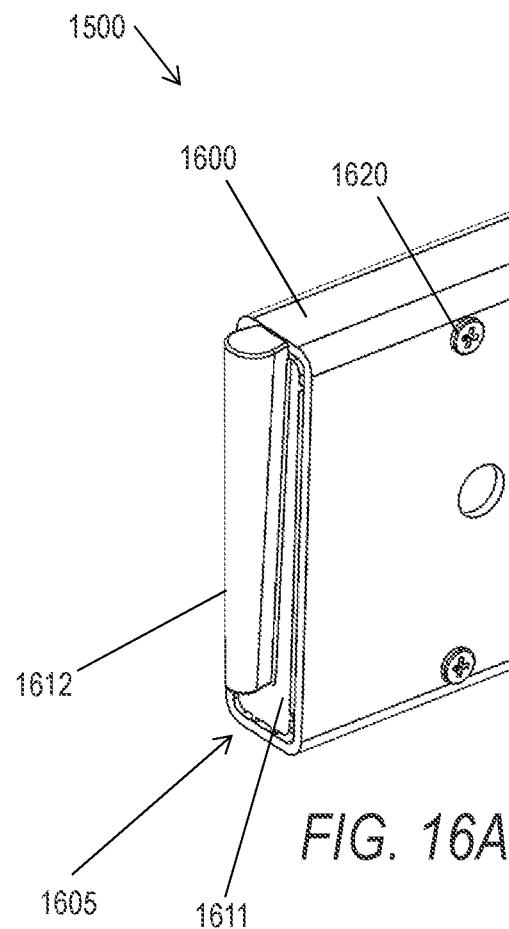
FIGS. 16A-16C show detailed perspective views of an interface assembly.
Figure 16B:
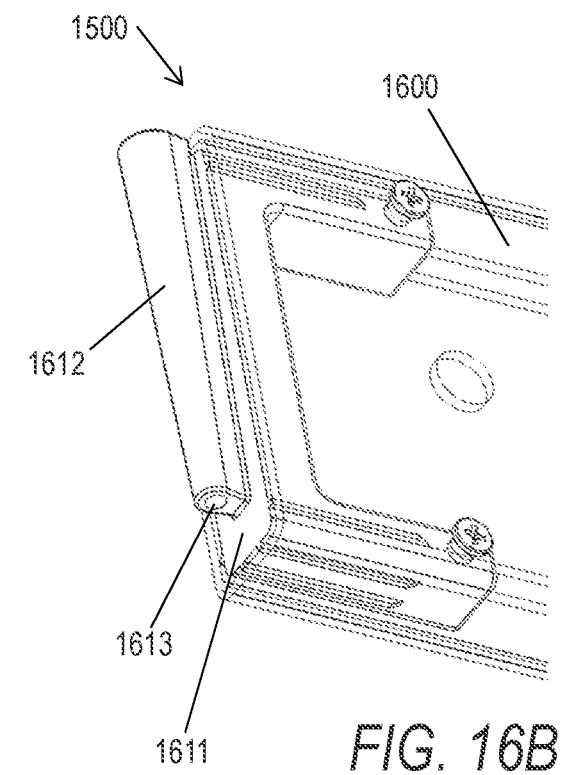
Figure 16C:
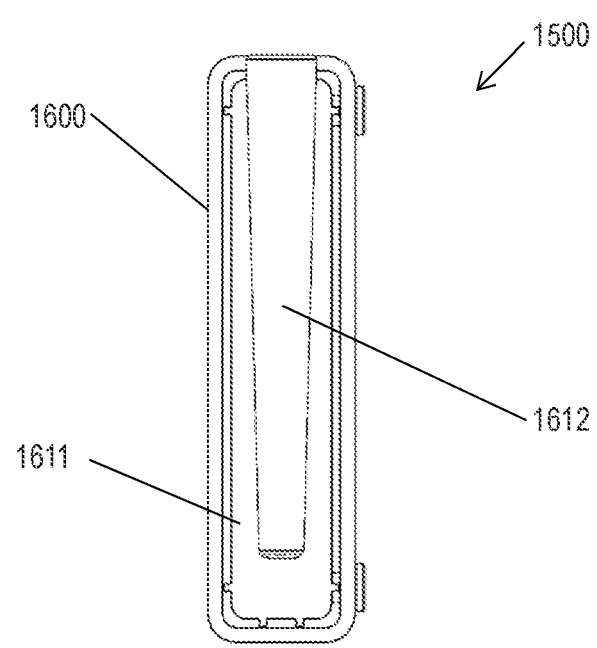

FIGS. 16A-16C show detailed perspective views of the interface assembly 1500. The interface assembly 1500 can include an elongated support member 1600 and an insert 1610. The support member 1600 can be sized and shaped to receive the insert 1610, and the insert 1610 can be located in an end 1605 of the support member 1600. An outside profile of the insert 1610 can at least partially correspond with the inside profile of the support member 1600. The insert 1610 can be located in the support member 1600 and one or more fasteners 1620 can be used to couple the insert 1610 with the support member 1600.

The insert 1610 can include an insert body 1611 and a key 1612 (e.g., a cone, protrusion, or the like). The key 1612 can extend from the insert body 1611. the key 1612 can have a slight taper from a first end to a second end of the key 1612. A threaded hole 1613 can be defined in the key 1612, and the threaded hole 1613 can receive a fastener to couple the insert with other components of the attachment system 1300.

FIGS. 17A-17C show perspective views of an attachment mechanism 1700. The attachment mechanism 1700 can be included in the interface assembly 1500. The attachment mechanism 1700 can couple with the slotted brackets 1400A, 1400B (shown in FIG. 14). For instance, the attachment mechanism 1700 can include a first tab 1710 having a first hook protrusion 1720, and a second tab 1730 having a second hook protrusion 1740. The hook protrusions 1720, 1740 can be received in the slots 1410, and the reception of the hook protrusions 1720, 1740 in the slots 1410 can couple the attachment mechanism 1700 with the slotted brackets 1400A, 1400B.

As shown in FIGS. 17A and 17C, the first hook protrusion 1720 can be oriented in a first direction and the second hook protrusion 1740 can be oriented in a second direction. For example, the first hook protrusion 1720 can include a first channel 1721 that opens in the first direction (e.g., downward). The second hook protrusion 1740 can include a second channel 1741 that opens in the second direction (e.g., upward).

The tabs 1710, 1730 can be coupled with an attachment body 1750. One or more of the tabs 1710, 1730 can translate with respect to the attachment body 1750, for example to couple the attachment mechanism 1700 with the slotted brackets 1400A, 1400B (shown in FIG. 14). In an example, a nut 1760 can be located in the attachment body 1750 and located proximate to a first flange 1711 of the tab 1710. A bolt 1770 can be inserted through a second flange 1731 of the tab 1730 and the bolt 1770 can engage with the nut 1760. A user can manipulate (e.g., turn, twist, drive, or the like) the bolt 1770 and manipulation of the bolt 1770 can translate the tab 1720 with respect to the attachment body 1750.

As described in this document, the attachment mechanism 1700 can couple with the slotted brackets 1400A, 1400B (shown in FIG. 14). In an example, the attachment mechanism can clamp to the slotted brackets 1400A, 1400B. The hook protrusions 1720, 1740 can be located in the slots 1410 (shown in FIG. 14) and the second tab 1730 can be translated with respect to the attachment body 1750 to close the distance between the tabs 1710, 1730 (and accordingly between the hook portions 1720, 1740).

Referring again to FIG. 17A-17C, the attachment body 1750 can define a keyway 1780. The keyway 1780 can be sized and shaped to receive the key 1612 of the insert 1610 (shown in FIGS. 16A-16C). The engagement of the key 1612 with the keyway 1780 can mate the insert 1610 with the attachment mechanism 1700. The keyway 1780 can have a keyway profile that corresponds to the key profile of the key 1612. In an example, the keyway 1780 can be tapered to correspond to the tapered profile of the key 1612.

A first through hole 1790A can be defined in the attachment body 1750. The first through hole 1790A can allow access to the bolt 1770, and allow a user to manipulate the bolt 1770 and translate the tabs 1710, 1730 relative to the attachment body. Additionally, a second through hole 1790B can be defined in the attachment body 1750. A fastener (e.g., a screw) can be inserted into the through hole 1790B to couple the insert 1610 (shown in FIGS. 16A-16C) with the attachment mechanism 1700. In an example, the fastener can engage with the threaded hole 1613 of the insert 1610 and the engagement of the fastener with the insert 1610 can couple the insert 1610 with the attachment mechanism 1750 (e.g., prevent the translation of the key 1612 within the keyway 1780.

Figure 18A:
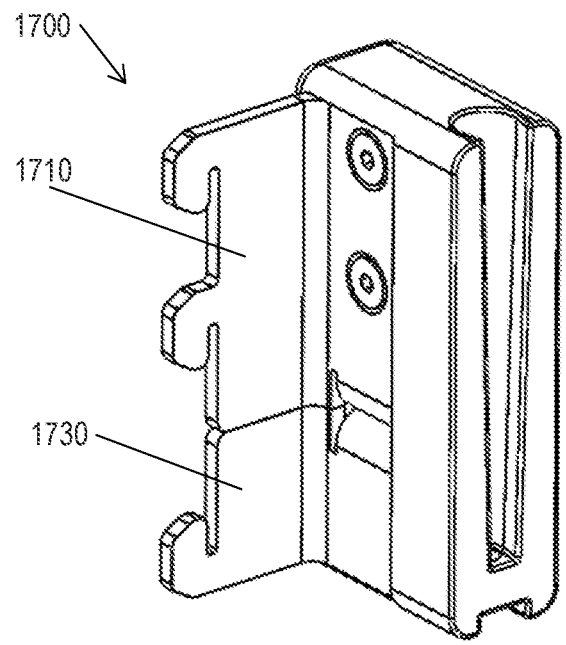
FIGS. 18A-18B show additional perspective views of the attachment mechanism of FIGS. 17A-17C.
Figure 18B:
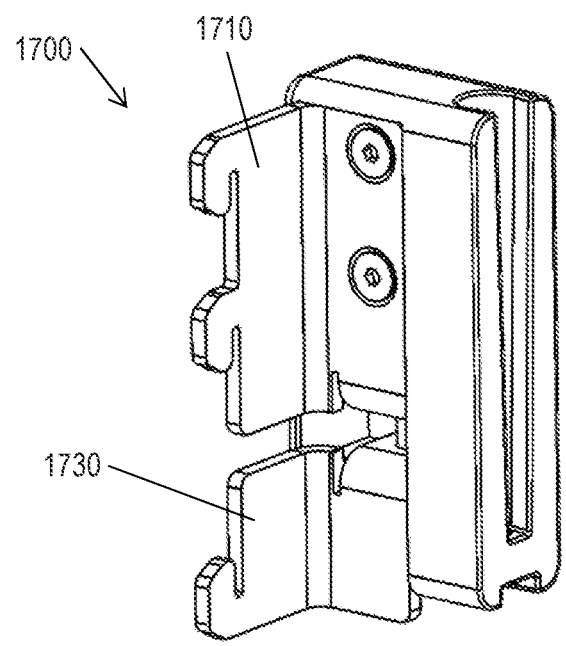

FIGS. 18A-18B show additional perspective views of the attachment mechanism 1700 of FIGS. 17A-17C. As described in this document, the tab 1730 can translate with respect to the attachment body 1750 (and the tab 1710). In an example, and as shown in FIG. 18A, the tab 1730 can be translated to abut against the tab 1710. In another example, the tab 1730 can be translated to be remote from the tab 1710, for instance to allow the attachment mechanism 1700 to be inserted into the slots 1410 (shown in FIG. 14). The tab 1730 can be translated (e.g., by manipulating the bolt 1770, shown in FIG. 17) to abut against the tab 1710, for instance to couple (e.g., clamp) the attachment mechanism 1700 to the slotted bracket 1400A, 1400B.

Figure 19:
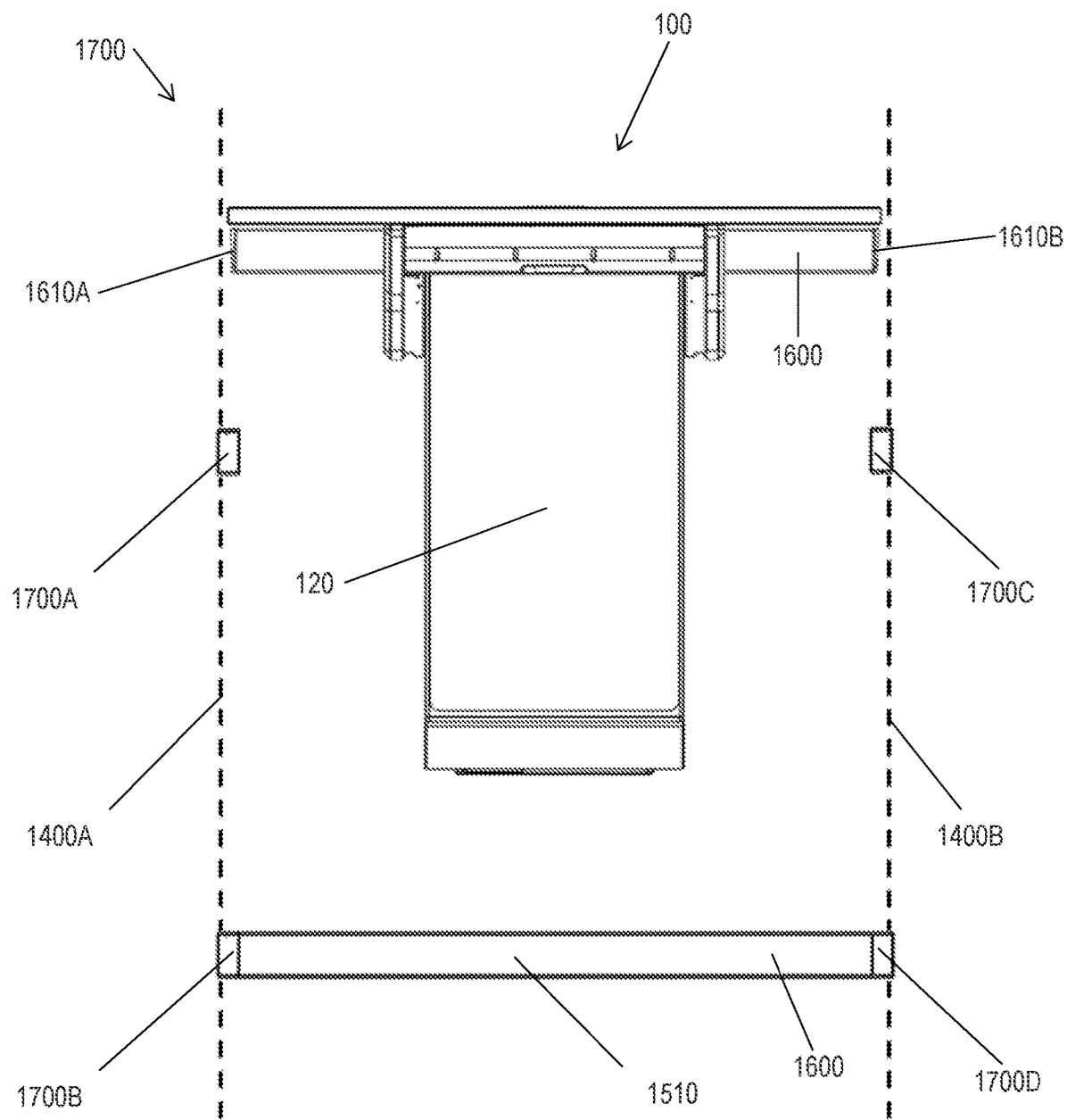
FIG. 19 shows a front view of the wall mount assembly of FIG. 1 and the attachment system of FIG. 13 during an installation operation.

FIG. 19 shows a front view of the wall mount assembly 100 of FIG. 1 and the attachment system 1300 of FIG. 13 during an installation operation. As described herein the attachment mechanism 1700 can be coupled with the slotted brackets 1400A, 1400B. In an example, a plurality of attachment mechanisms 1700 can be coupled to the slotted brackets 1400A, 1400B. For instance, a first attachment mechanism 1700A and a second attachment mechanism 1700B can be coupled to the slotted bracket 1400A. A third attachment mechanism 1700C and a fourth attachment mechanism 1700D can be coupled with the slotted bracket 1400B.

As described in this document, the interface assemblies 1500, 1510 can include the support member 1600. Additionally, the insert 1610 can be coupled with the supporting member 1600. In an example, a first insert 1610A and a second insert 1610B can be coupled with the supporting member 1600. The support member 1600 of the interface assembly 1510 can be coupled with the attachment mechanisms 1700B, 1700D by coupling the inserts 1610A, 1610B with the attachment mechanisms 1700B, 1700D. Further, the support member 1600 of the interface assembly 1500 can be coupled with the attachment mechanisms 1700A, 1700C by coupling the inserts 1610A, 1610B with the attachment mechanisms 1700A, 1700C. The support member 1600 can have an adjustable length (e.g., the support member 1600 can include telescoping sections that allow for a variable length). Accordingly, the support member 1600 can span the distance between the attachment mechanism 1700A, 1700C if the distance between the slotted brackets 1400A, 1400B changes between structures (e.g., a first cubical wall having a first distance between the brackets 1400A, 1400B and a second cubical wall having a second distance between the brackets 1400A, 1400B).

The support member 1600 of the interface assembly 1500 can engage with (e.g., be received in) the first bracket 1530 (shown in FIG. 15) of the riser 120. Still further, the support member 1600 of the interface assembly 1510 can engage with the engaging brackets 1540, 1550 (shown in FIG. 15). Accordingly, and as shown in FIG. 14, the riser 120 can be coupled to the slotted brackets 1400A, 1400B with the attachment system 1300.

Figure 20:
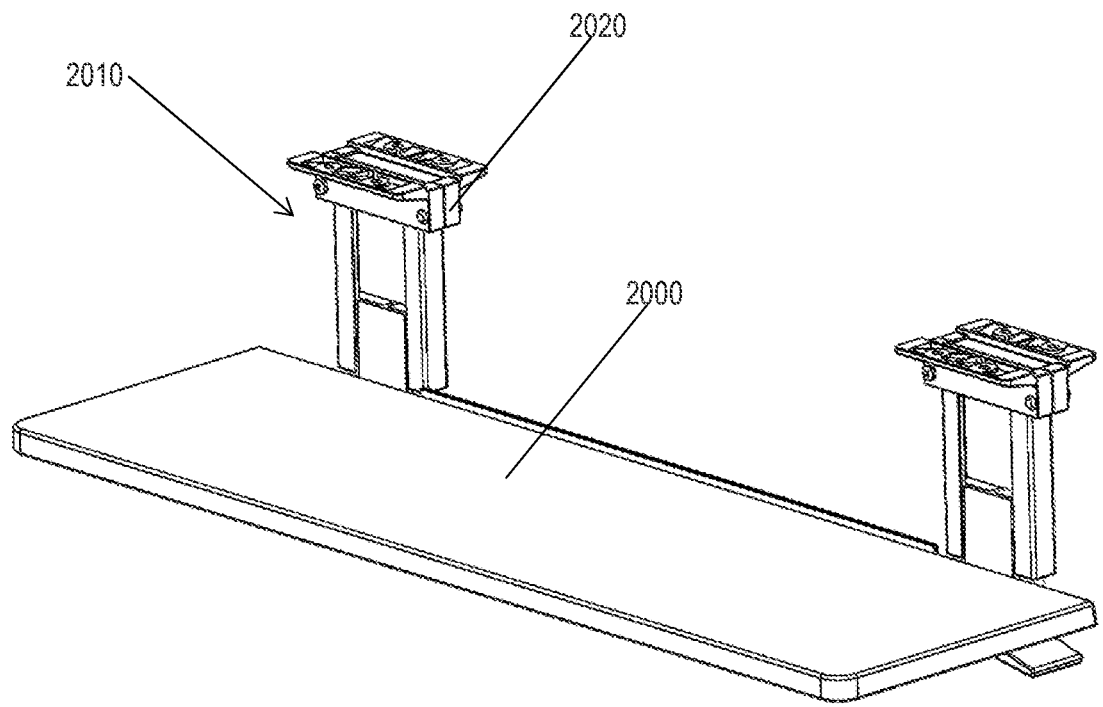
FIG. 20 shows a perspective view of an example of a keyboard tray including a height adjustment mechanism.

FIG. 20 shows a perspective view of an example of a keyboard tray 2000 including a height adjustment mechanism 2010. One or more suspension assemblies 2020 can be connected to the underside of a worksurface (e.g., the worksurface 110 shown in FIG. 1). As shown in FIG. 20, the keyboard tray 2000 can be coupled to the suspension assembly 2020.

Figure 21:
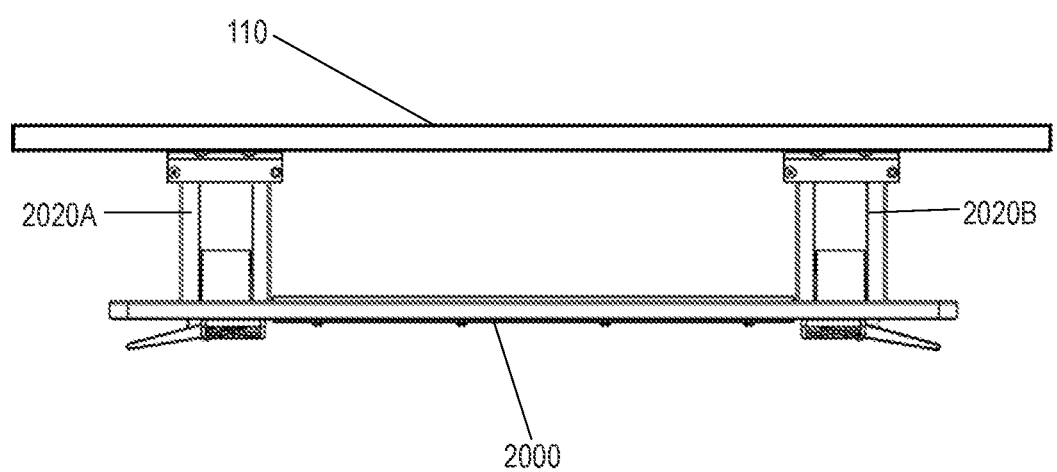
FIG. 21 shows a front view of the keyboard tray of FIG. 20.

FIG. 21 shows a front view of the keyboard tray 2000 of FIG. 20. In an example, two suspension assemblies 2020 can be connected to the worksurface 110. A first suspension assembly 2020A and a second suspension assembly 2020B can have similar construction (e.g., the assemblies 2020A, 2020B can be a mirror image of each other).

Figure 22:
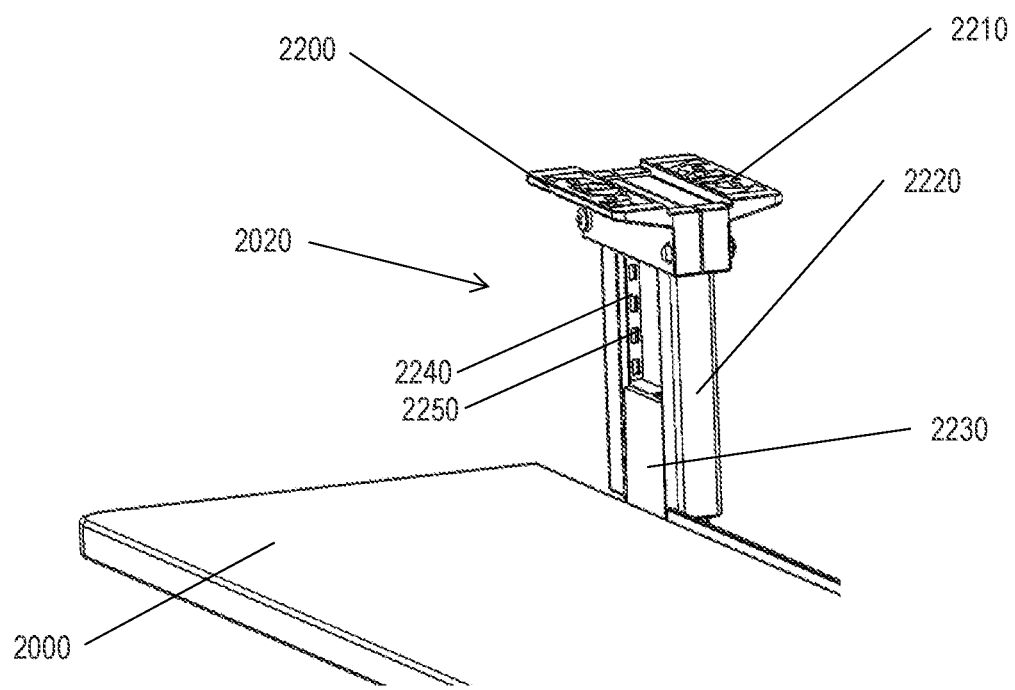
FIG. 22 shows a detailed perspective view of the keyboard tray of FIG. 20.

FIG. 22 shows a detailed perspective view of the keyboard tray 2000 of FIG. 20. The suspension assembly 2020 can include a first mounting bracket 2200 and a second mounting bracket 2210. The mounting brackets 2200, 2210 can hold an end of a first suspension bracket 2220, and can be connected to the underside of the worksurface 110 (shown in FIG. 21). The first suspension bracket 2220 can be formed in a hollow cross-section, and a second suspension bracket 2230 can be located in the hollow cross-section of the first suspension bracket 2220. The second suspension bracket 2230 can be slidably engaged with the first suspension bracket 2220, and the bracket 2230 can translate with respect to the bracket 2220. The first suspension bracket 2220 can further include a slotted bracket 2240 connected to a side of the first suspension bracket 2220. One or more slots 2250 can be formed on slotted bracket 2240. The keyboard tray 2000 can be connected to the second suspension bracket 2230. Accordingly, the keyboard tray 2000 can translate with respect to the bracket 2220.

Figure 23:
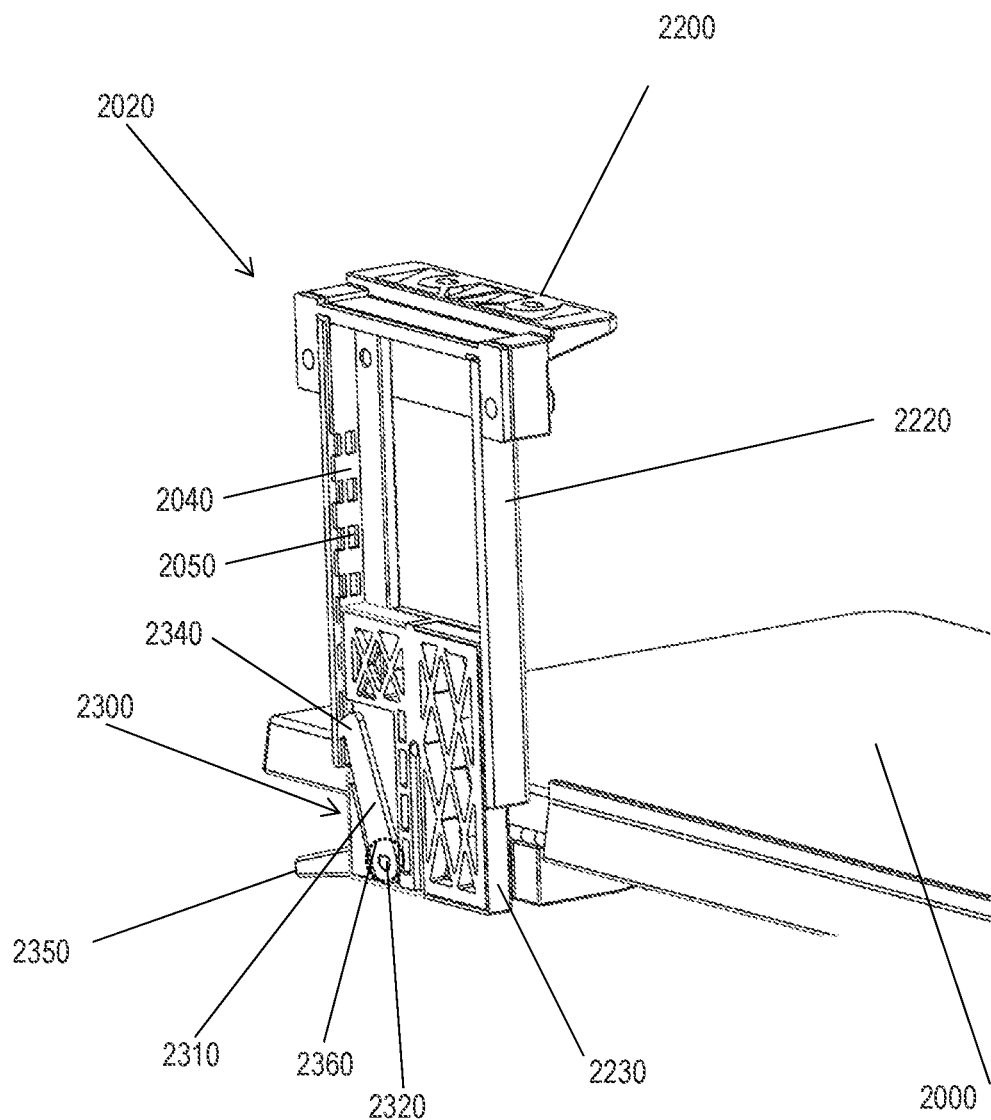
FIG. 23 shows another detailed perspective view of the keyboard tray of FIG. 20.

FIG. 23 shows another detailed perspective view of the keyboard tray 2000 of FIG. 20. Portions of the suspension assembly 2020 have been hidden for clarity. The second suspension bracket 2230 can include a hollow section 2300, and a hook arm 2310 can be located inside the hollow section 2300 of the second suspension bracket 2230. The hook arm 2310 can be rotatingly coupled with the second suspension bracket 2230, for instance at a hinge 2320. The hook arm 2310 can include a hook 2340, and the hook 2340 can engage with the slotted bracket 2240 to maintain the position of the second suspension bracket 2230 relative to the first suspension bracket 2220. A handle 2350 can be rotatingly coupled to the second suspension bracket 2230, and manipulation of the handle 2350 can rotate the hook arm 2310 about the hinge 2320. The handle 2350 can be fixedly attached to the hook arm 2310, and accordingly the handle 2350 and the hook arm 2310 can rotate around the hinge 2320 in unison.

As described in this document, the second suspension bracket 2230 can be slidingly engaged with the first suspension bracket 2220. The second suspension bracket 2230 can be repositioned with respect to the first suspension bracket 2220, and the engagement of the hook 2340 with the slotted bracket 2240 can maintain the position of the second suspension bracket 2230. In an example, the hook 2340 can be received in the slots 2250 to maintain the position of the bracket 2230 with respect to the bracket 2220.

A biasing member 2360 can be included in the suspension assembly 2020, and the biasing member 2360 can maintain the engagement of the hook 2340 with the slots 2250. In an example, a torsion spring can be located at an axis of the hinge 2320. The torsion spring can bias the hook arm 2310 in counter-clockwise direction so that hook 2340 can always be engaged with an individual slot of the one or more slots 2250. In this example, when the handle 2350 is rotated about the hinge 2320, the hook arm 2310 can rotate in clockwise direction together with the handle 2350, and the hook 2340 can disengage from the individual slot. Accordingly the second suspension bracket 2230 can translate relative to the first suspension bracket 2220.

Figure 24:
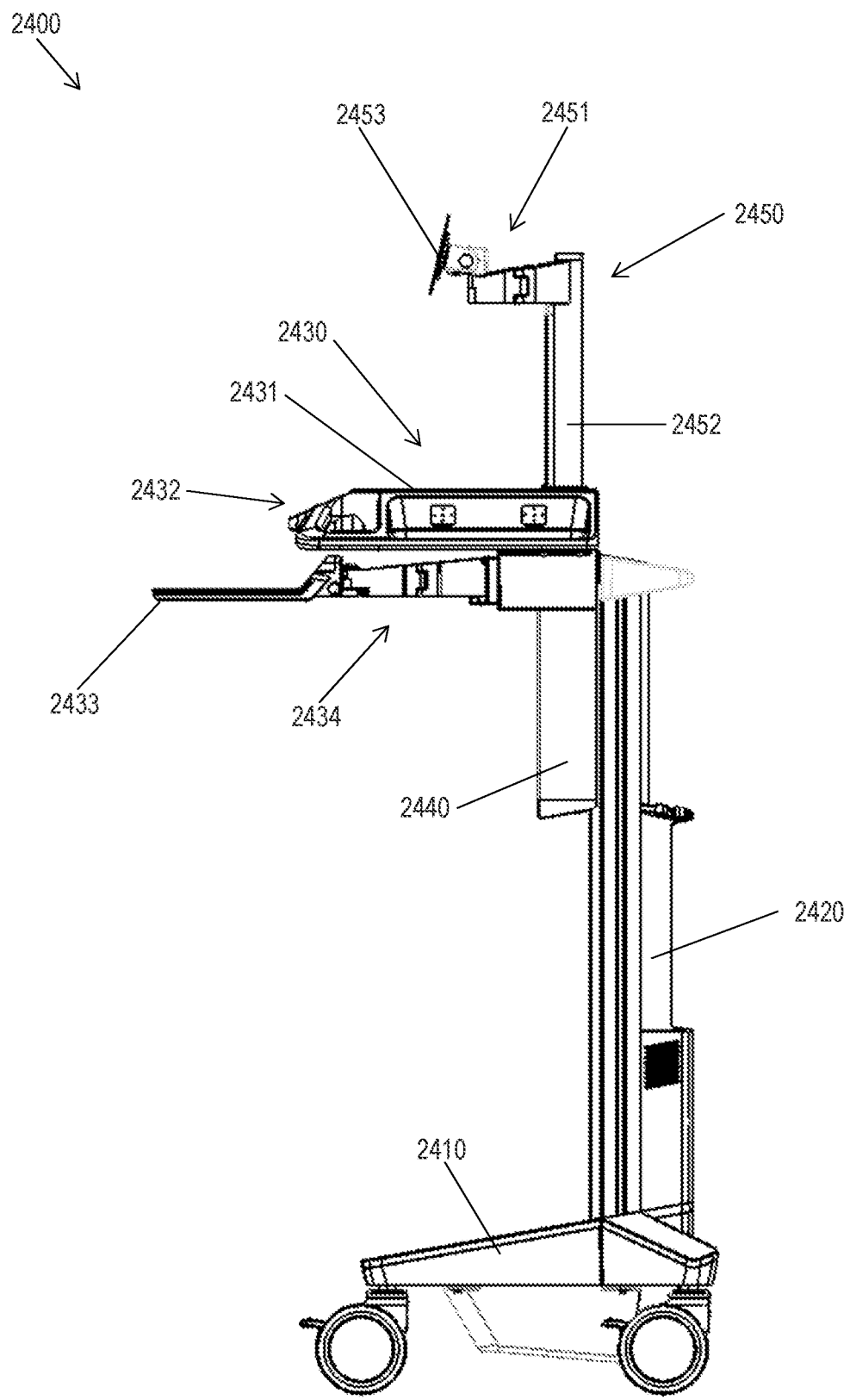
FIG. 24 shows a side view of an example of a mobile workstation.

FIG. 24 shows a side view of an example of a mobile workstation 2400. The mobile workstation 2400 can include a wheeled base 2410, and a riser 2420 connected to the wheeled base 2410. The riser 2420 can be similar to the riser 120 shown in FIG. 1. For instance, a sliding bracket (e.g., the sliding bracket 130 shown in FIG. 1) can be slidably engaged with the riser 2420. A head unit assembly 2430 and a cable storage box 2440 can be connected to the sliding bracket. Additionally, a counterbalance mechanism (e.g., the counterbalance mechanism 230 shown in FIG. 2) can be connected to the riser 2420 and can be coupled to the sliding bracket. As described herein, the counterbalance mechanism can provide height adjustment for the sliding bracket. The distance between the wheeled base 2410, and the head unit 2430 and the cable storage box 2440 can be selectively adjusted by translating the sliding bracket with respect to a portion of the riser 2420.

The head unit assembly 2430 can include a worksurface 2431 and a computer storage compartment 2432, for instance the storage compartment 2432 can be located beneath the worksurface 2431. Additionally, a keyboard tray 2433 can be located below the computer storage compartment 2432. A keyboard tray arm assembly 2434 can be connected to the head unit assembly 2430, and to the keyboard tray 2433. The keyboard tray arm assembly 2434 can provide some articulation for the keyboard tray 2433 relative to the worksurface 2431.

A display mount assembly 2450 can be coupled to the mobile workstation 2400, for instance the display mount assembly 2450 can be located above the worksurface 2431. A display mount 2453 can be connected to the head unit 2430 via a display arm assembly 2451 and a display mounting riser 2452. The display mounting riser 2452 can be coupled to the head unit 2430, for instance above the worksurface 2431. The display arm assembly 2451 can be coupled to the display mounting riser 2452 and to the display mount 2453. The display arm assembly 2451 can provide articulation for the display mount 2453 relative to the display mounting riser 2452. A display (e.g., the display 2600 shown in FIG. 26) can be attached to the display mount 2453 to position the display above the worksurface 2431. In some examples, the display mounting riser 2452 can provide height adjustment for the display relative to the worksurface 2431.

Figure 25:
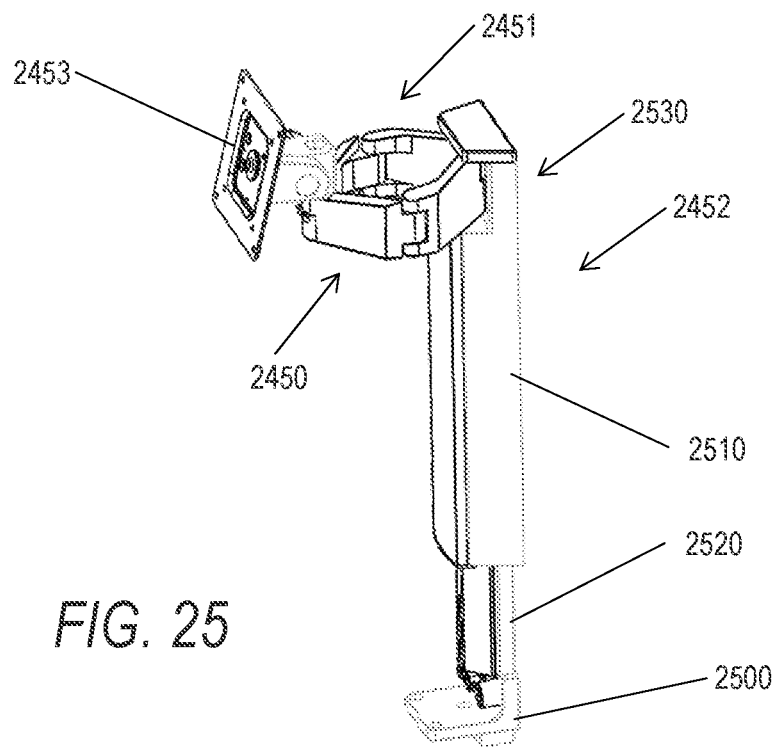
FIG. 25 shows a perspective view of a display mount assembly.

FIG. 25 shows a perspective view of the display mount assembly 2450. As described in this document, the display mounting riser 2452 can be connected to the head unit 2430 (shown in FIG. 24) to hold a display above the worksurface 2431. The display mounting riser 2452 can include a mounting block 2500, a first member 2510, and a second member 2520 that can be slidably coupled with the first member 2510. The second member 2520 can be coupled to the mounting block 2500, and the mounting block can be coupled to the head unit 2430. A counterbalance mechanism (e.g., a counterbalance mechanism similar to the counterbalance mechanism 230 shown in FIG. 2) can be coupled to the second member 2520 and the first member 2510 to selectively adjust the distance of the display mount from the worksurface 2431 (shown in FIG. 24). In some examples, the display arm assembly 2451 can be connected to an upper end 2530 of the display mounting riser 2452.

Figure 26:
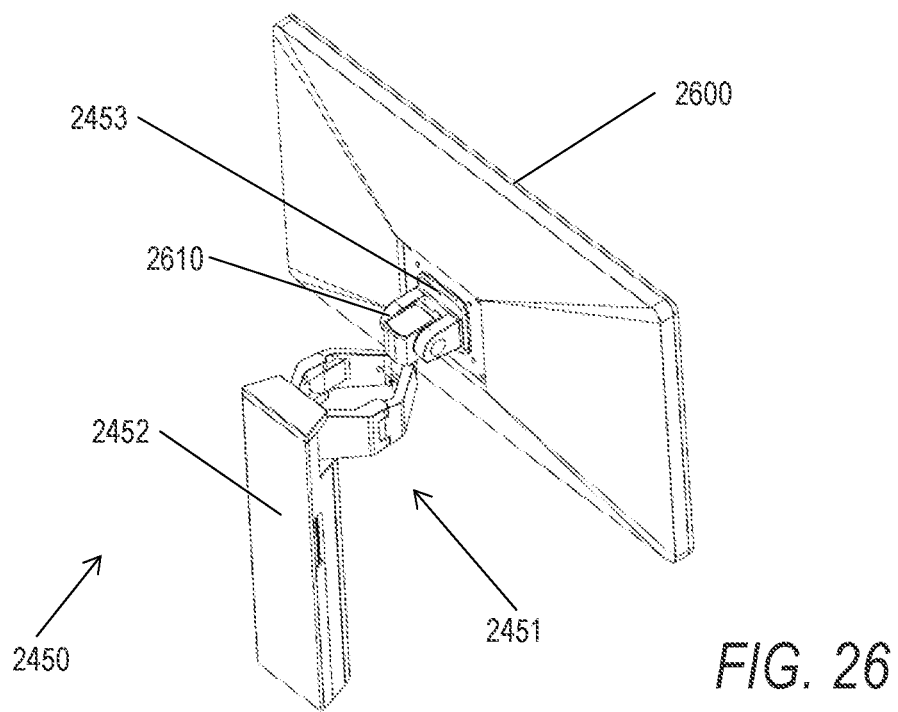
FIG. 26 shows another perspective view of the display mount assembly.

FIG. 26 shows another perspective view of the display mount assembly 2450. A display 2600 (e.g., a monitor, television, screen, or the like) can be coupled to the display mount 2453. The position of the display 2600 relative to the display mounting riser 2452 can be adjusted by articulating the display arm assembly 2451. The display mount 2453 can further include a tilting bracket 2610 to adjust an angle of the display 2600 relative to the display mounting riser 2452.

Figure 27:
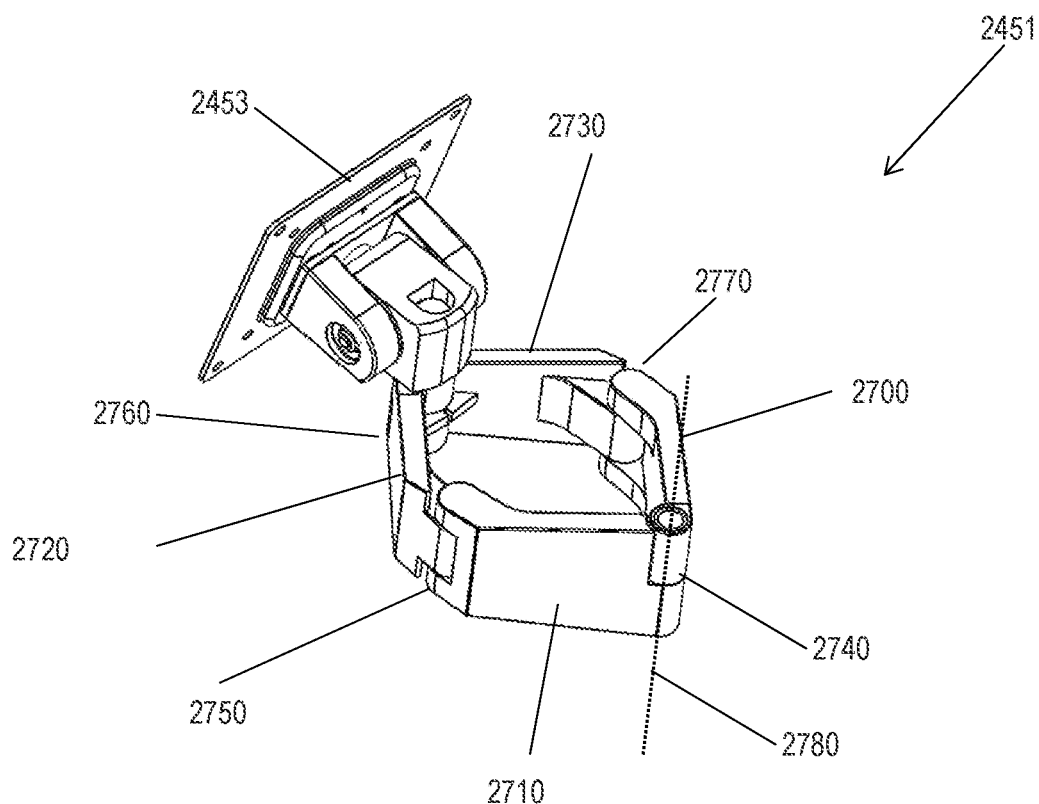
FIG. 27 shows a perspective view of a display arm assembly in an expanded configuration.

FIG. 27 shows a perspective view of the display arm assembly 2451 in an expanded configuration. The display arm assembly 2451 can include a first arm 2700, a second arm 2710, a third arm 2720, and a fourth arm 2730. The first arm 2700 and the second arm 2710 can be rotatingly coupled at a first hinge 2740. The second arm 2710 and the third arm 2720 can be rotatingly coupled at a second hinge 2750. The third arm 2720 and the fourth arm 2730 can be rotatingly coupled at a third hinge 2760. The fourth arm 2730 and the first arm 2700 can be rotatingly coupled to each other at a fourth hinge 2770. A rotation axis 2780 of the hinges 2740, 2750, 2760, 2770 can be parallel to each other. The rotation axes 2780 can be parallel to the direction of motion of the height adjustment in the display mounting riser 2452 (shown in FIG. 24). The display arm assembly 2451 can be connected to the display mounting riser 2452 at the first hinge 2740. Accordingly, the first arm 2700 and the second arm 2710 can be rotatably coupled to the display mounting riser 2452 at the first hinge 2740. The display mount 2453 can be connected to the display arm assembly at the third hinge 2760. Accordingly, the third arm 2720 and the fourth arm 2730 can be rotatably coupled to the display mount 2453 at the third hinge 2760.

Figure 28:
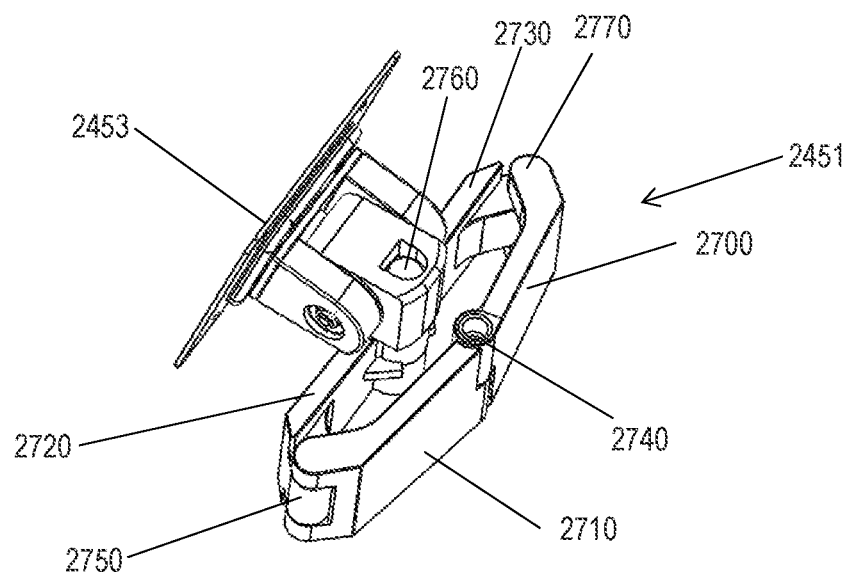
FIG. 28 shows a perspective view of the display arm assembly in a contracted configuration.

FIG. 28 shows a perspective view of the display arm assembly 2451 in a contracted configuration. The display arm assembly 2451 can articulate to allow for a change in distance between the display mount 2453 and the display mounting riser 2452. As shown in FIG. 28, the display mount 2453 is located proximate to the display mounting riser 2452. As shown in FIG. 27, the display mount 2453 can be located remote from the display mounting riser 2452.

Referring again to FIG. 28, the first arm 2700 and the second arm 2710 can rotate around the first hinge 2740, and accordingly the second hinge 2710 and the fourth hinge 2730 can be moved away from each other. The third arm 2720 and the fourth arm 2730, which are coupled to the first arm 2700 and the second arm 2710 at the second hinge 2750 and the fourth hinge 2760, respectively, can also rotate relative to each other. Accordingly, the third hinge 2760 can be moved closer to the first hinge 2740 as illustrated in FIG. 28.

FIGS. 29A-29C show perspective and top views of the display arm assembly 2451 in an offset configuration. The display arm assembly 2451 can allow the display mount 2453 to move laterally (e.g., right or left) with respect to the display mounting riser 2452. The first arm 2700 and the second arm 2710 can rotate (e.g., in a counterclockwise direction), and accordingly the third hinge 2760 can move. The display mount 2453 can move laterally (e.g., to the right) of the display mounting riser 2452, for example as illustrated in FIG. 29C. Additionally, the display mount 2453 can be rotated about the third hinge 2760 to rotate the display 2600 with respect to the display arm assembly, for instance to make the display 2600 face a side direction.

Figure 30:
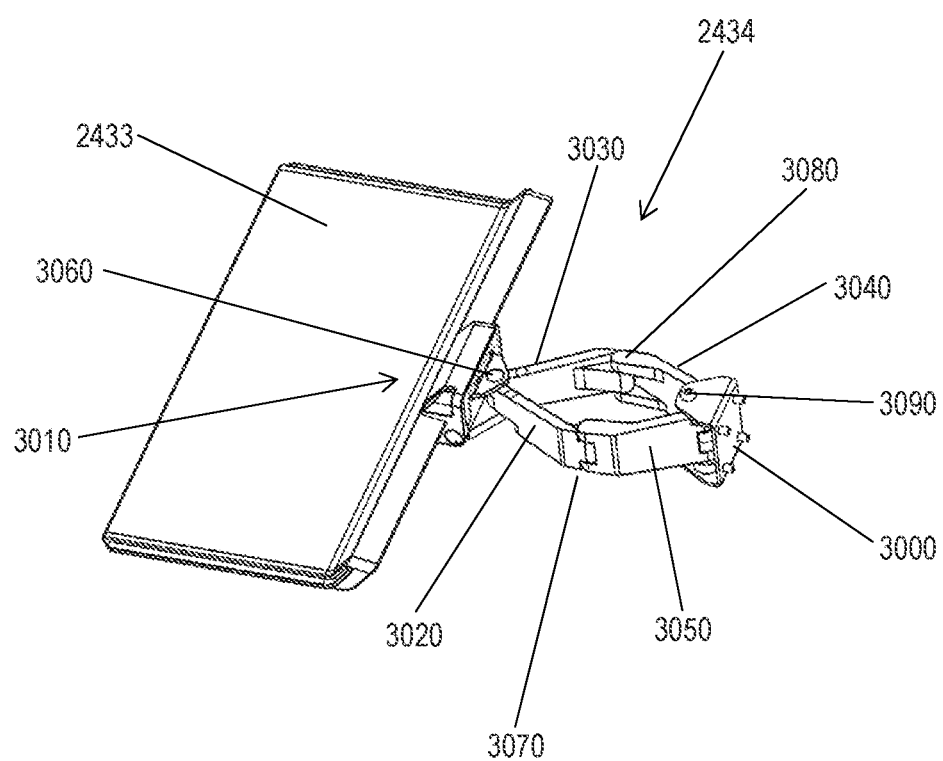
FIG. 30 shows a perspective view of one example of a keyboard tray.

FIG. 30 shows a perspective view of one example of the keyboard tray 2433. As described in this document, the keyboard tray 2433 can be connected to the head unit 2430 under the computer storage compartment 2432 (shown in FIG. 24). An attachment bracket 3000 can be coupled to the head unit 2430 to couple the keyboard tray arm assembly 2434 and the keyboard tray 2433 to the head unit 2430. A holding block 3010 can be coupled between the keyboard tray arm assembly 2434 and the keyboard tray 2433.

The keyboard tray arm assembly 2434 can include a first arm 3020, a second arm 3030, a third arm 3040, and a fourth arm 3050. The first arm 3020 and the second arm 3030 can be rotatingly coupled at a first hinge 3060. The first hinge can be included in the holding block assembly 3010, and the first arm 3020 and the second arm 3030 can be rotatingly coupled to the holding block 3010 at the first hinge 3060. The first arm 3020 and the fourth arm 3040 can be rotatingly coupled at a second hinge 3070. The second arm 3030 and the third arm 3040 can be rotatingly coupled at a third hinge 3080. A fourth hinge 3090 can be included in the attachment bracket 3000, and the fourth hinge 3090 can extend through the attachment bracket 3000.

Figure 31:
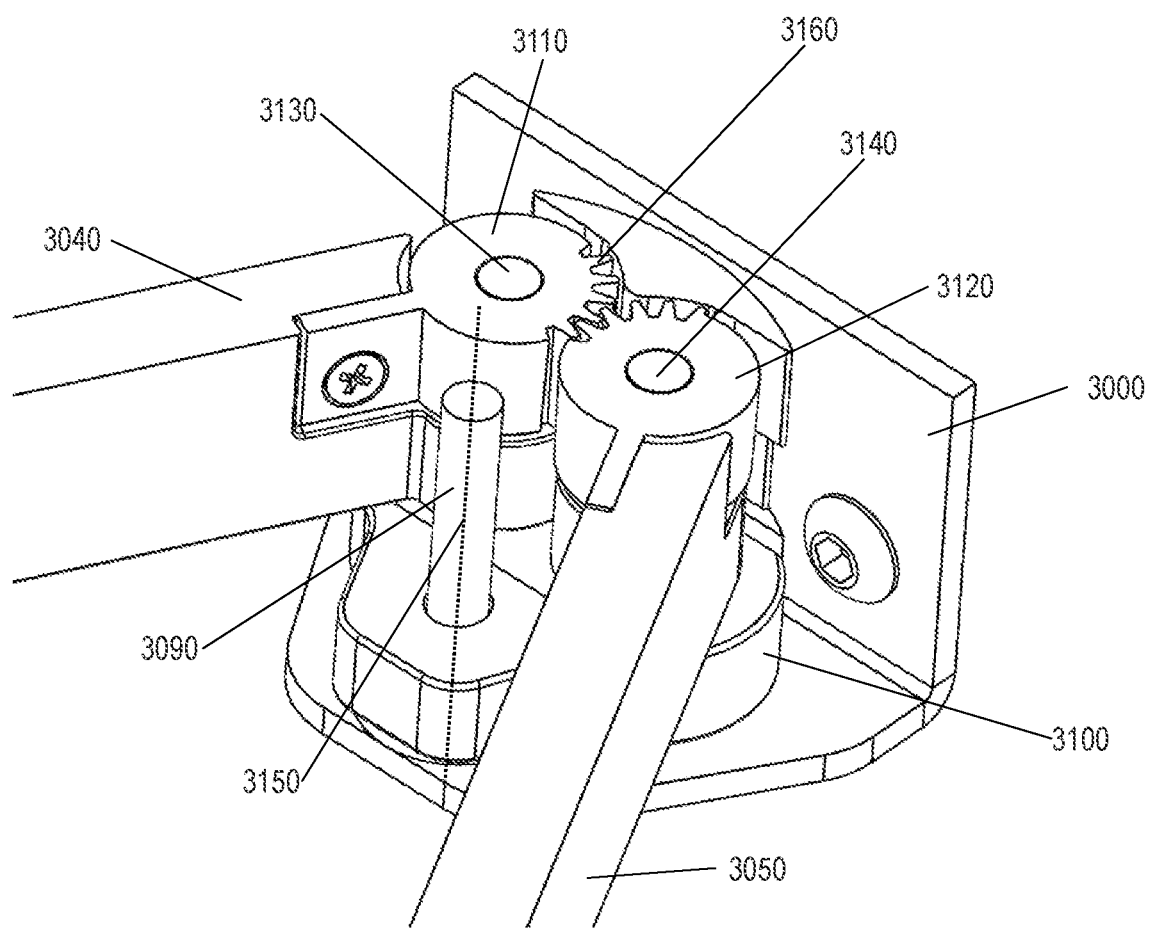
FIG. 31 shows a detailed view of an attachment bracket.

FIG. 31 shows a detailed view of the attachment bracket 3000. Portions of the attachment bracket 3000 have been removed from FIG. 31 for clarity. The attachment bracket 3000 can include a hinge holding bracket 3100. The hinge holding bracket 3100 can be rotatingly coupled with the attachment bracket 3000 at the fourth hinge 3090.

The third arm 3040 can include a first gear block 3110, and the fourth arm 3050 can include a second gear block 3120. The first gear block 3110 can be rotatingly coupled with the hinge holding block 3100 at a fifth hinge 3130, and the second gear block 3120 can be rotatingly coupled with the hinge holding block 3100 at a sixth hinge 3140. Rotation axes 3150 of the hinges 3060, 3070, 3080, 3090, 3130, 3140 can be parallel to each other, and the rotation axes 3150 can be in a vertical orientation.

The gear blocks 3110, 3120 can each include a plurality of teeth 3160, for instance the teeth 3160 can be included on outside surfaces of the gear blocks 3110, 3120. The teeth 3160 on the gear blocks 3110, 3120 can engage each other to synchronize the rotation of the arms 3040, 3050 about the hinges 3130, 3140. The synchronization can allow the arms 3040, 3050 to rotate in equal increments about the hinges 3130, 3140.

Figure 32A:
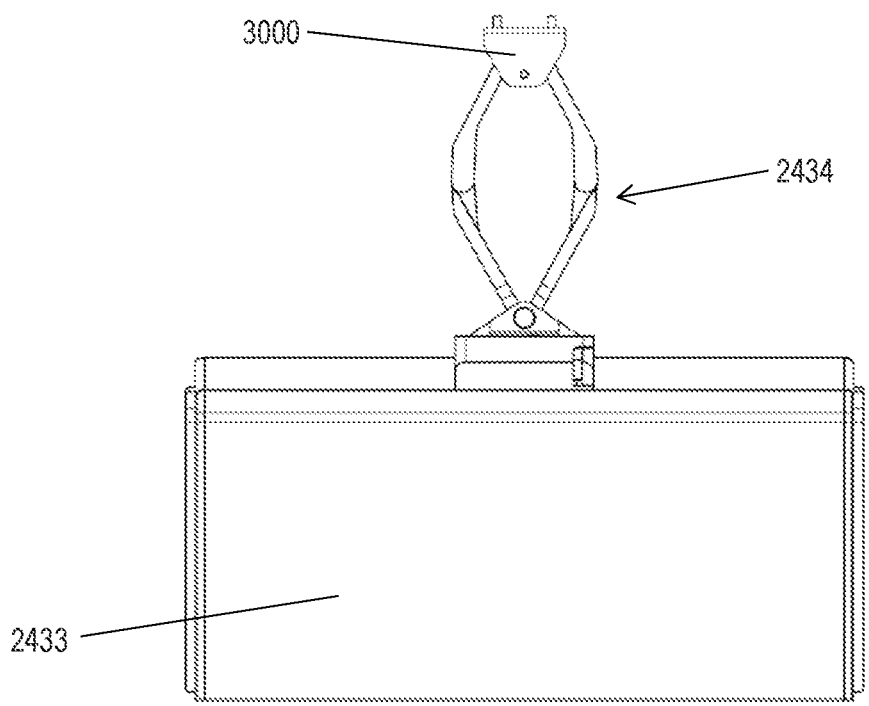
FIGS. 32A-32B show a top view of the keyboard tray in an expanded configuration and a contracted configuration.
Figure 32B:
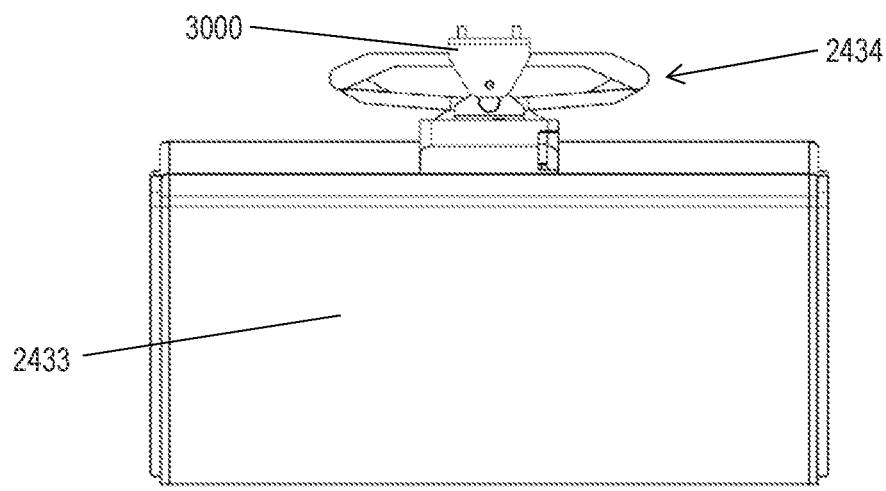

FIGS. 32A-32B show a top view the keyboard tray 2433 in an expanded configuration and a contracted configuration. The keyboard tray arm assembly 2434 can allow the keyboard tray 2433 to articulate with respect to the attachment bracket 3000, and accordingly change the distance or orientation of the keyboard tray 2433 with respect to the attachment bracket 3000. In an example, and as shown in FIG. 32B, the keyboard tray arm assembly 2434 can be articulated to position the keyboard tray 2433 proximate to the attachment bracket 3000. Positioning the keyboard tray 2433 proximate to the attachment bracket 3000 can allow the keyboard tray 2433 to be stowed under the computer storage compartment 2432 (shown in FIG. 24), for instance when the keyboard tray 2433 is not in use. In another example, and as shown in FIG. 32A, the keyboard tray arm assembly 2434 can be articulated to position the keyboard tray 2433 remote from the attachment bracket 3000. Positioning the keyboard tray 2433 remote from the attachment bracket 3000 can expose the keyboard tray 2433, for instance by a user pulling the keyboard tray 2433 out from under the computer storage compartment 2432.

Figure 33A:
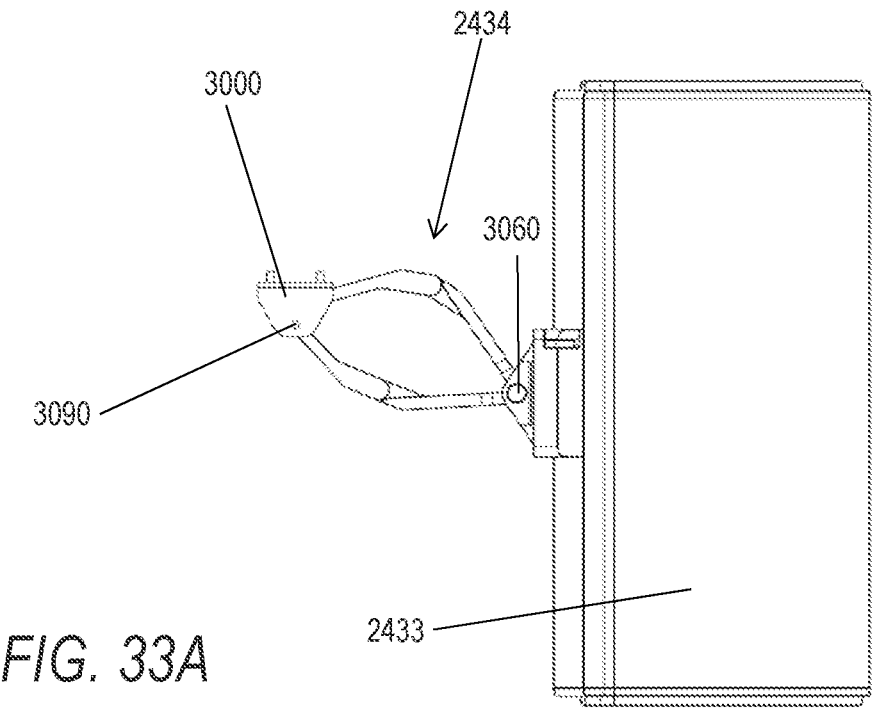
FIGS. 33A-33B show a top view of the keyboard tray in a rotated configuration.
Figure 33B:
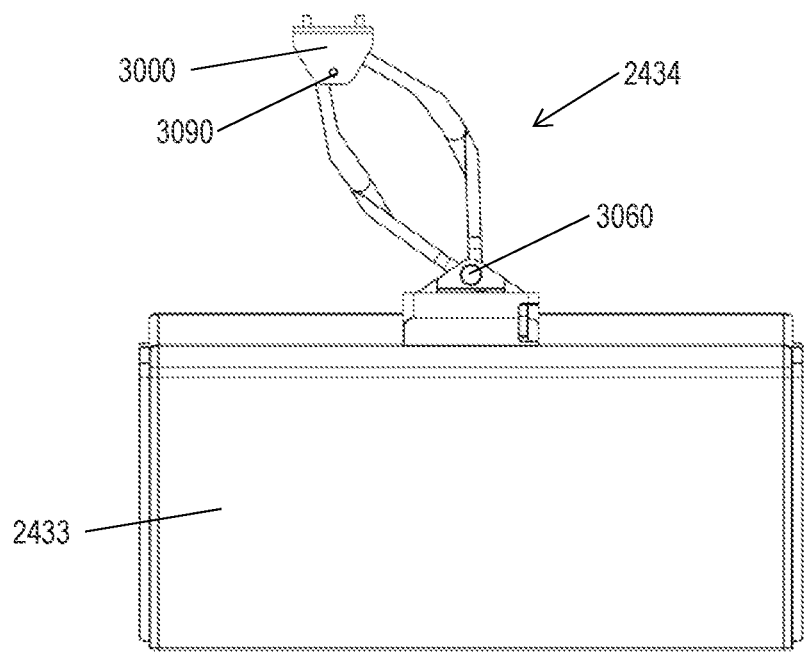

FIGS. 33A-33B show a top view of the keyboard tray 2433 in a rotated configuration. The keyboard tray arm assembly 2434 can rotate around the fourth hinge 3090 and allow the keyboard tray to move laterally (e.g., to the right or to the left) with respect to the attachment bracket 3000.

Additionally, the keyboard tray 2433 can rotate about the first hinge 3060 to face different directions as illustrated in FIGS. 33A-33B.

Figure 34A:
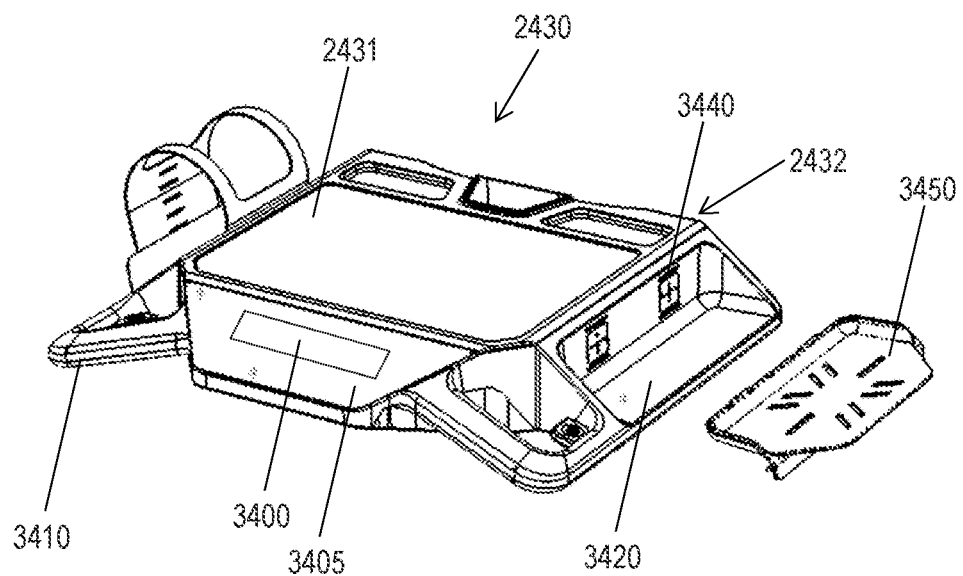
FIG. 34A-34B show perspective views of an example of a head unit that can optionally include a computer storage compartment.
Figure 34B:
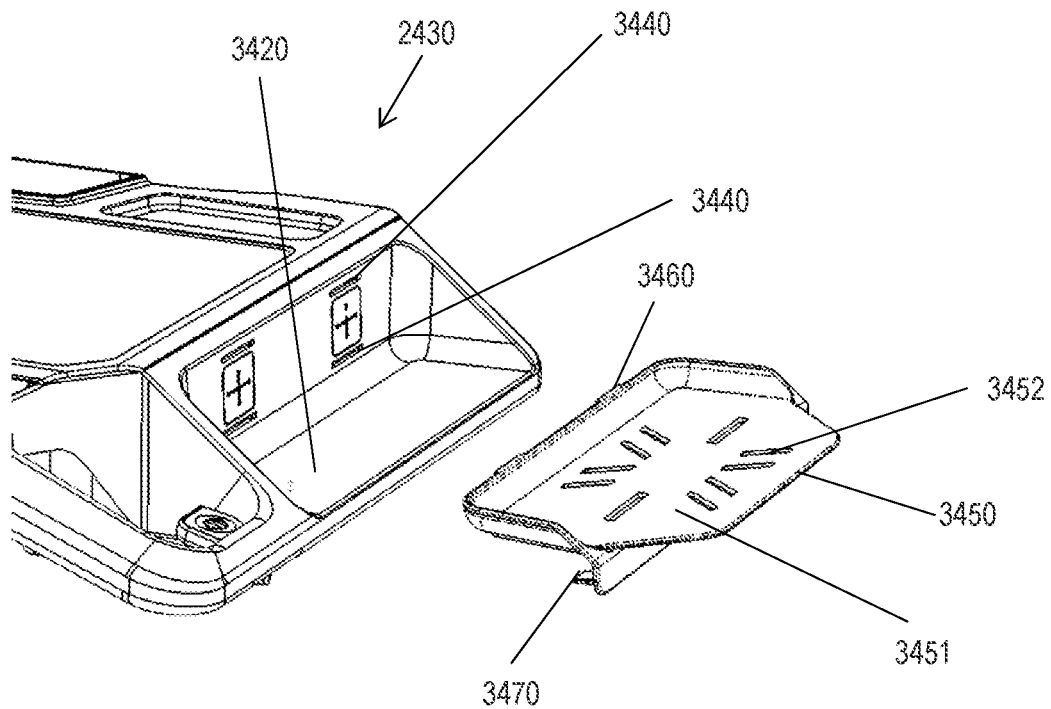

FIGS. 34A-34B show perspective views of an example of the head unit 2430 that can optionally include the computer storage compartment 2432. As described in greater detail in this document, the computer storage compartment 2432 can be covered by the worksurface 3431. Additionally, the worksurface 2431 can be removable from the head unit 2430. A control panel 3400 can be included in the head unit 2430, for instance the control panel 3400 can be located in a control panel housing 3405. The control panel housing 3405 can be located proximate to the computer storage compartment 2432. In an example, a display (e.g., the display 2600 shown in FIG. 26) can be included in the control panel 3400. The display can be touch sensitive, and various functions of the mobile workstation 2400 can be controlled with the display. For instance, the display can control height adjustment of the mobile workstation 2400, internet access of a computer connected to the mobile workstation 2400, power monitoring of one or more components (e.g., a computer, a battery, or the like) alerts, and the like.

The head unit 2430 can include one or more handles 3410. In an example, the head unit 2430 can define the handles 3410, and the handles 3410 can be located proximate to the computer storage compartment 2432. Additionally, the head unit 2430 can include one or more accessory shelves 3420, for instance the shelves 3420 can be connected to the head unit 3430 proximate to the computer storage compartment 2432. In another example, the control panel housing 3405, the handles 3410, and the accessory shelves 3420 can be defined by the head unit 2430. In yet another example, the control panel housing 3405, the handles 3410, and the accessory shelves 3420 can be formed separately and later attached to the head unit 2430.

Additionally, the head unit 2430 can define one or more recesses 3440. The recesses 3440 can be used to attach an accessory platform 3450 to the head unit 2430. In an example, one or more ridges 3460 can be included in the accessory platform 3450. The ridges 3460 can engage with the recesses 3440 to attach the accessory platform to the head unit 2430. Further, one or more tabs 3470 can be included in the accessory platform 3450. The tabs 3470 can engage with the head unit 2430 to provide extra stiffness to the connection between the head unit 2430 and the accessory shelf 3450. For instance, a screw can be inserted through the head unit 2430, and the tab 3470 to engage with the accessory shelf 3450 and provide additional security to couple the accessory shelf 3450 to the head unit 2430.

The accessory platform 3450 can include a bottom surface 3451. The bottom surface 3451 of the accessory platform 3450 can be flat, or have various shapes to match the accessory to be located on the accessory platform 3450. The bottom surface 3451 of the accessory platform 3450 can have one or more slots 3452 to mount accessories (e.g., a sanitizing wipe container, a scanner holder, a printer, or the like) on to the accessory platform. In some example configurations, a fastener (e.g., a screw) can be inserted through the slots 3452, and the fastener can engage the accessory to secure the accessory to the accessory platform 3450.

Figure 35:
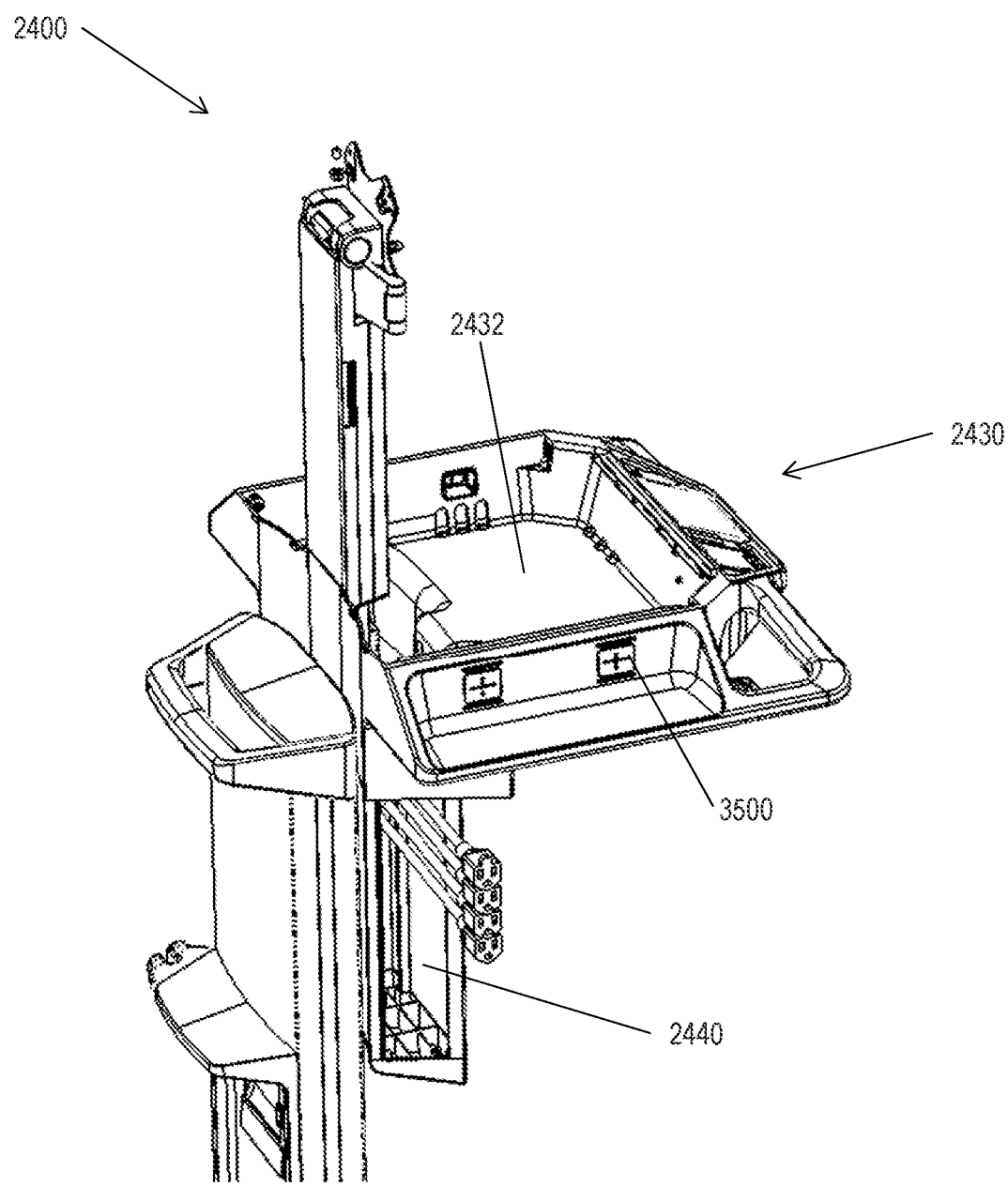
FIG. 35 shows a perspective view of an example of the mobile cart of FIG. 24 that can optionally include one or more cable access holes.

FIG. 35 shows a perspective view of an example of the mobile cart 2400 of FIG. 24 that can optionally include one or more cable access holes 3500. The head unit 2430 can define the one or more cable access holes 3500. The cable access holes 3500 can allow access to the computer storage compartment 2432 from an exterior of the head unit 2430.

In an example, the cable access holes 3500 can allow cable routing between the cable storage box 2440 or the computer storage compartment 2432, and accessories located on the accessory shelves 3420 (or the accessory platform 3450, shown in FIGS. 34A-34B). In an example, a power supply for a laptop computer can be located in the computer storage compartment 2432 (or on the accessory shelf 3420). A first power supply cable can pass through the cable access holes 3500 from the computer storage compartment 2432 and be coupled with a second power supply cable located in the cable storage box 2440.

Figure 36:
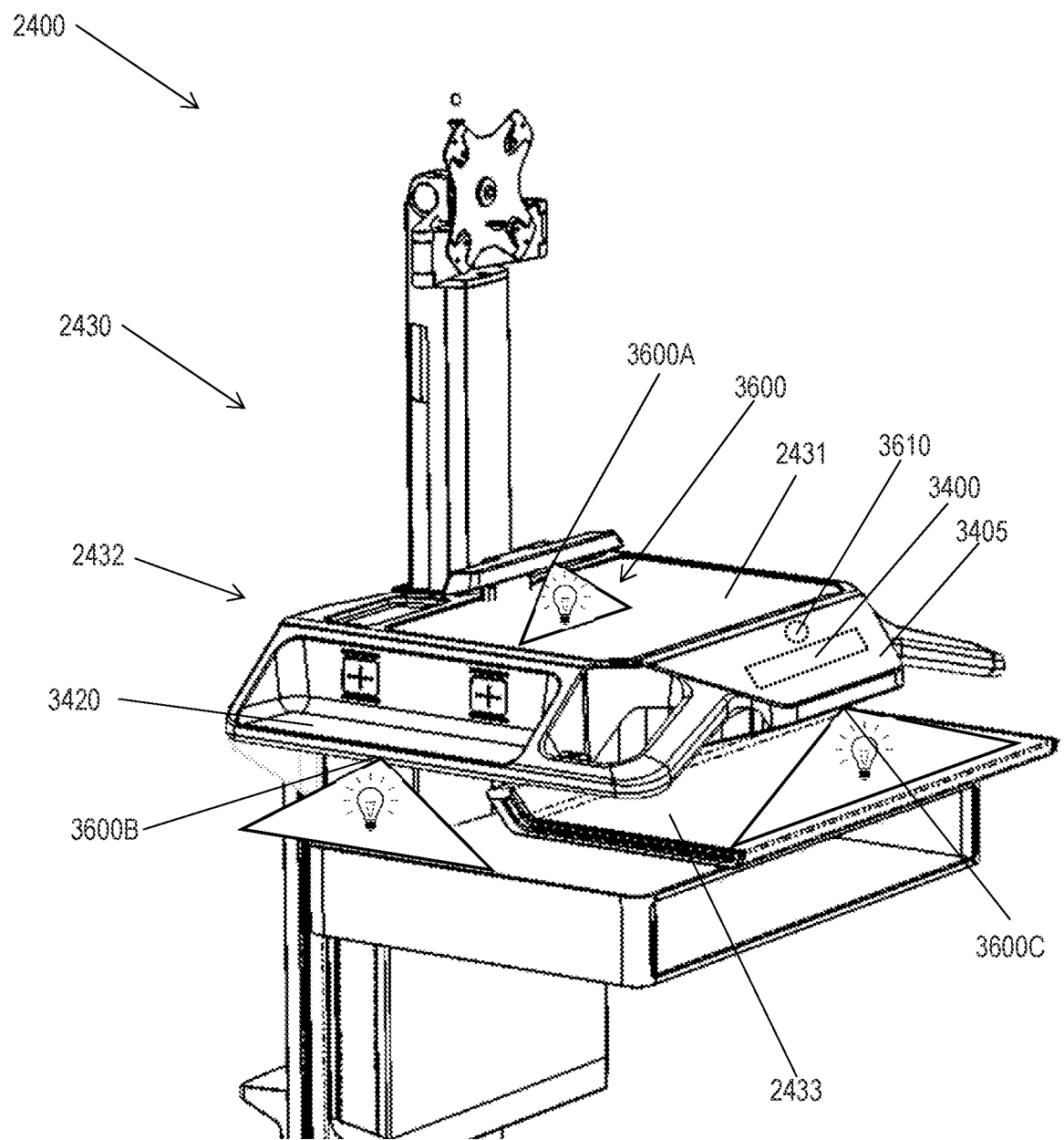
FIG. 36 shows a perspective view of the head unit.

FIG. 36 shows a perspective view of the head unit 2430. One or more light sources 3600 can be built in to the head unit to provide extra light when the ambient lighting is not sufficient for performing various tasks associated with the mobile workstation. A first light source 3600A can be attached to the head unit 2430 above the worksurface 2431 to illuminate the objects located on the worksurface 2431. A second light source 3600B and a third light source can be attached to underside of the accessory shelves 3420 to illuminate the keyboard tray 2433 when the keyboard tray 2433 is panned to the right or left side of the head unit 2430. A fourth light source 3600C can be attached to the underside of the control panel housing 3405 to illuminate the keyboard tray 3433 when the keyboard tray 3433 is in front of the head unit 3430.

Power and dimming features for the light sources 3600 can be controlled by the control panel 3400. In an example, the brightness of each light source (e.g., the first light source 3500A) can be set manually, or the brightness can automatically be adjusted using an ambient light sensor that 3610 that can be included in the mobile workstation 2400. In an example, and as shown in FIG. 37B, the ambient light sensor 3700 can be located in the control panel housing 3405.

Figure 37A:
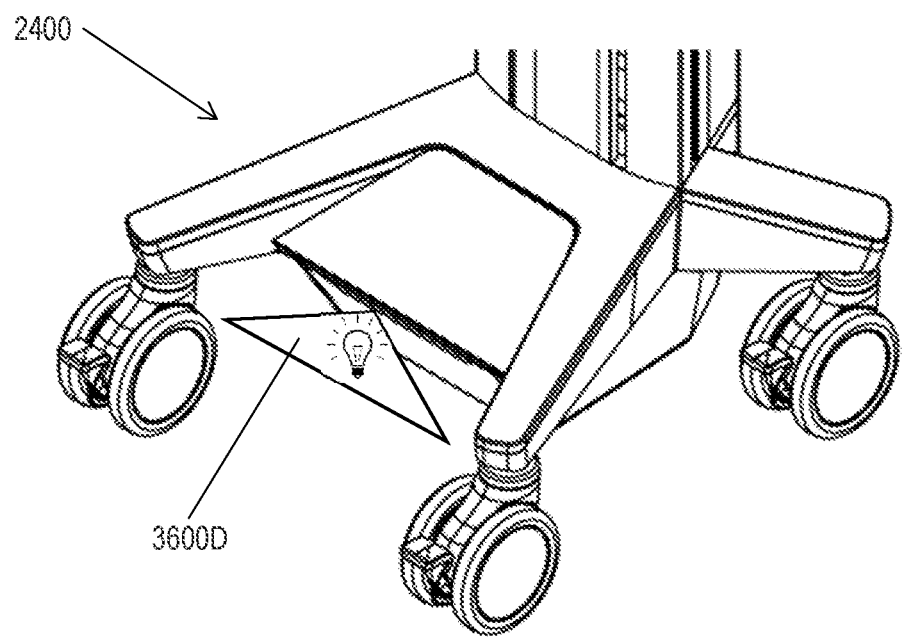
FIGS. 37A-37B show perspective views of a wheeled base of the mobile work station.
Figure 37B:
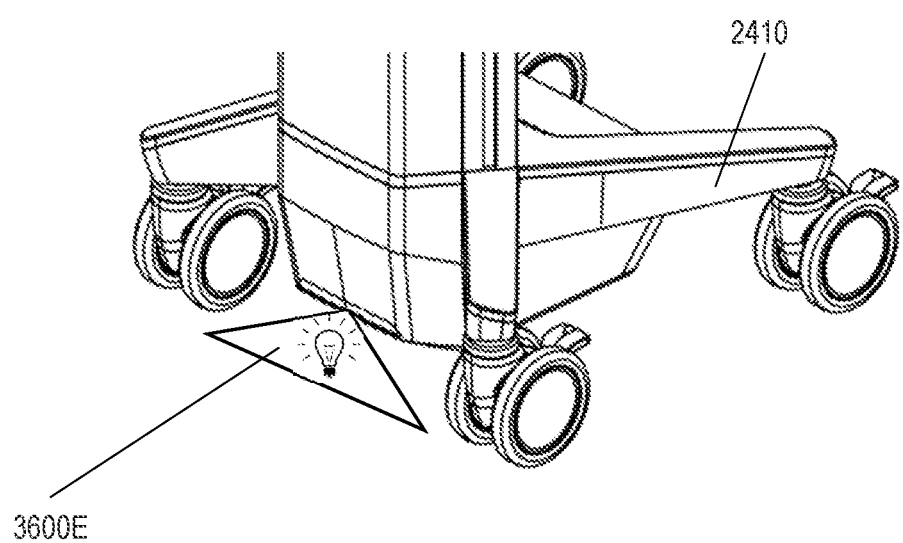

FIGS. 37A-37B show perspective views of the wheeled base 2410 of the mobile work station 2400. The one or more light sources 3600 can also be included in the wheeled base 2410. As shown in FIG. 37A, a fifth light source 3600D can be attached to the wheeled base 2410 proximate to a first side of the wheeled base 2410. Additionally, and as shown in FIG. 37B, a sixth light source 3600E can be attached to a second side of the wheeled base 2410. The light sources 3600D, 3600E can be used to illuminate an area around the workstation 2400.

Figure 38:
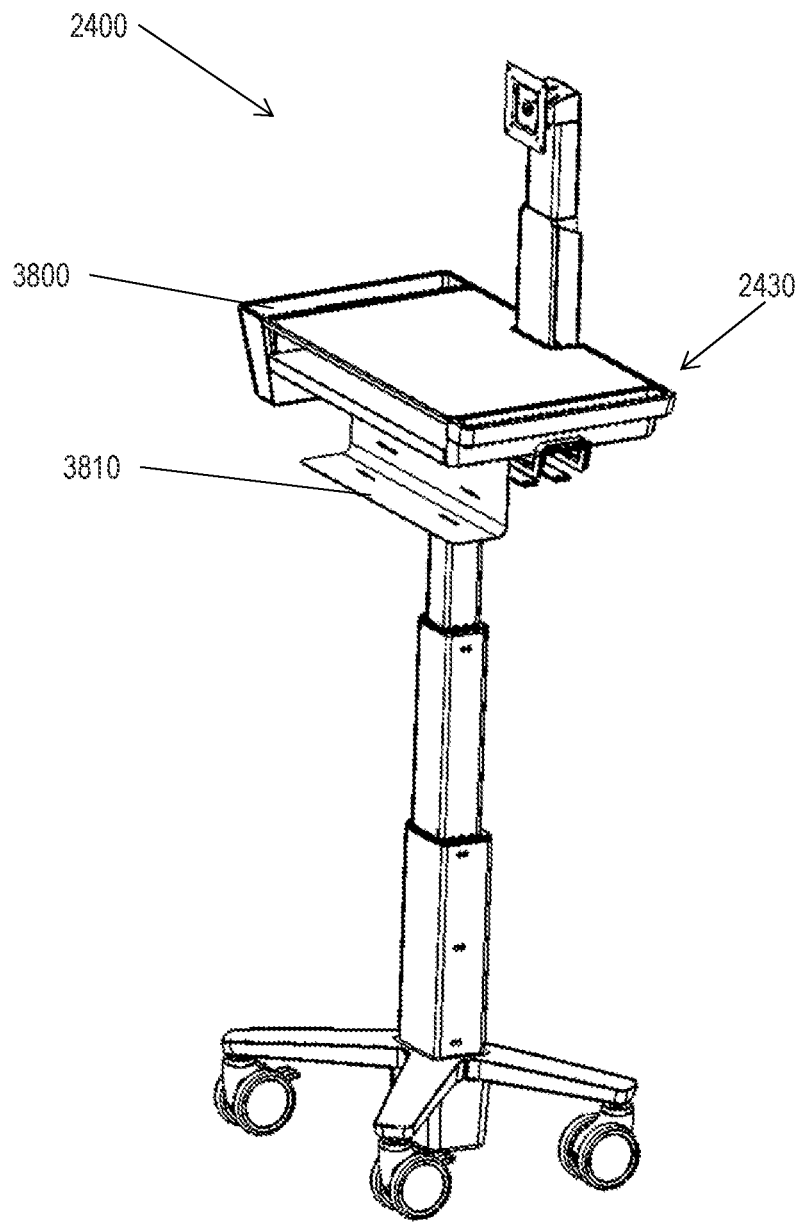
FIG. 38 shows a perspective view of another example of the mobile workstation.

FIG. 38 shows a perspective view of another example of the mobile workstation 2400. A storage basket 3800 can be coupled to the head unit 2430 (e.g., to a side of the head unit 2430), and the storage basket 3800 can be configured to store accessories. In an example, the storage basket 3800 can store a remote control, medical equipment (e.g., an oximeter, a blood pressure cuff a stethoscope, or the like), or other accessories. Additionally, the mobile workstation 2400 can include an accessory holder 3810. The accessory holder 3810 can be coupled to the head unit 2430, for instance the accessory holder can be coupled to an underside of the head unit 2430.

Figure 39:
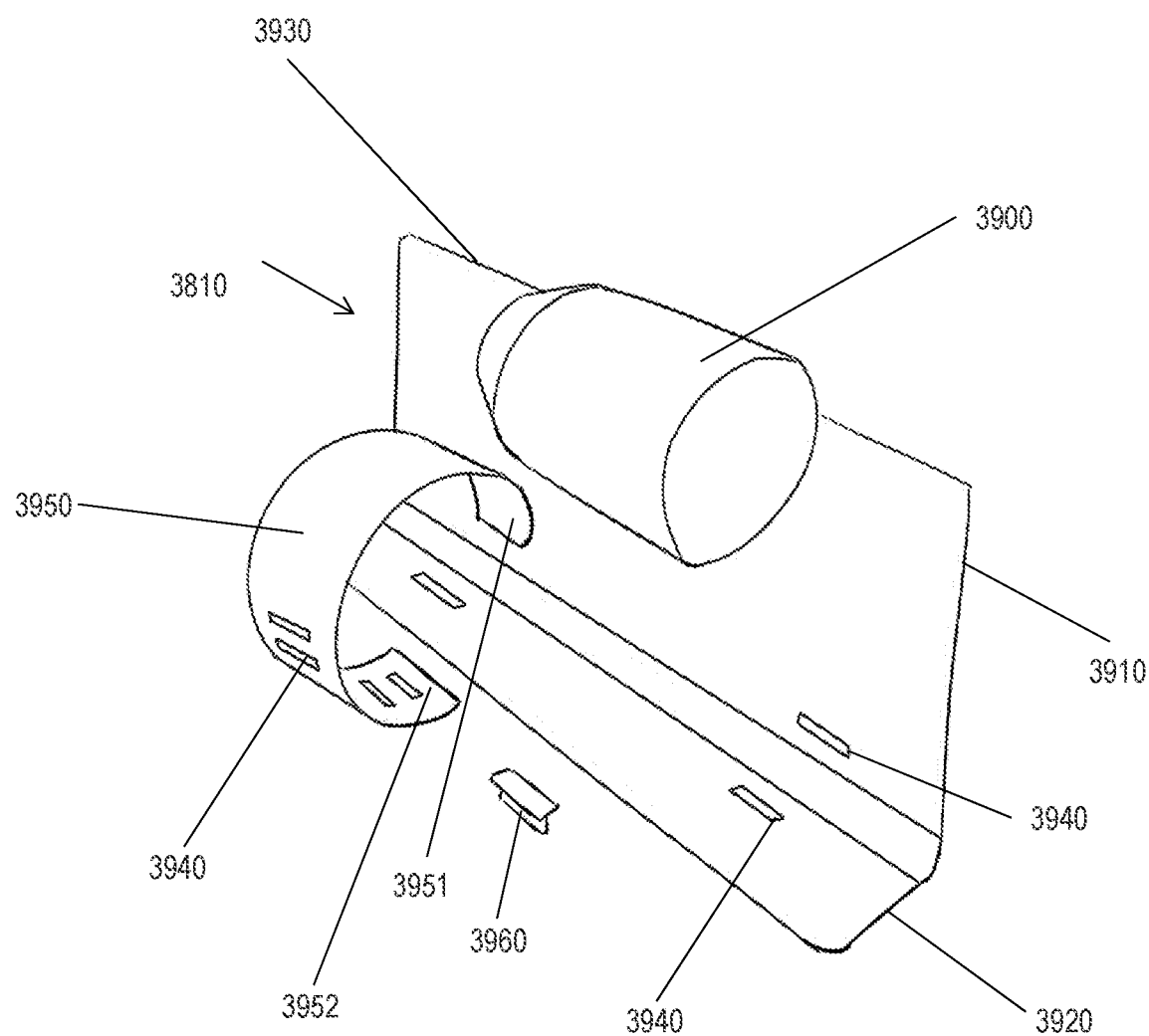
FIG. 39 shows a perspective view of an example of an accessory holder.

FIG. 39 shows a perspective view of an example of the accessory holder 3810. The accessory holder 3810 can be coupled to the head unit 2430 (shown in FIG. 38). The accessory holder 3810 be used to attach an accessory 3900, including (but not limited to), sanitizing wipes, a scanner, or the like to the mobile workstation 2400 (shown in FIG. 38). The accessory holder 3810 can have an L-shaped profile and can include a first side 3910, and a second side 3920 which extends in transverse direction from the first side 3910. In another example, the accessory holder 3810 have other profiles, for instance a U-shaped, straight, or other profile that can fit a variety of accessories 3900. An upper end 3930 of the first side 3920 can be attached to the head unit 2430 (e.g., an underside of the head unit 2430).

The accessory holder 3810 can includes one or more slots 3940. The slots 3940 can be defined in the sides 3910, 3920 of the accessory holder 3810 and sized and shaped to receive a strap 3950. The strap 3950 (e.g., a strap including a hook and loop fastener, an elastic strap, or the like) can be wrapped around the accessory 3900 to secure the accessory 3900 to the accessory holder 3810. A first end of the strap 3950 can be connected to the accessory holder 3810 by engaging the strap 3950 with the one or more slots 3940. Additionally, a clip 3960 can be coupled to the accessory holder 2810, for instance by coupling the clip 3960 with the slots 3940. The clip 3960 can be inserted through the slots 3940 the clip can extend from the second side 3920 of the accessory holder 3810. Further, the strap 3950 can define the slots 3940, and the strap 3950 can couple with the clip 3960 or other accessories.

In an example, the accessory 3900 (e.g., a sanitizing wipes container) can be secured to the accessory holder 3810. A first end 3951 of the strap 3950 can be inserted in to the slot 3940A. The strap 3950 can be wrapped around the accessory 3900, and a second end 3952 of the strap 3950 can be secured to the accessory holder 3810. For instance, the second end 3951 of the strap 3950 can be secured to the accessory holder 3810 using the clip 3960.

Figure 40:
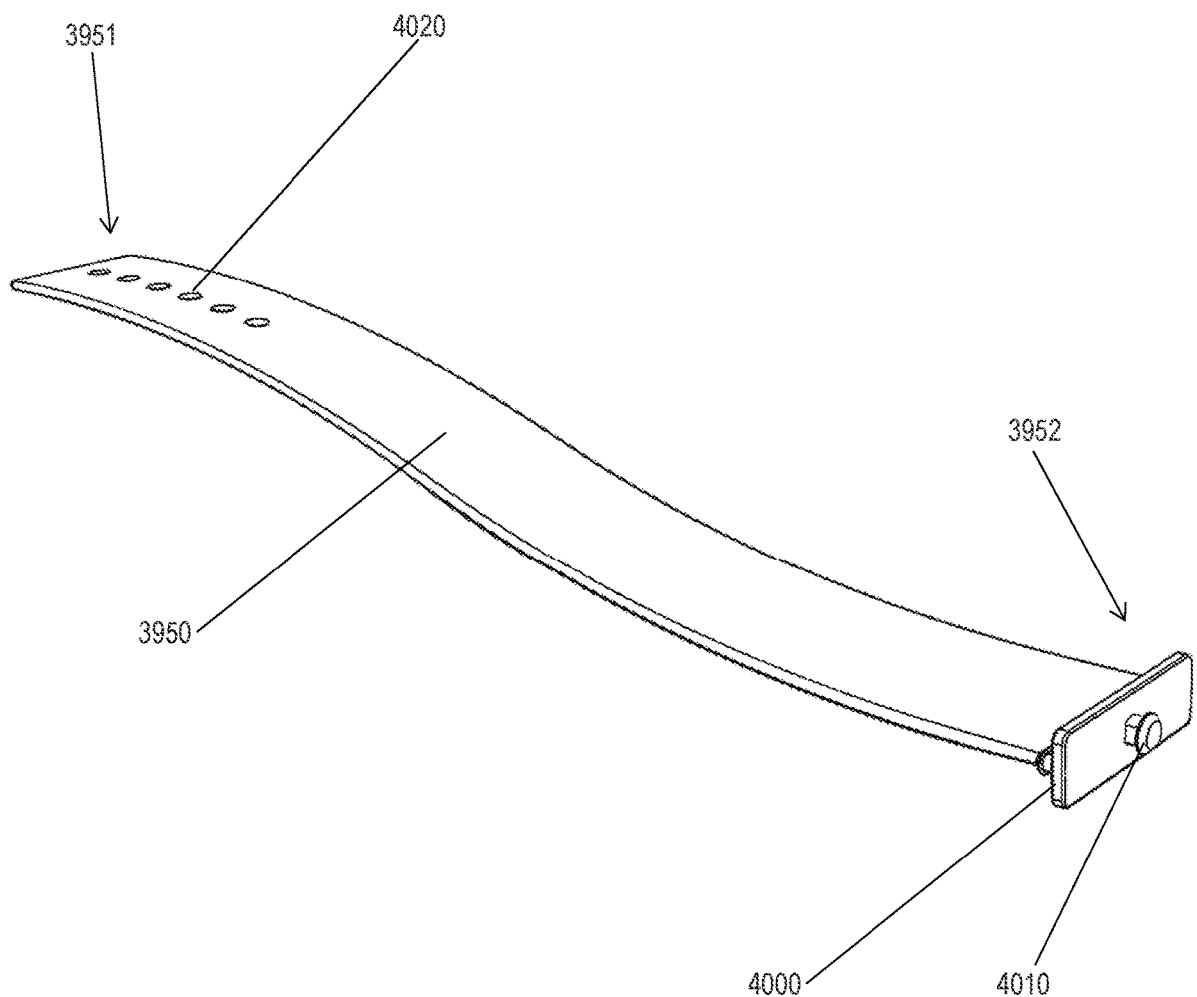
FIG. 40 shows a perspective view of an example of a strap.

FIG. 40 shows a perspective view of an example of the strap 3950. As described in this document, the strap 3950 can be received in the slots 3940 (e.g., the slot 3940A shown in FIG. 39). A tab 4000 can engage with the accessory holder 3810 (e.g., the side 3910) and secure the strap 3950 to the accessory holder 3810. For instance, the tab 4000 can have dimensions greater than the slots 3940 and the tab 4000 can prevent the second end 3952 of the strap 3950 from translating through the slots 3940. The tab 4000 can include a pin 4010, and the strap 3950 can define one or more holes 4020 that are sized and shaped to receive the pin 4010. The strap 3950 can be wrapped around the accessory 3900 (shown in FIG. 39), and the strap 3950 can engage with the pin 4010 to secure the accessory 3900 to the accessory holder 3810 (shown in FIG. 38).

Figure 41:
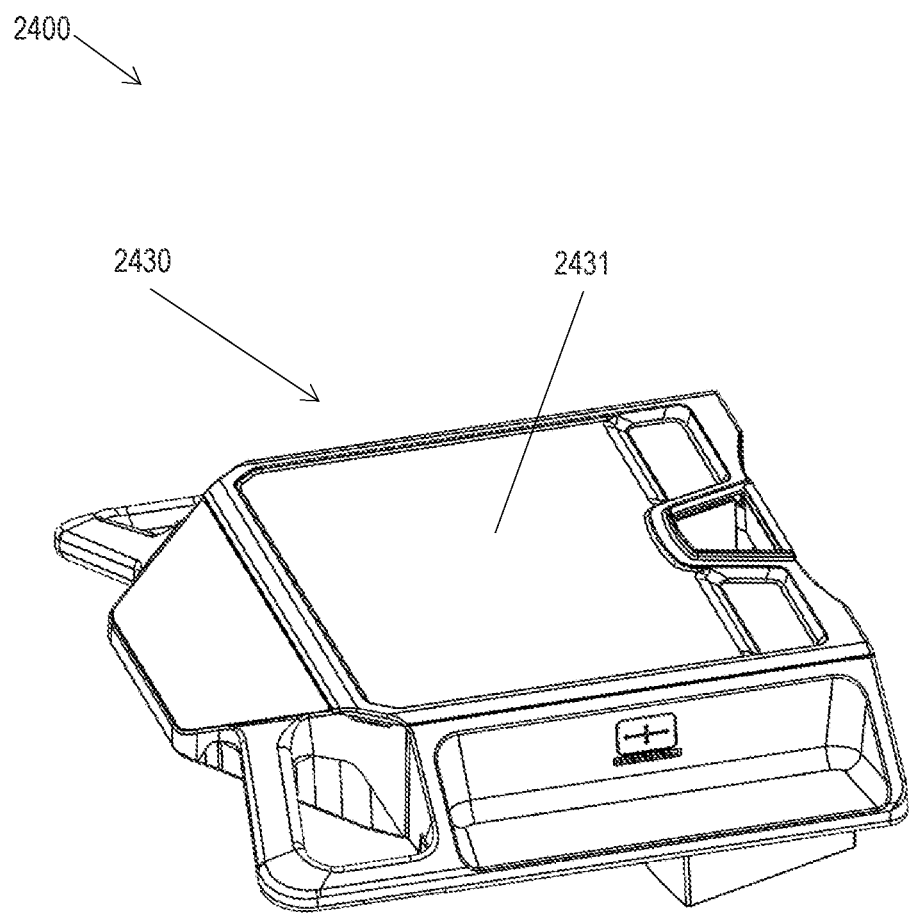
FIG. 41 shows a perspective view of the head unit including a worksurface.

FIG. 41 shows a perspective view of the head unit 2430 including the worksurface 2431. As described in this document, the head unit 2430 can be included in the mobile workstation 2400. As described in greater detail in this document, the worksurface 2431 can translate with respect to the head unit 2430. In an example, the worksurface 2431 can translate between an open configuration and a closed configuration. Additionally, the worksurface 2431 can be removed from the head unit 2430, for instance to allow access to the computer storage compartment 2432 (shown in FIG. 35).

Figure 42:
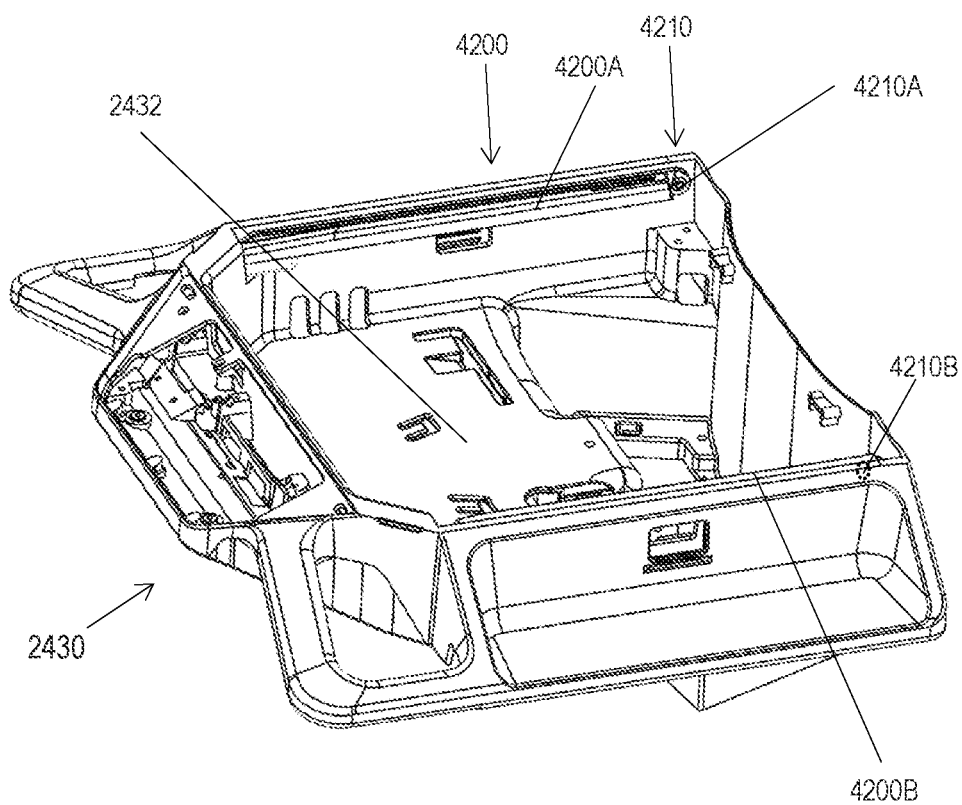
FIG. 42 shows another perspective view of the head unit.

FIG. 42 shows another perspective view of the head unit 2430. The worksurface 2431 has been removed from FIG. 42 for clarity. As described in this document, the head unit 2430 can include the computer storage compartment 2432. The worksurface 2431 (shown in FIG. 41) can be translated with respect to the head unit 2430 (or removed from the head unit 2430) to allow access to the compartment 2432. In an example, the worksurface 2431 can be engaged with one or more glides 4200, for instance a first glide 4200A or a second glide 4200B. The glides 4200 can be rotatably coupled to the head unit 2430 with one or more hinges 4210. For instance, the glide 4200A can be rotatably coupled to the head unit 2430 with a first hinge 4210A, and the glide 4200B can be coupled to the head unit 2430 with a second hinge 4210B. The rotatable coupling between the glides 4200 and the hinges 4210 can allow the glides 4200 to translate with respect to the head unit 2430. In this example, because worksurface 2431 (shown in FIG. 41) is engaged with the glides 4200, the worksurface 2431 can translate with respect to the head unit 2430.

Figure 43:
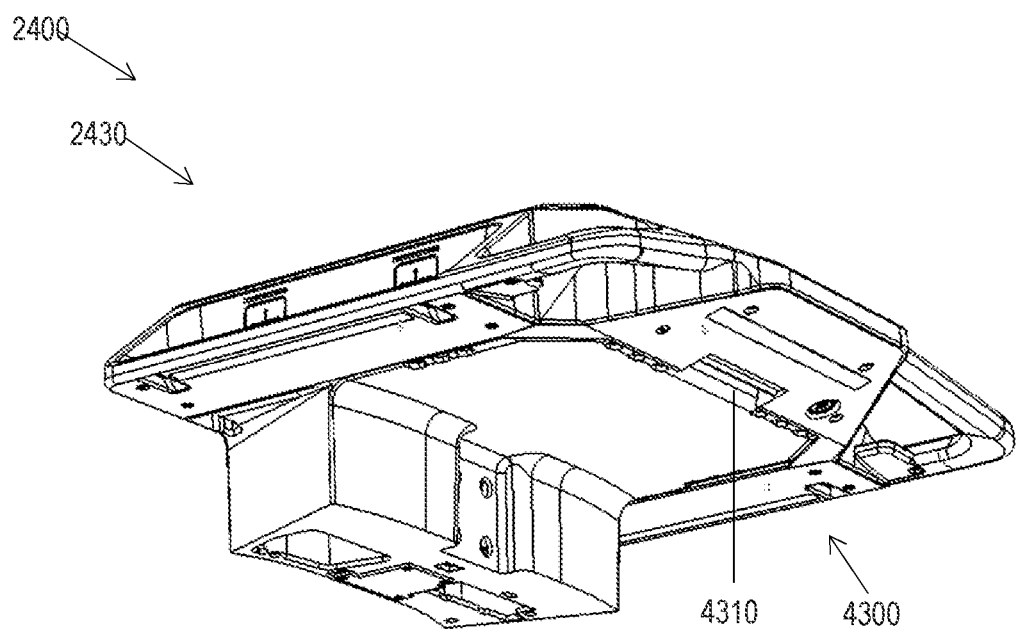
FIG. 43 shows yet another perspective view of the head unit.

FIG. 43 shows yet another perspective view of the head unit 2430. The mobile workstation 2400 can include a worksurface opening mechanism 4300, and the opening mechanism 4300 can include a latch release handle 4310. The latch release handle 4310 can be coupled to the head unit 2430, and can transition the opening mechanism 4300 between a locked configuration and an unlocked configuration. In this example, when the opening mechanism 4300 is in the locked configuration, the worksurface 2431 (shown in FIG. 41) is secured in the closed configuration. When the opening mechanism is in the unlocked configuration, the worksurface 2431 is allowed to transition from the closed configuration to the open configuration. A user can manipulate (e.g., pull, twist, push, or the like) the latch release handle 4310 to transition the opening mechanism 4300 between the locked configuration and the unlocked configuration.

Figure 44:
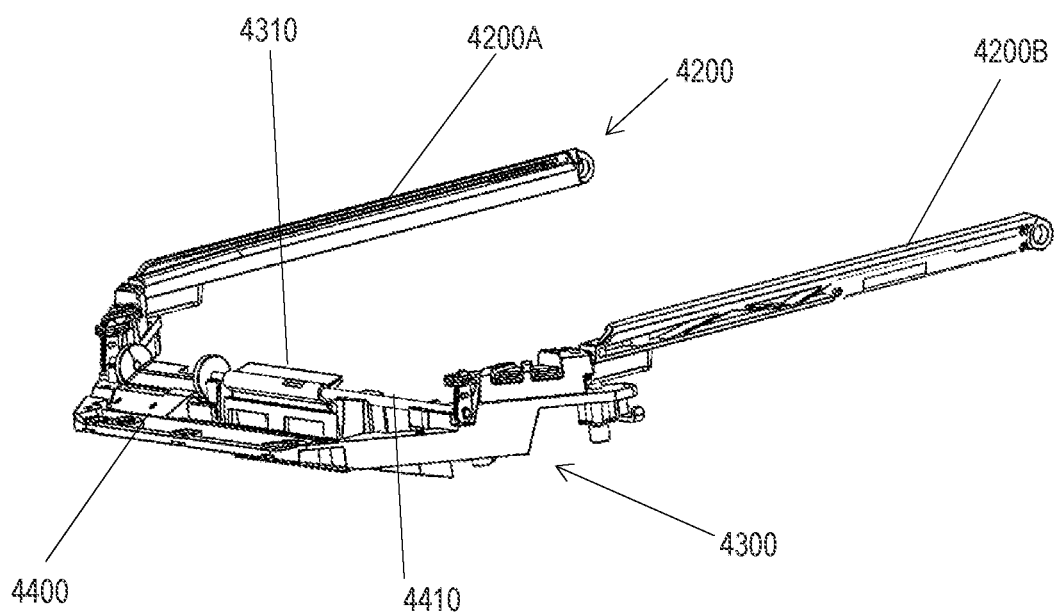
FIG. 44 shows a perspective view of a worksurface opening mechanism and glides.

FIG. 44 shows a perspective view of the worksurface opening mechanism 4300 and the glides 4200. Portions of the mobile workstation 2400 have been removed for clarity (e.g., portions of the head unit 2430). The opening mechanism 4300 can include a support bracket 4400, and the support bracket 4400 can support a shaft 4410. The latch release handle 4310 can be coupled to the shaft 4410, and displacement of the latch release handle 4310 can translate the shaft 4410. In an example, a user can manipulate the latch release handle 4310 and displace the latch release handle 4310. The displacement of the latch release handle 4310 can rotate the shaft 4410. As described in greater detail in this document, rotation of the shaft 4410 can transition the opening mechanism 4300 between the locked configuration and the unlocked configuration.

Figure 45:
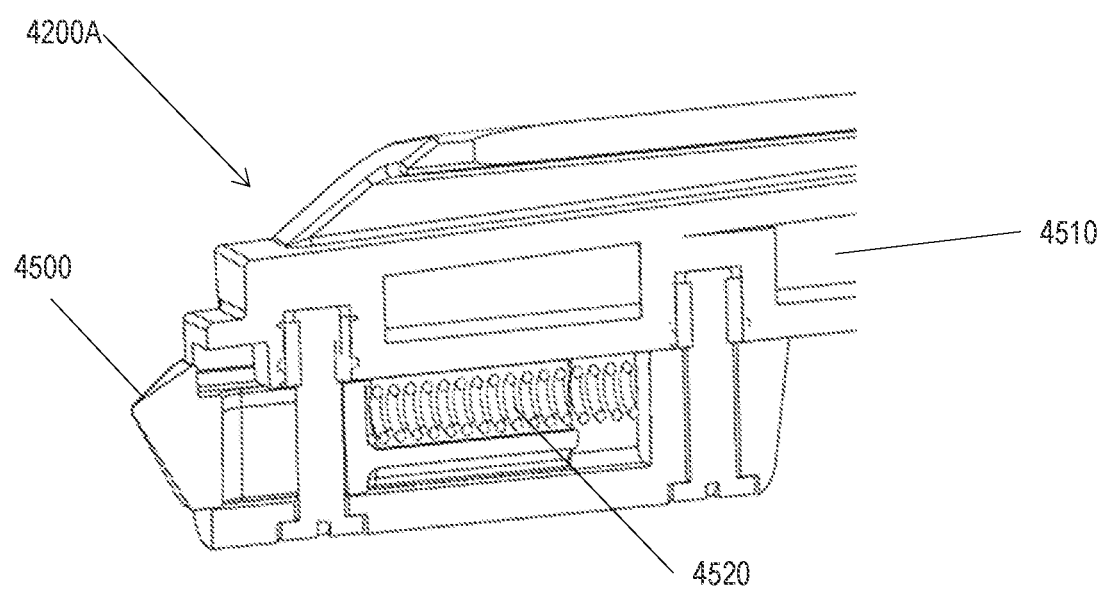
FIG. 45 shows a detailed perspective view of a glide.

FIG. 45 shows a detailed perspective view of the glide 4200A. Portions of the glide 4200A have been removed for clarity. The glide 4200A can include a latch 4500, and the latch 4500 can translate (e.g., slide, reciprocate, or the like) with respect to a glide body 4510 of the glide 4200A. In an example, the latch 4500 can project from the glide body 4510, and the latch 4500 can translate to be located (either partially or completely) within the glide body 4510. A latch biasing member 4520 can bias the latch 4500 away from the glide body 4510. The latch biasing member 4520 (e.g., a spring or the like) can be located between the latch 4500 and the glide body 4510, and the biasing member 4520 can bias the latch 4500 away from the glide body (e.g., the latch 4500 can be biased to project from the glide body 4510).

Figure 46:
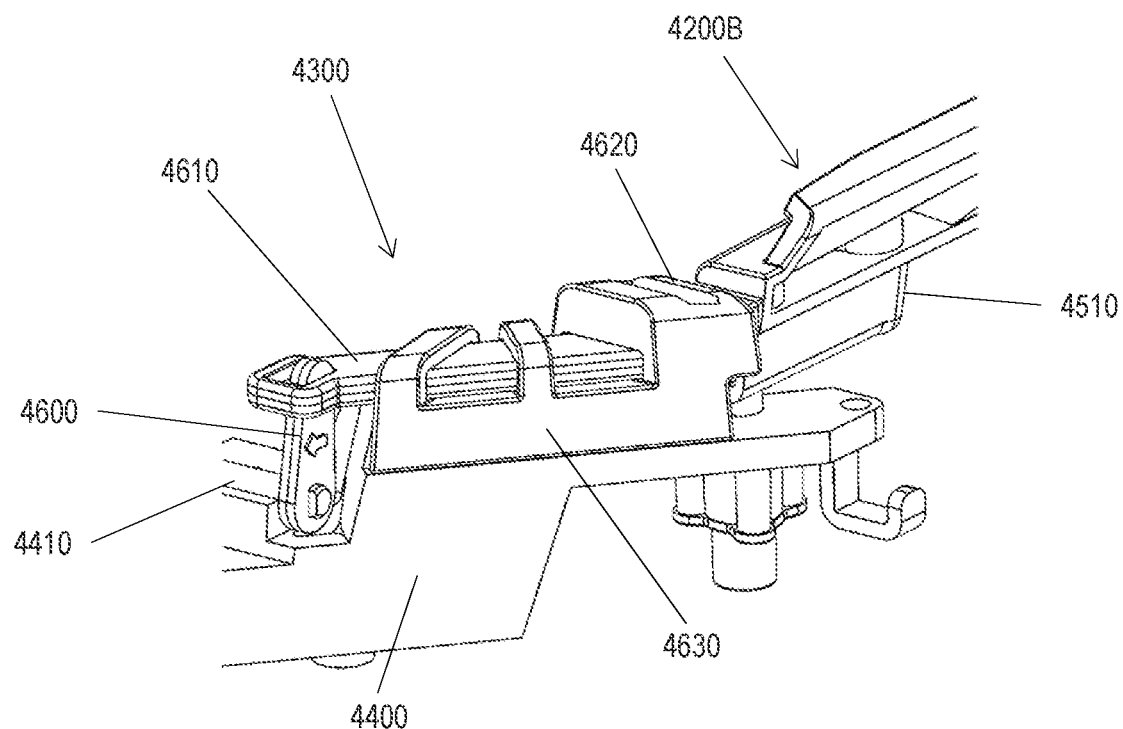
FIG. 46 shows another perspective view of the worksurface opening mechanism and the glide.

FIG. 46 shows another perspective view of the worksurface opening mechanism 4300 and the glide 4200B. As described herein, the latch release handle 4310 (shown in FIG. 43) can translate the shaft 4410. A lobe 4600 can be coupled to the shaft 4410, and the translation of the shaft 4410 can displace (e.g., rotate, move, or the like) the lobe 4600. The lobe 4600 can engage with a push rod 4610, and displacement of the lobe can translate the push rod 4610. The push rod 4610 can engage with the latch 4500 (shown in FIG. 47) and the translation of the push rod 4610 can translate the latch 4500 with respect to the glide body 4510.

A catch 4620 can be included in the worksurface opening mechanism 4300. In some examples, the catch 4620 can be included in a guide bracket 4630, and the guide bracket 4630 can be coupled to the support bracket 4400. The latch 4500 can engage with the catch 4620, and the engagement of the latch 4500 with the catch 4620 can restrain (e.g., secure, hold, or the like) the glide 4200B. In this example, when the glide 4200B is restrained and the worksurface 2431 is engaged with the glides 4200, the worksurface 2431 can be maintained in the closed configuration. Displacement of the latch 4500 with respect to the glide body 4510 (e.g., by the push rod 4610) can disengage the latch 4500 from the catch 4620 and allow the glides 4200 to translate with respect to the head unit 2430 (shown in FIG. 42). Accordingly, the worksurface 2431 can transition to the open configuration.

Figure 47:
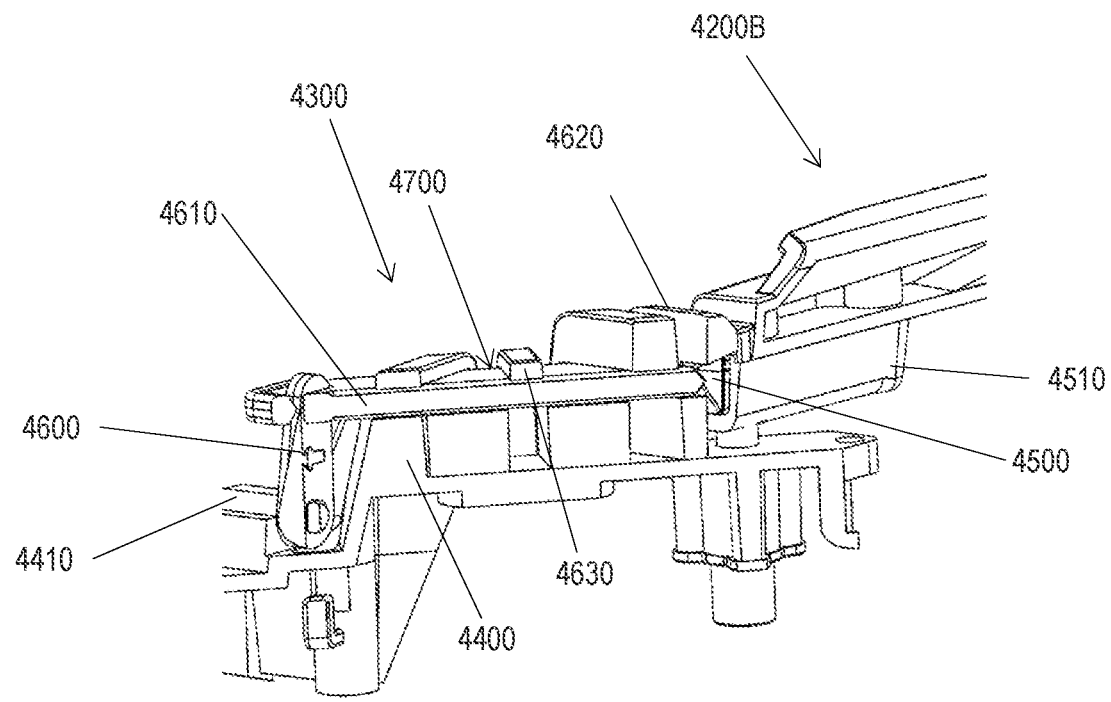
FIG. 47 shows yet another perspective view of the worksurface opening mechanism and the glide.

FIG. 47 shows yet another perspective view of the worksurface opening mechanism 4300 and the glide 4200B. Portions of the support bracket 4400 and the guide bracket 4630 have been hidden in FIG. 47 for clarity. In some examples, the guide bracket 4630 (and the support bracket 4400) can define a rod channel 4700, and the rod channel 4700 can be sized and shaped to receive the push rod 4610. The push rod 4610 can be slidingly engaged with the rod channel 4700, and translate with respect to the support bracket 4400 (or the head unit 2430). As described in this document, the translation of the push rod 4610 can displace the latch 4500 and allow the latch 4500 to disengage from the catch 4620.

Figure 48:
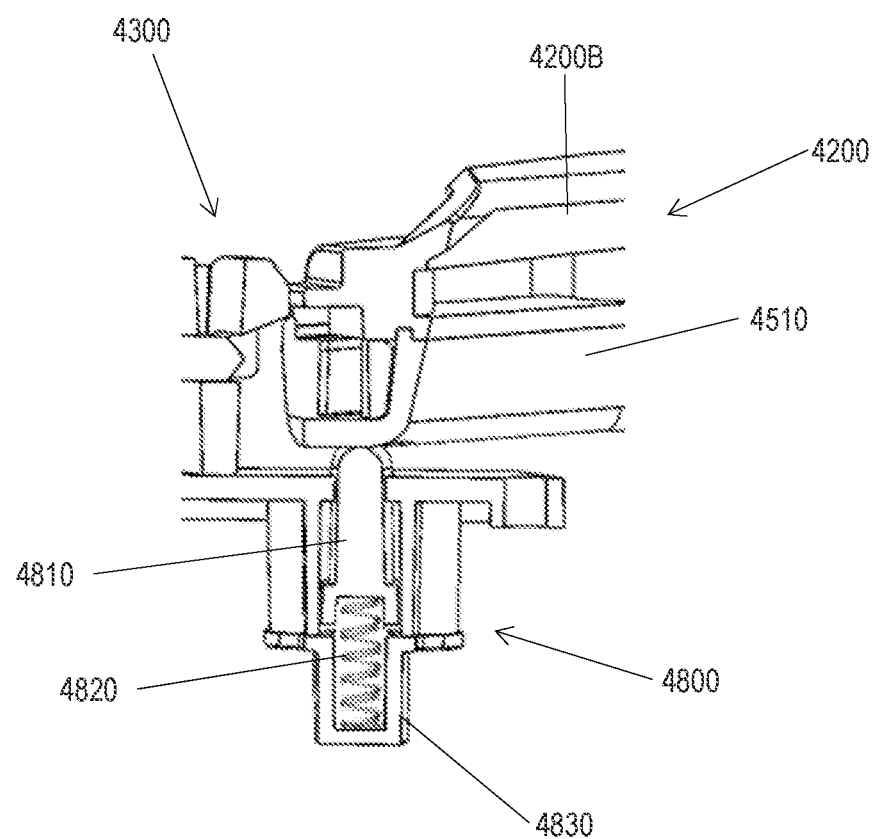
FIG. 48 shows a detailed perspective view of an example of the worksurface opening mechanism.

FIG. 48 shows a detailed perspective view of an example of the worksurface opening mechanism 4300. The worksurface opening mechanism 4300 can include a lift system 4800. The lift system 4800 can bias the glides 4200 (and the worksurface 2431) away from the head unit 4230. In an example, the lift system 4800 can include a plunger 4810, and the plunger 4810 can engage with the glides 4200 (e.g., the glide 4200B) and bias the glides 4200 away from the head unit 4230 (shown in FIG. 42). In this example, when the worksurface 2431 is engaged with the glides 4200, the lift system 4800 can bias the worksurface 2431 away from the head unit 4230. In some examples, the lift system 4800 includes a plurality of plungers 4810. For instance, a first plunger 4810 can be located proximate to the glide 4200A, and a second plunger 4810 can be located proximate to the glide 4200B.

Additionally, the lift system 4800 can include a biasing member 4820 and a lift housing 4830. The biasing member 4820 (e.g., a spring or the like) can be located between the plunger 4810 and the lift housing 4830, and the biasing member 4820 can bias the plunger 4810 in a first direction (e.g., upward, or toward engagement with the glides 4200). In this example, the plunger 4810 can bias the glides 4200 in the first direction because the plunger 4810 can engage with the glides 4200 (e.g., the glide 4200B). As discussed in greater detail in this document, the lift system 4800 can bias the worksurface 2431 toward the open configuration when the latch 4500 (shown in FIG. 47) is disengaged from the catch 4620 (shown in FIG. 46).

Figure 49:
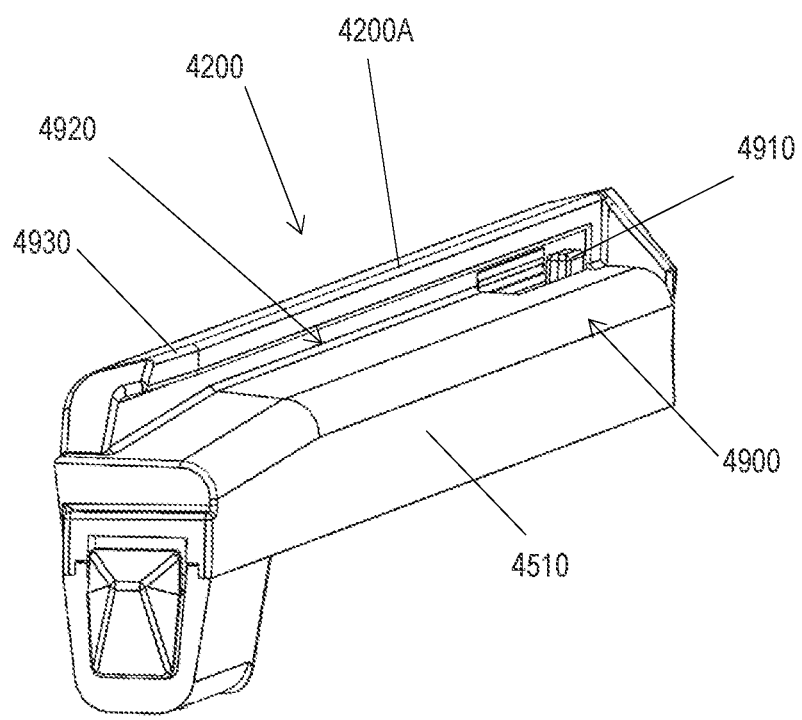
FIG. 49 shows another perspective view of the glide.

FIG. 49 shows another perspective view of the glide 4200A. The glides 4200 (e.g., the glide 4200A) can include an ejection system 4900. The ejection system 4900 can bias the worksurface 2431 in a second direction (e.g., along a length axis of the glide 4200A) when the worksurface 2431 (shown in FIG. 41) is engaged with the glides 4200. In an example, the ejection system 4900 can include an ejection tab 4910, and the ejection tab 4910 can engage with the worksurface 2431 to bias the worksurface 2431 in the second direction.

The glides 4200 can include a glide channel 4920, and the glide channel 4920 can be sized and shaped to receive the worksurface 2431. The ejection tab 4910 can extend into a glide channel 4920 defined by the glide body 4510, and the ejection tab 4910 can engage with the worksurface 2431 when the worksurface 2431 is engaged with the glide channel 4920. The glide channel can be defined by the glide body 4510 and a glide rail 4930 The ejection tab 4910 can engage with the worksurface 2431 and bias the worksurface 2431 in the second direction (e.g., along a length of the glide channel 4920). In an example, the ejection tab 4910 can translate with respect to the glide body 4510 and accordingly translate the worksurface 2431 with respect to the glide body 4510.

Figure 50:
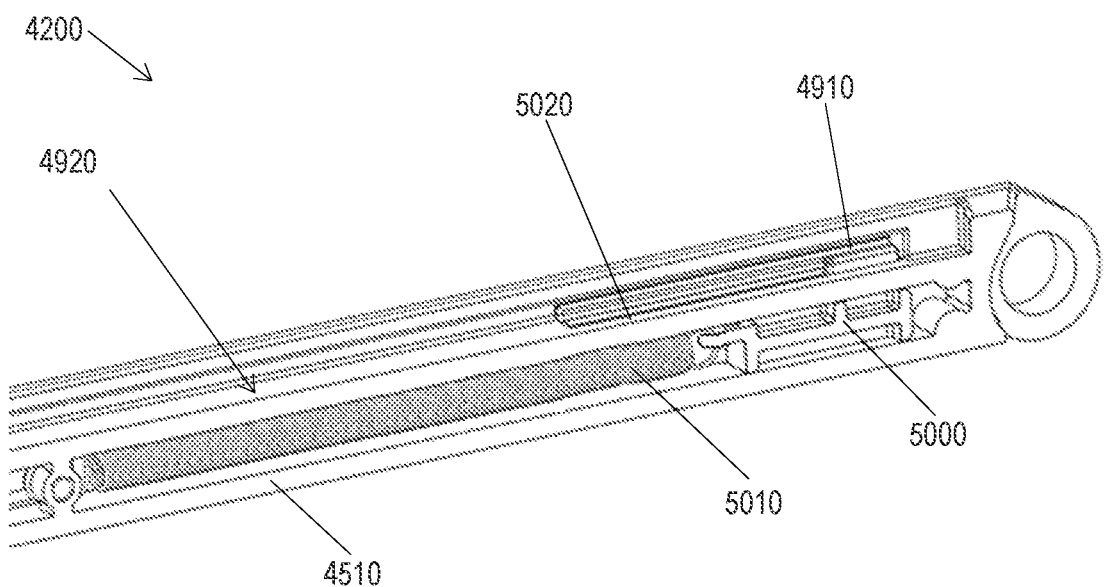
FIG. 50 shows yet another perspective view of the glide.

FIG. 50 shows yet another perspective view of the glide 4200A. Portions of the glide 4200A have been hidden in FIG. 50 for clarity. the ejection assembly 4900 can include an ejection sled 5000 and an ejection biasing member 5010. The ejection sled 5000 can include the ejection tab 4910, and the ejection tab can extend through a slot 5020 defined by the glide body 4510 into the glide channel 4920. The biasing member 5010 (e.g., a spring or the like) can be coupled with the ejection sled 5000 and the glide body 4510. and the biasing member 5010 can bias the ejection sled 5000 (and the ejection tab 4910) in the second direction. In an example, the ejection tab 4910 can engage with the glide body 4510 (e.g., a wall of the slot 5020) to limit a range of motion of the ejection sled 5000. For instance, the glide body 4510 can be configured to stop the translation of the ejection sled 5000 with respect to the glide body 4510.

Figure 51:
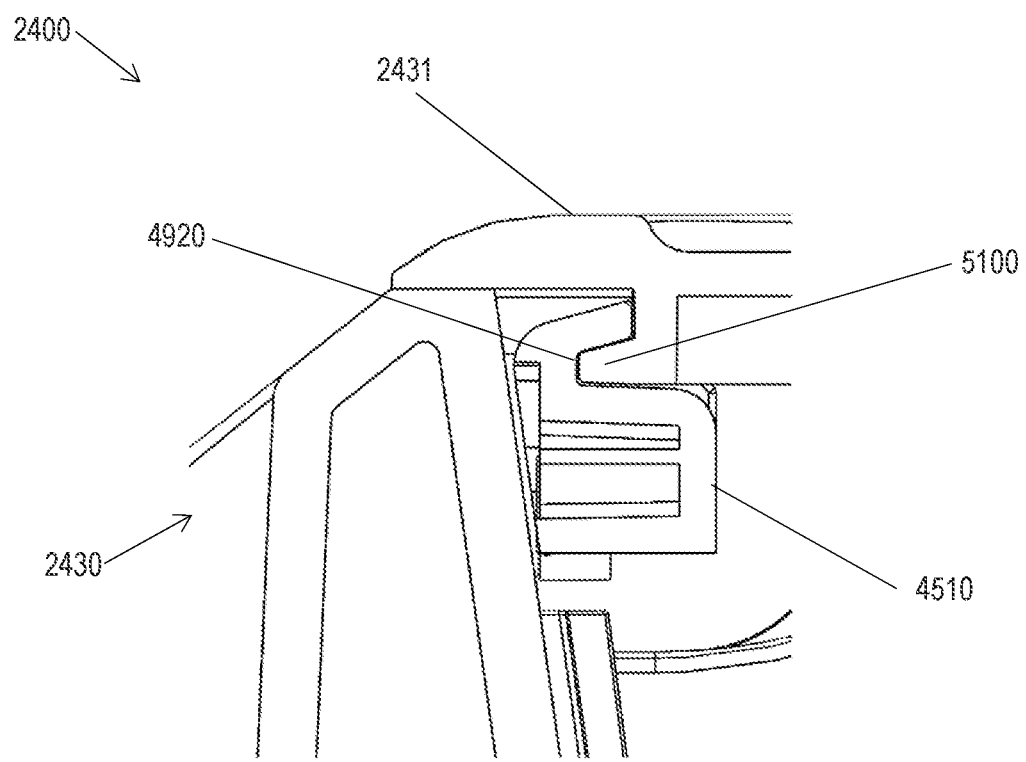
FIG. 51 shows a front view of the mobile workstation 2400.

FIG. 51 shows a front view of the mobile workstation 2400. As described herein, the mobile workstation 2400 can include the head unit 2430, the worksurface 2431, and the glides 4200. The glides 4200 can define the glide channel 4920, and the worksurface 2431 can be engaged with the glide channel 4920. In an example, the worksurface 2431 can include a worksurface tab 5100, and the glide channel 4920 can be sized and shaped to receive the worksurface tab 5100. The worksurface tab 5100 can be slidingly engaged with the glide channel 4920, and the worksurface tab 5100 can translate with respect to the glide channel 4920. Accordingly, the worksurface 2431 can translate with respect to the glide body 4510. Additionally, the ejection tab 4910 (shown in FIG. 49) can engage with the worksurface tab 5100, for instance to bias the worksurface 2431 in the second direction.

Figure 52:
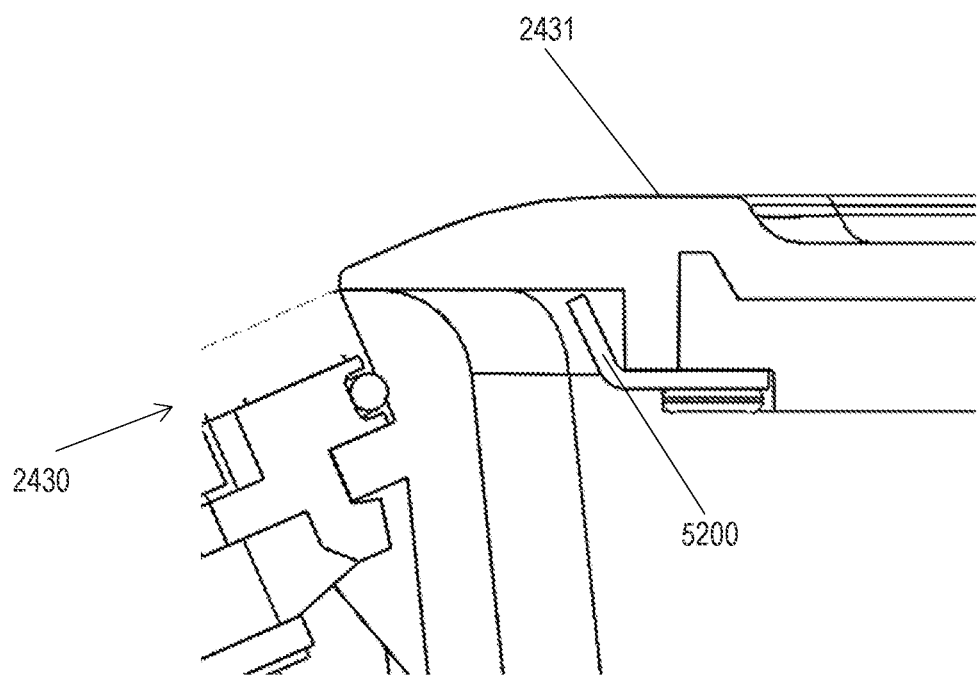
FIG. 52 shows a detailed side view of the head unit and the worksurface.
Figure 53:
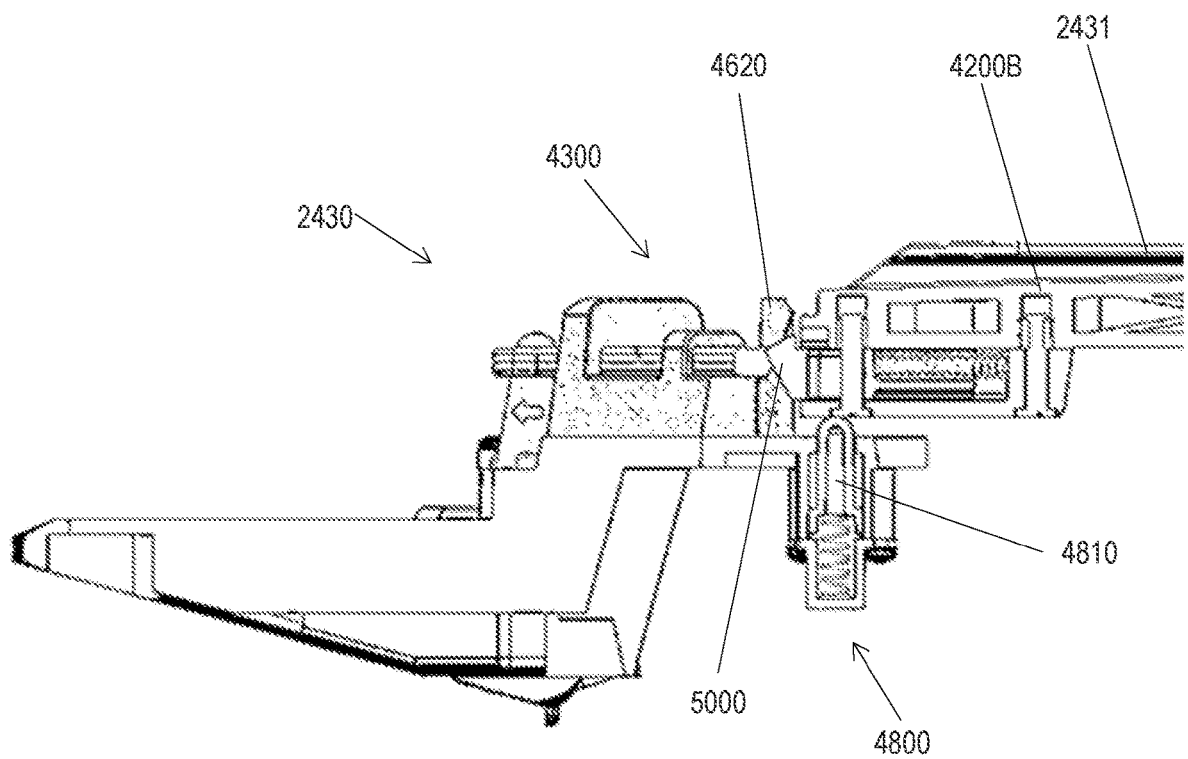
FIG. 53 shows a side view of the head unit, the glide, and the worksurface opening mechanism.
Figure 54:
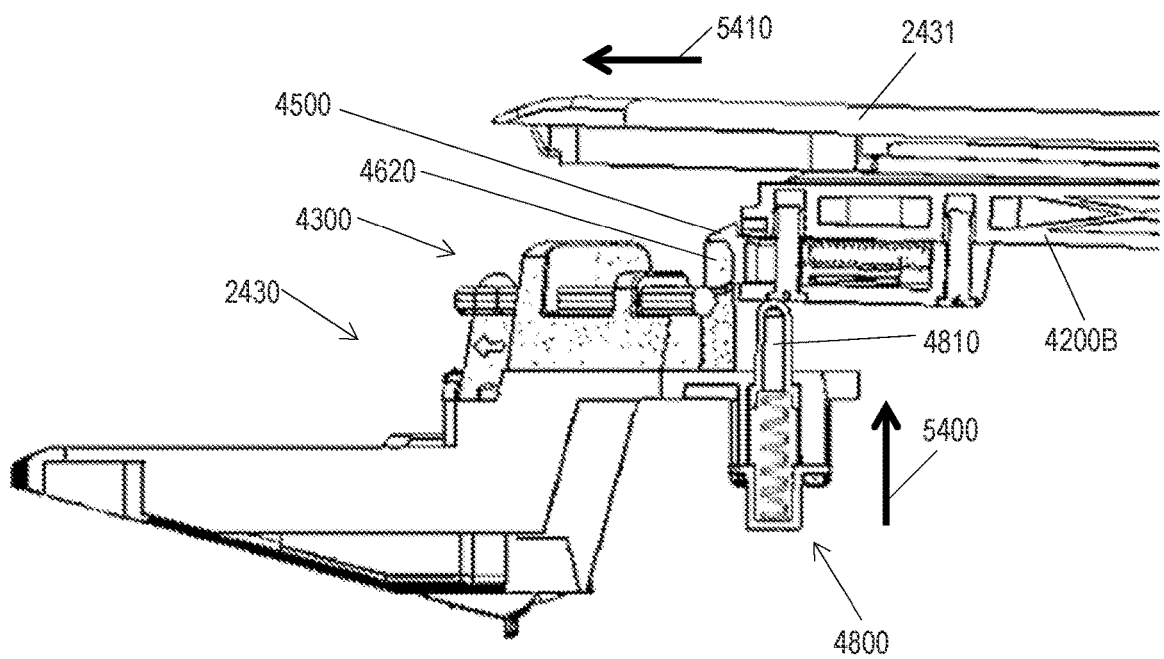
FIG. 54 shows another side view of the head unit, the glide, and the worksurface opening mechanism.

FIG. 52 shows a detailed side view of the head unit 2430 and the worksurface 2431. An angled bracket 5200 can be coupled with the worksurface 2431, and the angled bracket 5200 can engage with the head unit 2430 to displace the worksurface 2431 relative to the head unit 2430. In an example, a user can transition the worksurface 2431 from the open configuration (as shown in FIG. 54) toward the closed configuration (as shown in FIG. 53). The angled bracket 5200 can engage with the head unit 2430 to guide the worksurface 2431 toward the closed configuration. For instance, the engagement of the angled bracket 5200 with the head unit 2431 can overcome the bias provided by the ejection biasing member 5010 (shown in FIG. 50) and allow the worksurface 2431 to translate with respect to the glide body 4510 (shown in FIG. 50).

FIG. 53 shows a side view of the head unit 2430, the glide 4200B, and the worksurface opening mechanism 4300. Portions of the head unit 2430, the glide 4200B, and the worksurface opening mechanism 4300 have been hidden in FIG. 53 for clarity. The worksurface 2431 is in the closed configuration in FIG. 53. Additionally, the worksurface opening mechanism 4300 is in the locked configuration in FIG. 53. The plunger 4810 of the lift system 4800 can be engaged with the glide 4200B. Further, the latch 5000 can be engaged with the catch 4620 to maintain the opening mechanism 4300 in the locked configuration and the worksurface 2431 in the closed configuration.

FIG. 54 shows another side view of the head unit 2430, the glide 4200B, and the worksurface opening mechanism 4300. Portions of the head unit 2430, the glide 4200B, and the worksurface opening mechanism 4300 have been hidden in FIG. 54 for clarity. The worksurface 2431 is in the open configuration in FIG. 54. Additionally, the worksurface opening mechanism 4300 is in the unlocked configuration in FIG. 54. The plunger 4810 is engaged with the glide 4200B, and the glide 4200B is biased in the first direction (e.g., as shown by the arrow 5400). The worksurface 2431 is allowed to transition to the open configuration (and the glide 4200B is allowed to rotate about the hinge 4210B, shown in FIG. 42) because the latch 4500 is disengaged from the catch 4620. As described in this document, the push rod 4610 can engage with the latch 5000 to displace the latch 5000 and disengage the latch 4500 from the catch 4620.

Further, the ejection system 4900 can bias the worksurface 2431 in the second direction (e.g., as shown by the arrow 5410). In this example, the worksurface 2431 can translate with respect to the glide body 4510. The worksurface 2431 can project from the glide 4200A, for instance to allow a user to access the computer storage compartment 2432 (shown in FIG. 42). Additionally, because the worksurface 2431 is in the open configuration, the worksurface 2431 can be removed from the head unit 2430. In an example, a user can translate (e.g., pull, push, or the like) the worksurface 2431 relative to the glide 4200A, and disengage the worksurface tab 5100 (shown in FIG. 51) from the glide channel 4920 (shown in FIG. 51).

Figure 55:
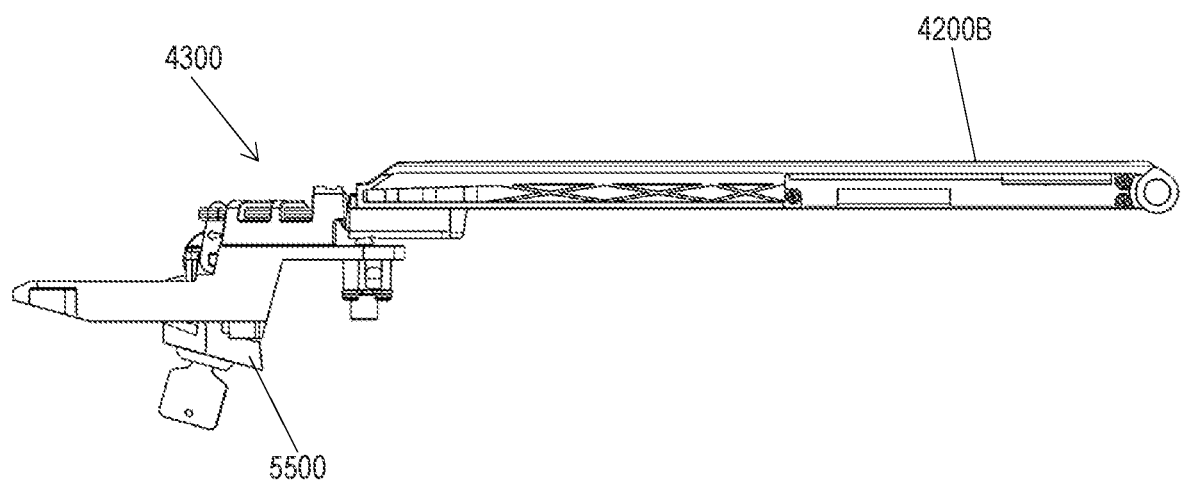
FIG. 55 shows a side view of the worksurface opening mechanism and the glides.

FIG. 55 shows a side view of the worksurface opening mechanism 4300 and the glides 4200B. The opening mechanism 4300 can include a lock 5500 (e.g., a key lock, code lock, or the like). The lock 5500 can inhibit the manipulation of the latch release handle 4310 (shown in FIG. 43). Accordingly, the lock 5500 can prevent transitioning the opening mechanism 4300 from the locked configuration to the unlocked configuration.

VARIOUS NOTES & EXAMPLES

Aspect 1 may include or use subject matter (such as an apparatus, a system, a device, a method, a means for performing acts, or a device readable medium including instructions that, when performed by the device, may cause the device to perform acts), such as may include or use a mobile workstation, comprising: a height adjustable riser; a head unit assembly coupled to the riser; a worksurface coupled to the head unit assembly and configured to translate with respect to the head unit assembly between an open configuration and a closed configuration; a first glide rotatably coupled to the head unit assembly and engaged with the worksurface, wherein the first glide includes a first latch configured to translate with respect to a first glide body of the first glide; and a worksurface opening mechanism having a locking configuration and an unlocking configuration, the worksurface opening mechanism including: a latch release handle moveably coupled to the head unit assembly, wherein movement of the latch release handle is configured to transition the worksurface opening mechanism between the locked configuration and the unlocked configuration; a release assembly coupled to the latch release handle and configured to selectively engage with the first latch; a lift system configured to bias the worksurface away from the head unit assembly; and a catch configured to engage with the first latch to restrain the first glide and maintain the worksurface in the closed configuration.

Aspect 2 may include or use, or may optionally be combined with the subject matter of Aspect 1, to optionally include or use wherein the worksurface is received in a worksurface channel of the first glide, and further comprising an ejection assembly including: an ejection sled slidingly coupled with the first glide, the ejection sled including an ejection tab extending into the worksurface channel; and an ejection spring configured to bias the ejection sled in a first direction, wherein the ejection sled engages with the worksurface and biases the worksurface in the first direction.

Aspect 3 may include or use, or may optionally be combined with the subject matter of Aspect 2 to optionally include or use wherein the ejection tab extends into the worksurface channel through a slot, and the slot extends a first distance along a length of the worksurface channel.

Aspect 4 may include or use, or may optionally be combined with the subject matter of Aspect 3 to optionally include or use wherein the ejection tab is configured to engage with a wall of the slot, and the engagement of the ejection tab with the wall of the slot prevents translation of the ejection tab with respect to the first glide.

Aspect 5 may include or use, or may optionally be combined with the subject matter of one or any combination of Aspects 2 through 4 to optionally include or use an angled bracket coupled with a portion of the worksurface and configured to engage with the head unit assembly, wherein the engagement of the angled bracket with the head unit assembly displaces the worksurface in a second direction and overcomes the bias of the ejection spring.

Aspect 6 may include or use, or may optionally be combined with the subject matter of one or any combination of Aspects 2 through 5 to optionally include or use wherein the ejection assembly is located proximate to the hinge.

Aspect 7 may include or use, or may optionally be combined with the subject matter of one or any combination of Aspects 1 through 6 to optionally include or use wherein the work surface opening mechanism includes: a shaft coupled with the latch release handle and rotatingly coupled with the head unit; a lobe coupled to the shaft, wherein movement of the latch release handle rotates the shaft and displaces the lobe; and a push rod slidingly engaged with the head unit and configured to engage with the latch, wherein the lobe is engaged with push rod and displacement of the lobe translates the push rod with respect to the head unit, wherein translation of the push rod with respect to the head unit selectively engages the push rod with the latch to translate the latch with respect to the first glide and allows the latch to disengage from the catch.

Aspect 8 may include or use, or may optionally be combined with the subject matter of Aspect 7 to optionally include or use a guide bracket coupled with the head unit assembly and sized and shaped to receive the push rod.

Aspect 9 may include or use, or may optionally be combined with the subject matter of one or any combination of Aspects 1 through 8 to optionally include or use wherein the worksurface is slidingly coupled with the first glide, and the work surface is removable from the first glide.

Aspect 10 may include or use, or may optionally be combined with the subject matter of one or any combination of Aspects 1 through 9 to optionally include or use wherein the lift system includes: a plunger configured to engage with the first glide; a biasing member located between the head unit assembly and the plunger and configured to bias the plunger in a first direction; wherein engagement of the plunger with the first glide biases the first glide in the first direction.

Aspect 11 may include or use, or may optionally be combined with the subject matter of one or any combination of Aspects 1 through 10 to optionally include or use wherein the worksurface is configured to be received in a worksurface channel of the first glide, and further comprising an ejection assembly including: an ejection sled slidingly coupled with the first glide, the ejection sled including an ejection tab extending into the worksurface channel; and an ejection spring configured to bias the ejection sled in a first direction, wherein the ejection sled is configured to engage with the worksurface and bias the worksurface in the first direction.

Aspect 12 may include or use, or may optionally be combined with the subject matter of one or any combination of Aspects 1 through 11 to optionally include or use a second glide rotatably coupled to the head unit assembly and engaged with the worksurface, wherein the second glide includes a second latch configured to translate with respect to the second glide, and wherein the release assembly is configured to selectively engage with the second latch.

Aspect 13 may include or use, or may optionally be combined with the subject matter of one or any combination of Aspects 1 through 12 to optionally include or use a storage compartment configured to receive one or more electronic devices.

Aspect 14 may include or use, or may optionally be combined with the subject matter of one or any combination of Aspects 1 through 13 to optionally include or use wherein the hinge is located proximate to an end of the first glide.

Aspect 15 may include or use subject matter (such as an apparatus, a system, a device, a method, a means for performing acts, or a device readable medium including instructions that, when performed by the device, may cause the device to perform acts), such as may include or use a worksurface opening mechanism for a mobile workstation, comprising: a support bracket; a latch release handle moveably coupled to the support bracket, wherein movement of the latch release handle is configured to translate the worksurface opening mechanism between a locked configuration and an unlocked configuration; a release assembly coupled to the latch release handle and configured to selectively engage with a latch; a lift system configured to bias a first glide away from the support bracket; and a catch configured to engage with the latch to restrain the glide and maintain the worksurface in the closed configuration.

Aspect 16 may include or use, or may optionally be combined with the subject matter of Aspect 15, to optionally include or use a shaft coupled with the latch release handle and rotatingly coupled with the support bracket; a first lobe coupled to the shaft, wherein movement of the latch release handle rotates the shaft and displaces the first lobe; and a first push rod slidingly engaged with the support bracket and configured to engage with the latch, wherein the first lobe is engaged with first push rod and displacement of the first lobe translates the first push rod with respect to the support bracket, wherein translation of the first push rod with respect to the support bracket is configured to selectively engage the first push rod with the latch to translate the latch to disengage the first latch from the catch.

Aspect 17 may include or use, or may optionally be combined with the subject matter of Aspect 16 to optionally include or use wherein the latch is a first latch and the catch is a first catch, and further comprising: a second lobe coupled to the shaft, wherein movement of the latch release handle rotates the shaft and displaces the second lobe; and a second push rod slidingly engaged with the support bracket and configured to engage with the second latch, wherein the second lobe is engaged with the second push rod and displacement of the second lobe translates the second push rod with respect to the support bracket, wherein translation of second first push rod with respect to the support bracket is configured to selectively engage the second push rod with a second latch to translate the second latch to disengage the second latch from a second catch.

Aspect 18 may include or use, or may optionally be combined with the subject matter of one or any combination of Aspects 15 through 17 to optionally include or use wherein the lift system includes: a first plunger configured to engage with the first glide; a first biasing member located between a first lift housing and the first plunger and configured to bias the first plunger in a first direction.

Aspect 19 may include or use, or may optionally be combined with the subject matter of Aspect 18 to optionally include or use wherein the lift system includes: a second plunger configured to engage with a second glide; a second biasing member located between a second lift housing and the second plunger and configured to bias the second plunger in the first direction.

Aspect 20 may include or use, or may optionally be combined with the subject matter of one or any combination of Aspects 15 through 5 to optionally include or use a guide bracket coupled with the head unit assembly and sized and shaped to receive the push rod.

Aspect 21 may include or use subject matter (such as an apparatus, a system, a device, a method, a means for performing acts, or a device readable medium including instructions that, when performed by the device, may cause the device to perform acts), such as may include or use a tilting work station configured to couple to a vertical support surface, comprising: a work surface; a wall mount assembly configured to couple to the vertical support surface, including: a frame; and a sliding bracket that translates with respect to the frame; a support bracket configured to couple with the work surface, wherein the support bracket is coupled to the sliding bracket with a hinge, and wherein the support bracket is configured to rotate about the hinge; and a lock assembly having a locked configuration and an unlocked configuration, wherein: in the locked configuration, the lock assembly is engaged with the sliding bracket and the work surface is in a horizontal first position; and in the unlocked configuration, the lock assembly is disengaged from the sliding bracket and the work surface is configured to translate to a vertical second position.

Aspect 22 may include or use, or may optionally be combined with the subject matter of Aspect 21, to optionally include or use a latch assembly coupled with the sliding bracket, wherein the latch assembly defines a pin channel; a pin coupled with the sliding bracket; and wherein the pin channel is sized and shaped to receive the pin, and reception of the pin within the pin channel configures the lock assembly in the locked configuration.

Aspect 23 may include or use, or may optionally be combined with the subject matter of one or any combination of Aspects 21 or 2 to optionally include or use wherein the latch assembly includes: a first arm defining the pin channel; a second arm coupled with the first arm with a latch hinge; and a latch actuator coupled with the second arm, wherein movement of the latch actuator rotates the second arm and the first arm about the pivot.

Aspect 24 may include or use, or may optionally be combined with the subject matter of one or any combination of Aspects 21 through 3 to optionally include or use wherein the wall mount assembly includes: a first attachment mechanism configured to engage with a first slotted bracket; a first attachment body; a first tab including a first hook protrusion oriented in a first direction; a second tab including a second hook protrusion oriented in a second direction opposite the first direction; and wherein the second tab is configured to translate with respect to the attachment body and the translation of the second tab varies a first distance between the first tab and the second tab.

Aspect 25 may include or use, or may optionally be combined with the subject matter of one or any combination of Aspects 21 through 4 to optionally include or use that wherein the wall mount assembly includes: a second attachment mechanism configured to engage with a second slotted bracket; a second attachment body; a third tab including a third hook protrusion oriented in the first direction; a fourth tab including a fourth hook protrusion oriented in the second direction; and wherein the third tab or the fourth tab is configured to translate with respect to the attachment body and the translation of the third tab or the fourth tab varies a second distance between the third tab and the fourth tab.

Aspect 26 may include or use, or may optionally be combined with the subject matter of one or any combination of Aspects 24 or 25 to optionally include or use wherein the wall mount assembly includes: a support member configured to span between the first attachment mechanism and the second attachment mechanism, wherein the support member includes a first key and a second key; wherein the first attachment body includes a first keyway configured to receive the first key, and the second attachment body includes a second keyway configured to receive the second key; and wherein the frame is configured to engage with the support member to couple the frame with the structure.

Aspect 27 may include or use, or may optionally be combined with any portion or combination of any portions of any one or more of Aspects 1 through 26 to include or use, subject matter that may include means for performing any one or more of the functions of Aspects 1 through 26.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A mobile workstation, comprising:
a height adjustable riser;
a head unit assembly coupled to the height adjustable riser; and
a display mount assembly including:
a display mount configured for attachment with a display;
a display riser; and
a display arm assembly extending between the display mount and the display riser and the display arm assembly is moveable between a first configuration and a second configuration, the display arm assembly comprising:
a first arm rotatably connected with the display riser at a first hinge;
a second arm rotatably connected with the first arm at a second hinge and rotatably connected with the display mount at a third hinge;
a third arm rotatably connected with the display riser at the first hinge; and
a fourth arm rotatably connected with the third arm at a fourth hinge and rotatably connected with the display mount at the third hinge;
wherein:
in the first configuration, the display mount is configured to hold the display in a first position facing a first direction; and
in the second configuration, the display mount is laterally offset relative to the first position and the display mount is rotationally offset relative to the first position to face a second direction.

2. The mobile workstation of claim 1, wherein the first direction is rotationally offset by 90 degrees or more with respect to second direction.

3. The mobile workstation of claim 1, wherein the display arm assembly is moveable between a contracted configuration and an expanded configuration, and wherein:
in the contracted configuration, the display mount is proximate to the display riser; and
in the expanded configuration, the display mount is remote from the display riser to change a distance between the display mount and the display riser.

4. The mobile workstation of claim 3, wherein:
in the contracted configuration, the third hinge is proximate to the first hinge and the second hinge is remote from the fourth hinge; and
in the expanded configuration, the third hinge is remote from the first hinge and the second hinge is proximate the fourth hinge.

5. The mobile workstation of claim 1, wherein:
the first hinge has a first rotational axis;
the second hinge has a second rotational axis;
the third hinge has a third rotational axis; and
the first rotational axis is parallel with the second rotational axis and the third rotational axis.

6. The mobile workstation of claim 5, wherein the display mount includes a tilt mechanism configured to allow the display to rotate along a tilt rotational axis offset from at least the first rotational axis.

7. The mobile workstation of claim 1, wherein the display arm assembly is moveable between a contracted configuration and an expanded configuration, and wherein:
in the contracted configuration, the third hinge is proximate to the first hinge; and
in the expanded configuration, the third hinge is remote from the first hinge to change a distance between the display mount and the display riser.

8. The mobile workstation of claim 1, wherein the display riser includes a counterbalance mechanism configured to help change a height of the display arm assembly along the display riser.

9. A mobile workstation, comprising:
a height adjustable riser;
a head unit assembly coupled to the height adjustable riser, the head unit assembly including a worksurface; and
a display mount assembly including:
a display mount configured for attachment with a display;
a display riser coupled with the head unit assembly; and
a display arm assembly extending between the display mount and the display riser and the display arm assembly is moveable between a first configuration and a second configuration, the display arm assembly comprising:
a first arm rotatably connected with the display riser at a first hinge;
a second arm rotatably connected with the first arm at a second hinge and rotatably connected with the display mount at a third hinge;
a third arm rotatably connected with the display riser at the first hinge; and a fourth arm rotatably connected with the third arm at a fourth hinge and rotatably connected with the display mount at the third hinge;

wherein:

in the first configuration, the display mount is configured to hold the display in a first position above the worksurface facing a first direction; and in the second configuration, the display mount is laterally offset relative to the first position and the display mount is rotationally offset relative to the first position by at least 90 degrees to face a second direction.

10. The mobile workstation of claim 9, wherein:
the first hinge has a first rotational axis;
the second hinge has a second rotational axis;
the third hinge has a third rotational axis; and
the first rotational axis is parallel with the second rotational axis and the third rotational axis.

11. The mobile workstation of claim 10, wherein the display mount includes a tilt mechanism configured to allow the display to rotate along a tilt rotational axis offset from at least the first rotational axis.

12. The mobile workstation of claim 9, wherein the display arm assembly is moveable between a contracted configuration and an expanded configuration, and wherein:
in the contracted configuration, the third hinge is proximate to the first hinge; and
in the expanded configuration, the third hinge is remote from the first hinge to change a distance between the display mount and the display riser.

13. The mobile workstation of claim 9, wherein the display riser includes a counterbalance mechanism configured to help change a height of the display arm assembly along the display riser.

14. A mobile workstation, comprising:
a height adjustable riser;
a head unit assembly coupled to the height adjustable riser; and
a display mount assembly including:
a display mount configured for attachment with a display;
a display riser; and
a display arm assembly moveable between a first configuration and a second configuration, the display arm assembly including:
a first arm rotatably connected with the display riser at a first hinge;
a second arm rotatably connected with the first arm at a second hinge and rotatably connected with the display mount at a third hinge;
a third arm rotatably connected with the display riser at the first hinge; and
a fourth arm rotatably connected with the third arm at a fourth hinge and rotatably connected with the display mount at the third hinge;

wherein:

in the first configuration, the display mount is configured to hold the display in a first position facing a first direction with the third hinge proximate to the first hinge; and in the second configuration, the display mount is laterally offset relative to the first position and the display mount is rotationally offset relative to the first position to face a second direction with the third hinge remote from the first hinge.

15. The mobile workstation of claim 14, wherein the first direction is rotationally offset by 90 degrees or more with respect to the second direction.

16. The mobile workstation of claim 14, wherein:
the first hinge has a first rotational axis;
the second hinge has a second rotational axis;
the third hinge has a third rotational axis; and
the first rotational axis is parallel with the second rotational axis and the third rotational axis.

17. The mobile workstation of claim 16, wherein the display mount includes a tilt mechanism configured to allow the display to rotate along a tilt rotational axis offset from at least the first rotational axis.

* * * * *